(12) United States Patent
Thompson et al.

(10) Patent No.: US 10,035,071 B2
(45) Date of Patent: Jul. 31, 2018

(54) ELECTRONIC GAMING SYSTEM WITH OVERSIZED DISPLAY SCREEN

(71) Applicant: Cadillac Jack, Inc., Duluth, GA (US)

(72) Inventors: Mark Andrew Thompson, Buford, GA (US); Prashant L. Shah, Elk Grove Village, IL (US); Sigmund Hyunjai Lee, Atlanta, GA (US)

(73) Assignee: AGS LLC, Las Vegas, NV (US)

( * ) Notice: Subject to any disclaimer, the term of this patent is extended or adjusted under 35 U.S.C. 154(b) by 180 days.

(21) Appl. No.: 14/960,676

(22) Filed: Dec. 7, 2015

(65) Prior Publication Data
US 2016/0082359 A1 Mar. 24, 2016

Related U.S. Application Data

(63) Continuation-in-part of application No. 13/887,869, filed on May 6, 2013, now abandoned.

(51) Int. Cl.
*G06F 17/00* (2006.01)
*A63F 13/90* (2014.01)
*G07F 17/32* (2006.01)

(52) U.S. Cl.
CPC .......... *A63F 13/90* (2014.09); *G07F 17/3211* (2013.01)

(58) Field of Classification Search
None
See application file for complete search history.

(56) References Cited

U.S. PATENT DOCUMENTS

| | | | |
|---|---|---|---|
| 4,440,457 A | 4/1984 | Fogelman et al. | |
| 4,856,088 A | 8/1989 | Oliwa et al. | |
| 4,948,138 A | 8/1990 | Pease et al. | |
| D333,164 S | 2/1993 | Kraft et al. | |
| 5,537,149 A | 7/1996 | Teraoka et al. | |

(Continued)

OTHER PUBLICATIONS

Sony; Sony XAV601BT Manual—Detaching and attaching the front panel; esupportsony.com; https://esupportsony.com/US/p/model-home.pl?mdl=XAV601BT&template_id=1&region_id=1&tab=manuals#/manualsTab; 2 pages; downloaded Dec. 20, 2016.

(Continued)

*Primary Examiner* — Ronald Laneau
(74) *Attorney, Agent, or Firm* — Weide & Miller, Ltd.

(57) ABSTRACT

Examples disclosed herein relate to systems and methods, which may receive wagers on one or more paylines. The systems and methods may utilize one or more symbol positions which may provide additional gaming functionality. The systems and methods may determine one or more payouts based on the additional gaming functionality. The systems and methods may display one or more presentations based on the additional gaming functionality. The systems and methods may utilize a first display device. The first display device may include a first display area, a first silk-screen area, a first insulation area, and a first border area. The first display area, the first silk-screen area, the first insulation area, and the first border area may be flush with each other. The first insulation area may provide electrical isolation between the first border area and the first display area and/or the silk-screen area. The first insulation area may provide a mechanical buffer between the border area and the first display area and/or the silk-screen area.

15 Claims, 40 Drawing Sheets

(56) References Cited

U.S. PATENT DOCUMENTS

| | | | |
|---|---|---|---|
| 5,575,544 A | 11/1996 | Hasegawa et al. | |
| 5,696,529 A | 12/1997 | Evanicky | |
| 5,813,914 A | 9/1998 | McKay et al. | |
| 5,951,128 A | 9/1999 | Aidone et al. | |
| D424,122 S | 5/2000 | Dickenson et al. | |
| 6,334,612 B1 | 1/2002 | Wurz et al. | |
| D459,402 S | 6/2002 | Wurz et al. | |
| D460,915 S | 7/2002 | Lynch | |
| 6,443,837 B1 | 9/2002 | Jaffe et al. | |
| D464,377 S | 10/2002 | Wurz et al. | |
| 6,475,087 B1 | 11/2002 | Cole | |
| 6,545,863 B2 | 4/2003 | Huggins | |
| 6,578,847 B1 | 6/2003 | Hedrick et al. | |
| 6,702,409 B2 | 3/2004 | Hedrick et al. | |
| D495,755 S | 9/2004 | Wurz et al. | |
| D496,407 S | 9/2004 | Gadda et al. | |
| 6,860,814 B2 | 3/2005 | Cole | |
| 6,935,946 B2 | 8/2005 | Yoseloff et al. | |
| 6,976,915 B2 | 12/2005 | Baker et al. | |
| 6,997,810 B2 | 2/2006 | Cole | |
| 7,130,190 B1 | 10/2006 | Baker | |
| D559,917 S | 1/2008 | Cole | |
| D626,182 S | 10/2010 | Cole et al. | |
| 7,862,436 B2 | 1/2011 | Cole | |
| 7,904,236 B2 | 3/2011 | Ueno | |
| 8,016,682 B2 | 9/2011 | Stephenson, III et al. | |
| 8,016,683 B2 | 9/2011 | Cole | |
| 8,082,559 B2 | 12/2011 | Yamada et al. | |
| 2002/0022509 A1* | 2/2002 | Nicastro, II | G07F 17/32 463/15 |
| 2002/0030966 A1 | 3/2002 | Huggins | |
| 2002/0183105 A1 | 12/2002 | Cannon et al. | |
| 2004/0018870 A1 | 1/2004 | Cole | |
| 2004/0166937 A1 | 8/2004 | Rothschild et al. | |
| 2004/0207156 A1 | 10/2004 | Soltys et al. | |
| 2005/0215325 A1 | 9/2005 | Nguyen et al. | |
| 2005/0288090 A1 | 12/2005 | Thomas et al. | |
| 2006/0073900 A1 | 4/2006 | Cole | |
| 2006/0131810 A1 | 6/2006 | Nicely | |
| 2007/0225079 A1 | 9/2007 | Cole | |
| 2007/0295020 A1 | 12/2007 | Lee | |
| 2008/0113819 A1 | 5/2008 | Tedsen et al. | |
| 2010/0173704 A1 | 7/2010 | Cole | |
| 2010/0188808 A1 | 7/2010 | Howarth et al. | |
| 2011/0058326 A1 | 3/2011 | Idems | |
| 2011/0151958 A1 | 6/2011 | Cole | |
| 2012/0062211 A1 | 3/2012 | Neal et al. | |
| 2012/0302358 A1 | 11/2012 | Cole | |
| 2012/0322564 A1* | 12/2012 | Granger | A63F 13/08 463/46 |
| 2013/0023346 A1* | 1/2013 | Greenberg | G07F 17/3202 463/46 |
| 2013/0079157 A1* | 3/2013 | Chudek | G07F 17/3216 463/46 |
| 2014/0179422 A1 | 6/2014 | Thompson et al. | |

OTHER PUBLICATIONS

Sony XAV601BT. Amazon.com. Online. Accessed via the Internet. Accessed Nov. 13, 2013. <URL: http://www.amazon.com/Sony-XAV601BT-Bluetooth-MirrorLink-Technology/dp/B0086V637Y#produceDetails>; 8 pages.

Sony; Sony XAV601BT Operating Instructions; esupport.sony.com; https://esupport.sony.com/US/p/model-home.pl?mdl=XAV601BT&template_id=1&region_id=1&tab=manuals#/manualsTab; 71 pages; Copyright 2012.

Dirak Inc. 1-046SL Fastener SNAP-LINE 30X10. http://www.bdproduct.ca/wp-content/uploads/2013/06/Dirak-Fasteners-22.pdf. Copyright Oct. 1, 2012. 1 Page.

* cited by examiner

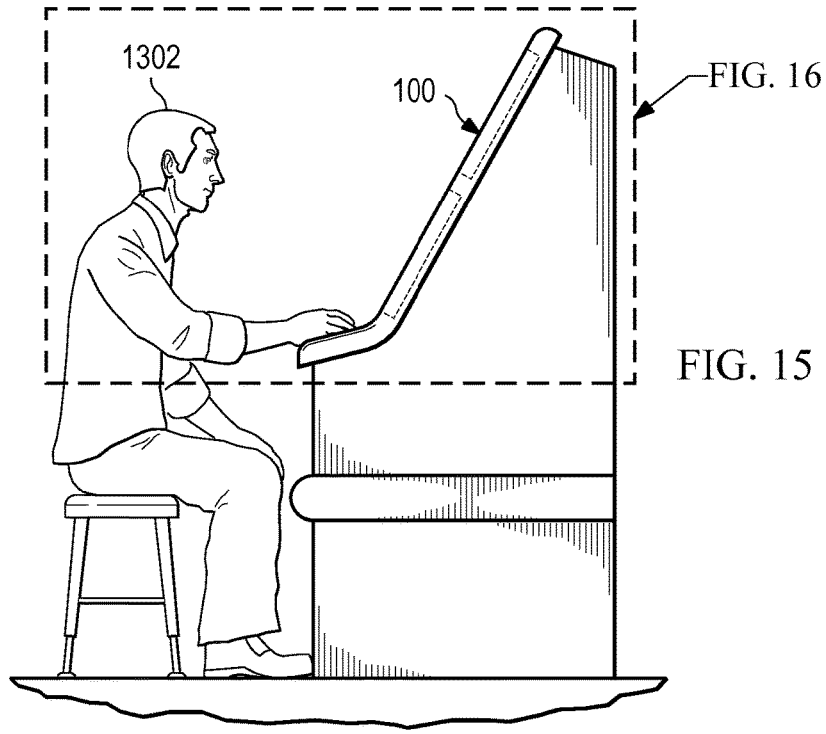
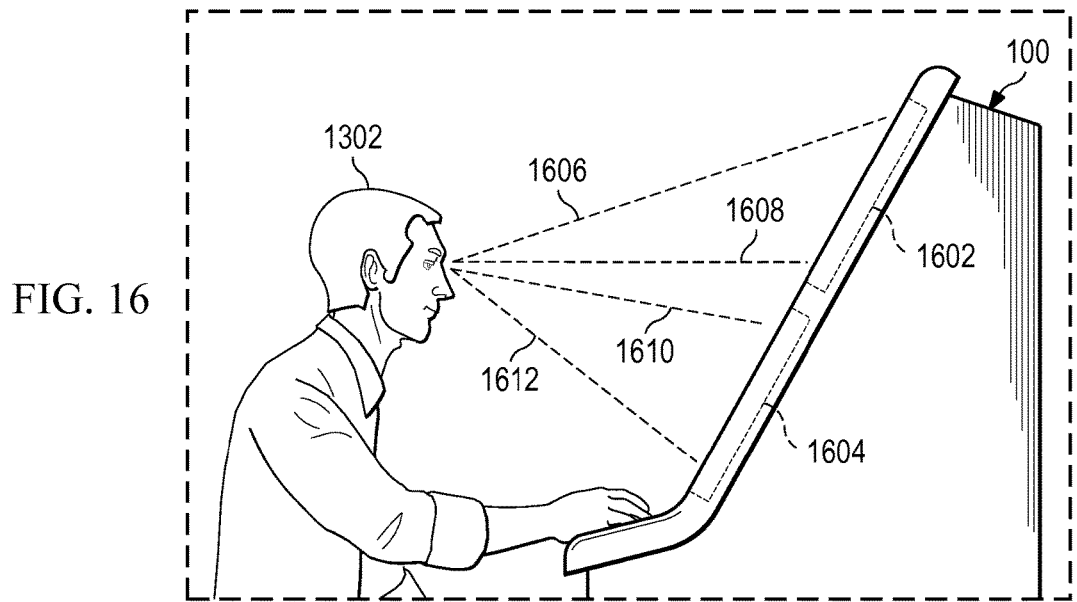

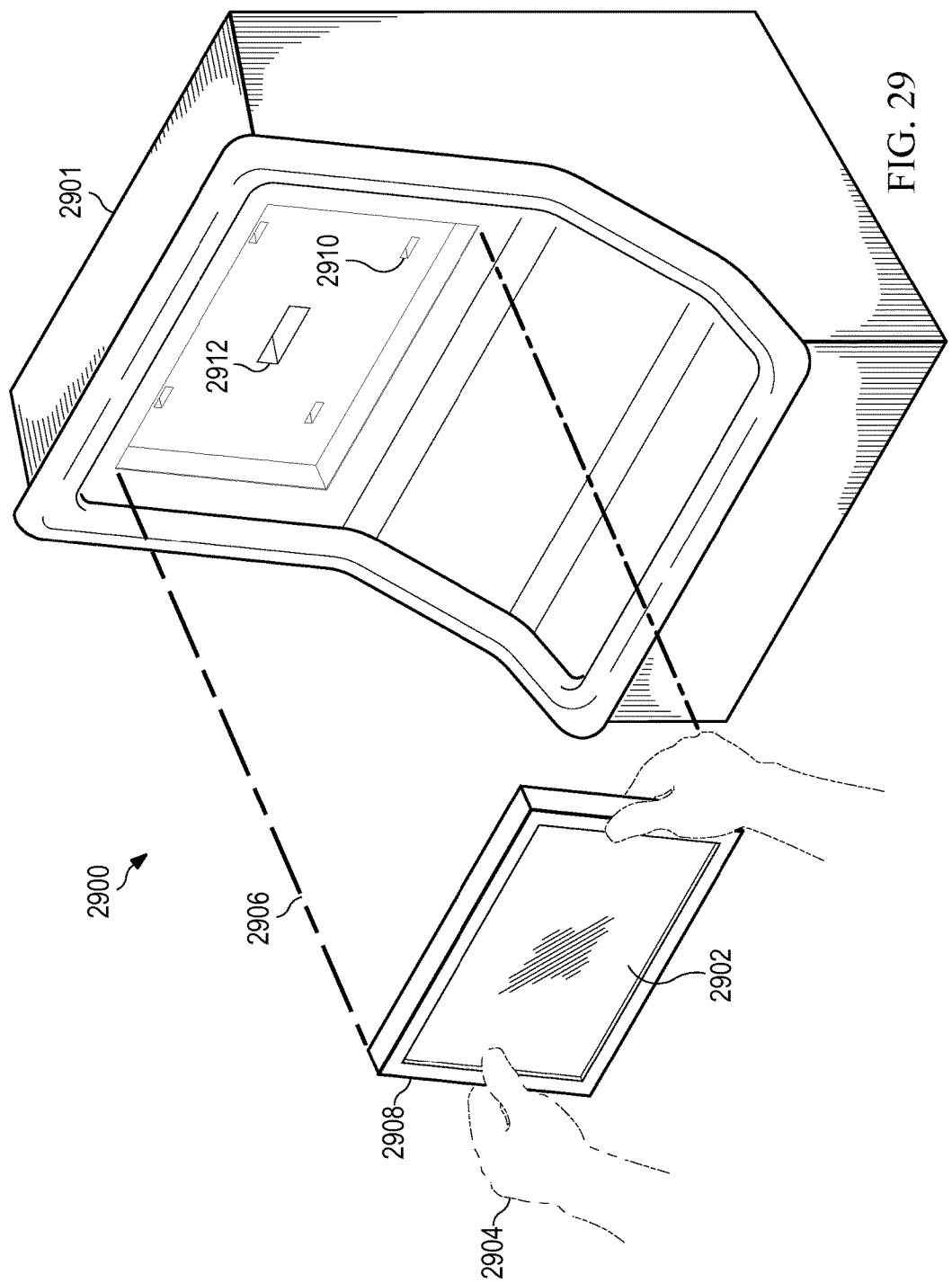

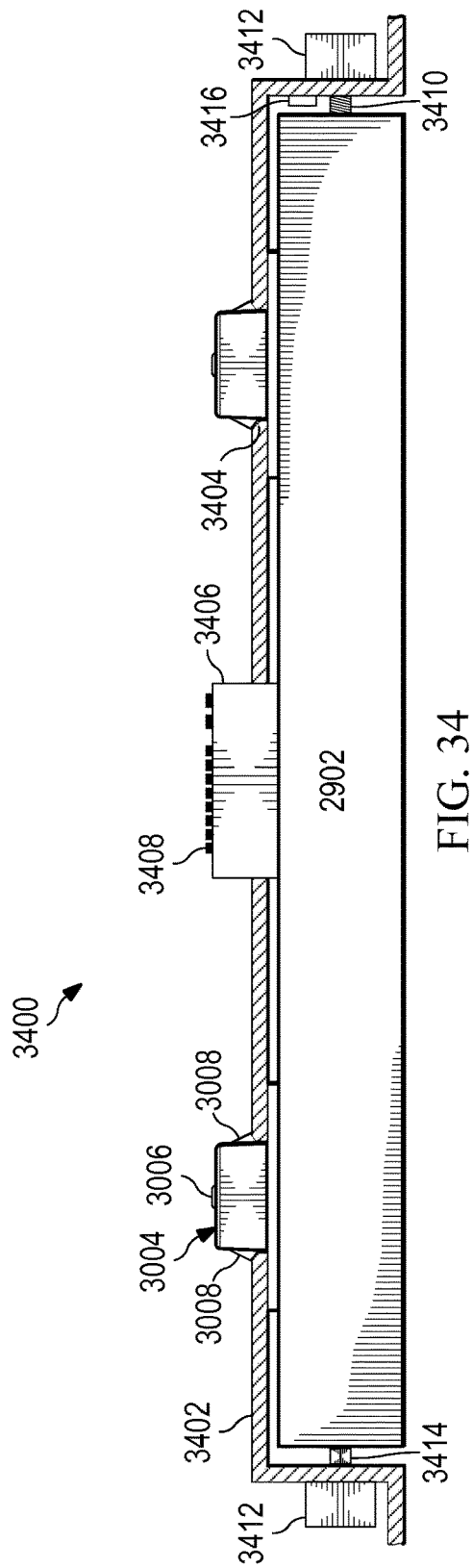

ELECTRONIC GAMING SYSTEM WITH OVERSIZED DISPLAY SCREEN

CROSS-REFERENCE TO RELATED PATENT APPLICATION

This application claims priority to and is a continuation-in-part of prior application Ser. No. 13/887,869 entitled "ELECTRONIC GAMING SYSTEM WITH FLUSH MOUNTED DISPLAY SCREEN", filed on May 6, 2013, which is incorporated herein by reference in its entirety.

FIELD

The subject matter disclosed herein relates to an electronic gaming device, an electronic gaming system, and a gaming method of configuring a display for an electronic gaming system and/or an electronic gaming device. More specifically, the disclosure relates to an electronic gaming system and/or electronic gaming device which have one or more flush mounted display screens, and associated methods.

Information:

The gaming industry has numerous casinos located both worldwide and in the United States. A client of a casino or other gaming entity can gamble via various games of chance. For example, craps, roulette, baccarat, blackjack, and electronic or electromechanical games (e.g., a slot machine, a video poker machine, and the like) where a person may gamble on an outcome.

Historically, the success of electronic gaming systems are dependent on several elements, which may not be readily apparent. Success can depend upon the prospect of winning money from the gaming system, whether such prospect is real or perceived which can carry an intrinsic entertainment value as compared to other gaming system offerings. Additionally, the success can also depend upon the ease by which a new player can understand, and/or interface with, the game mechanics and/or gaming system, as it is unlikely that a new player will expend money wagering on a gaming system if they do not understand the game mechanics or do not understand how to interface with the gaming system. A player's enjoyment and interest in a game may be increased by employing an electronic gaming system, an electronic gaming device, and/or methods that provide one or more flush display screens which can make it easier for the player to interface with a gaming system and/or gaming mechanics.

BRIEF DESCRIPTION OF THE FIGURES

Non-limiting and non-exhaustive examples will be described with reference to the following figures, wherein like reference numerals refer to like parts throughout the various figures.

FIG. 15 is an illustration of the gaming system including adjacent flush mounted displays.

FIG. 16 is another illustration of the gaming system including adjacent flush mounted displays.

FIG. 29 is an illustration of the gaming system including a snap on display, according to one embodiment.

FIG. 34 is an illustration of the gaming system including a snap on display, according to one embodiment.

DETAILED DESCRIPTION

Figure 1:
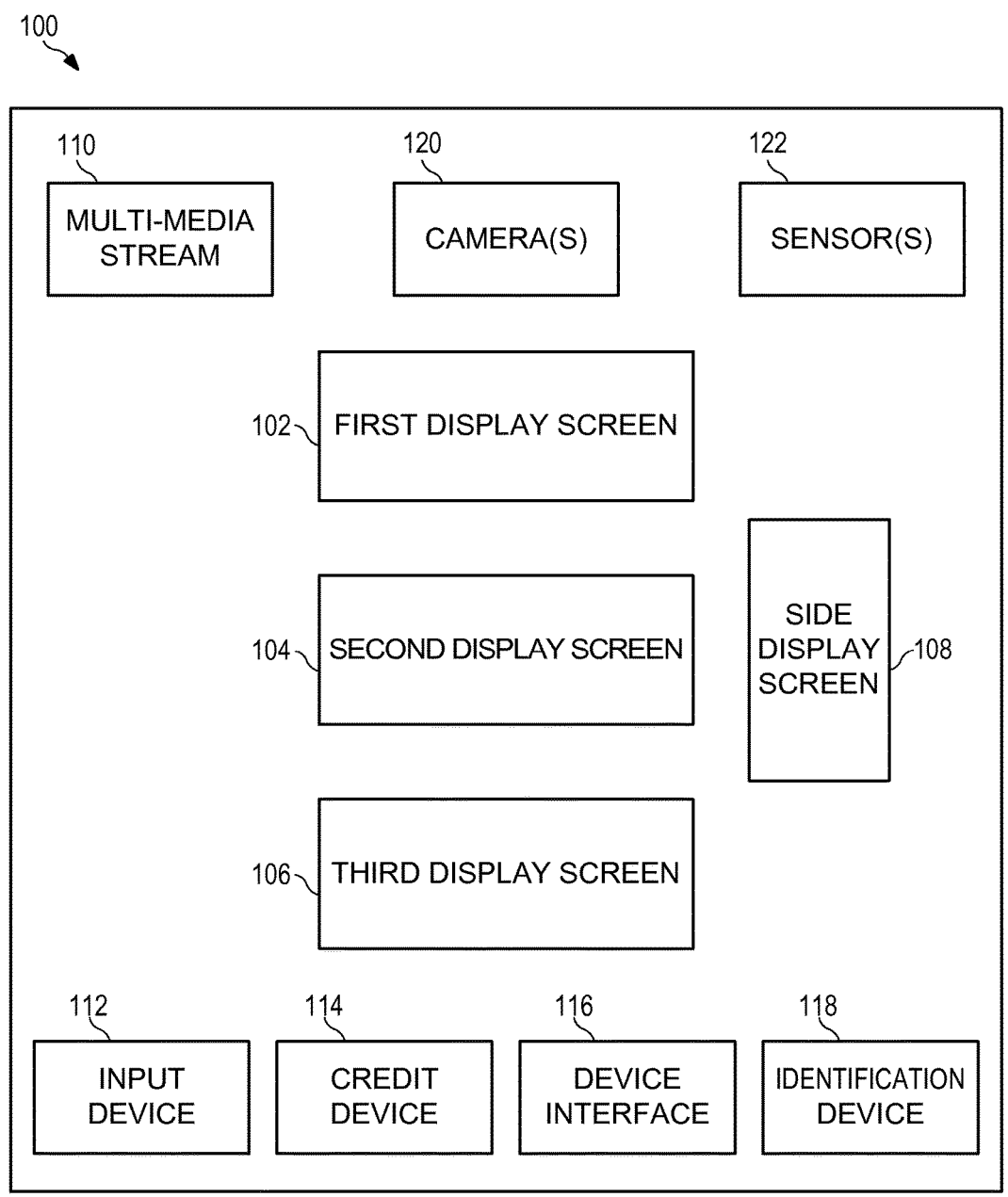
FIG. 1 is an illustration of the electronic gaming device, according to one embodiment.

FIG. 1 is an illustration of an electronic gaming device 100. Electronic gaming device 100 may include a multi-media stream 110, a first display screen 102, a second display screen 104, a third display screen 106, a side display screen 108, an input device 112, a credit device 114, a device interface 116, and an identification device 118. Electronic gaming device 100 may display one, two, a few, or a plurality of multi-media streams 110, which may be obtained from one or more gaming tables, one or more electronic gaming devices, a central server, a video server, a music server, an advertising server, another data source, and/or any combination thereof.

Multi-media streams may be obtained for an entertainment event, a wagering event, a promotional event, a promotional offering, an advertisement, a sporting event, any other event, and/or any combination thereof. For example, the entertainment event may be a concert, a show, a television program, a movie, an Internet event, and/or any combination thereof. In another example, the wagering event may be a poker tournament, a horse race, a car race, and/or any combination thereof. The advertisement may be an advertisement for a casino, a restaurant, a shop, any other entity, and/or any combination thereof. The sporting event may be a football game, a baseball game, a hockey game, a basketball game, any other sporting event, and/or any combination thereof. These multi-media streams may be utilized in combination with the gaming table video streams.

Input device 112 may be mechanical buttons, electronic buttons, mechanical switches, electronic switches, optical switches, a slot pull handle, a keyboard, a keypad, a touch screen, a gesture screen, a joystick, a pointing device (e.g., a mouse), a virtual (on-screen) keyboard, a virtual (on-screen) keypad, biometric sensor, or any combination thereof. Input device 112 may be utilized to make a wager, to move one or more flush displays (and/or a portion thereof), to select one or more reel gaming functionality, to control any object (e.g., a tool, a person, an image, a selection option, etc.), to select one or more pattern gaming options, to obtain data relating to historical payouts, to select a row and/or column to move, to select a row area to move, to select a column area to move, to select a symbol (or image) to move, to modify electronic gaming device 100 (e.g., change sound level, configuration, font, language, etc.), to select a movie or song, to select live multi-media streams, to request services (e.g., drinks, slot attendant, manager, etc.), to select two-dimensional ("2D") game play, to select three-dimensional ("3D") game play, to select both two-dimensional and three-dimensional game play, to change the orientation of games in a three-dimensional space, to move a symbol (e.g., wild, multiplier, etc.), and/or any combination thereof. These selections may occur via any other input device (e.g., a touch screen, voice commands, etc.). Input device 112 may be any control panel.

Credit device 114 may be utilized to collect monies and distribute monies (e.g., cash, vouchers, etc.). Credit device 114 may interface with a mobile device to electronically transmit money and/or credits. Credit device 114 may interface with a player's card to exchange player points.

Device interface 116 may be utilized to interface electronic gaming device 100 to a bonus game device, a local area progressive controller, a wide area progressive controller, a progressive sign controller, a peripheral display device, signage, a promotional device, network components, a local network, a wide area network, remote access equipment, a slot monitoring system, a slot player tracking system, the Internet, a server, and/or any combination thereof.

Device interface 116 may be utilized to connect a player to electronic gaming device 100 through a mobile device, card, keypad, identification device 118, and/or any combination thereof. Device interface 116 may include a docking station by which a mobile device is plugged into electronic gaming machine 100. Device interface 116 may include an over the air connection by which a mobile device is connected to electronic gaming machine 100 (e.g., Bluetooth, Near Field technology, and/or Wi-Fi technology). Device interface 116 may include a connection to identification device 118.

Identification device 118 may be utilized to determine an identity of a player. Based on information obtained by identification device 118, electronic gaming device 100 may be reconfigured. For example, the language, sound level, music, placement of multi-media streams, one or more reel gaming functionality may be presented, a repeat payline gaming option may be presented, a pattern gaming option may be presented, historical gaming data may be presented, a row rearrangement option may be presented, a column rearrangement option may be presented, a row area rearrangement option may be presented, a column area rearrangement option may be presented, a two-dimensional gaming option may be presented, a three-dimensional gaming option may be presented, and/or the placement of gaming options may be modified based on player preference data. For example, a player may want to have game play which has only a specific type of reel gaming functionality (e.g., 3D gaming options). Therefore, no games without 3D reel gaming functionality would be presented. In another example, the player may only want to play games that include pattern gaming options only. Therefore, only games which include pattern gaming options would be presented to the player. In another example, the player may only want to play games that include historical information relating to game play. Therefore, only games which include historical gaming data would be presented to the player. The player may want game play with a specific variance (e.g., low payout variance, average payout variance, high payout variance, etc.). Therefore, only games with the specific payout variance would be displayed. These examples may be combined.

Identification device 118 may utilize biometrics (e.g., thumb print, retinal scan, or other biometric). Identification device 118 may include a card entry slot into input device 112. Identification device 118 may include a keypad with an assigned pin number for verification. Identification device 118 may include multiple layers of identification for added security. For example, a player could be required to enter a player tracking card, and/or a pin number, and/or a thumb print, and/or any combination thereof. Based on information obtained by identification device 118, electronic gaming device 100 may be reconfigured. For example, the language, sound level, music, placement of video streams, placement of images, and the placement of gaming options utilized may be modified based on a player's preference data. For example, a player may have selected baseball under the sporting event preferences; electronic gaming device 100 will then automatically display the current baseball game onto side display screen 108 and/or an alternate display screen as set in the player's options.

First display screen 102 may be a liquid crystal display ("LCD"), a cathode ray tube display ("CRT"), organic light-emitting diode display ("OLED"), plasma display panel ("PDP"), electroluminescent display ("ELD"), a light-emitting diode display ("LED"), or any other display technology. First display screen 102 may be used for displaying primary games or secondary (bonus) games, advertising, player attractions, electronic gaming device 100 configuration parameters and settings, game history, accounting meters, events, alarms, and/or any combination thereof. Second display screen 104, third display screen 106, side display screen 108, and any other screens may utilize the same technology as first display screen 102 and/or any combination of technologies.

First display screen 102 may also be virtually combined with second display screen 104. Likewise second display screen 104 may also be virtually combined with third display screen 106. First display screen 102 may be virtually combined with both second display screen 104 and third display screen 106. Any combination thereof may be formed.

The presentations associated with one or more gaming options may be presented on one, a few, and/or a plurality of screens. These presentations associated with one or more reel gaming functionalities may be displayed on a portion of one, a few, and/or a plurality of these screens.

For example, a single large image could be partially displayed on second display screen 104 and partially displayed on third display screen 106, so that when both display screens are put together they complete one image. Electronic gaming device 100 may stream or play prerecorded multimedia data, which may be displayed on any display combination.

Figure 2:
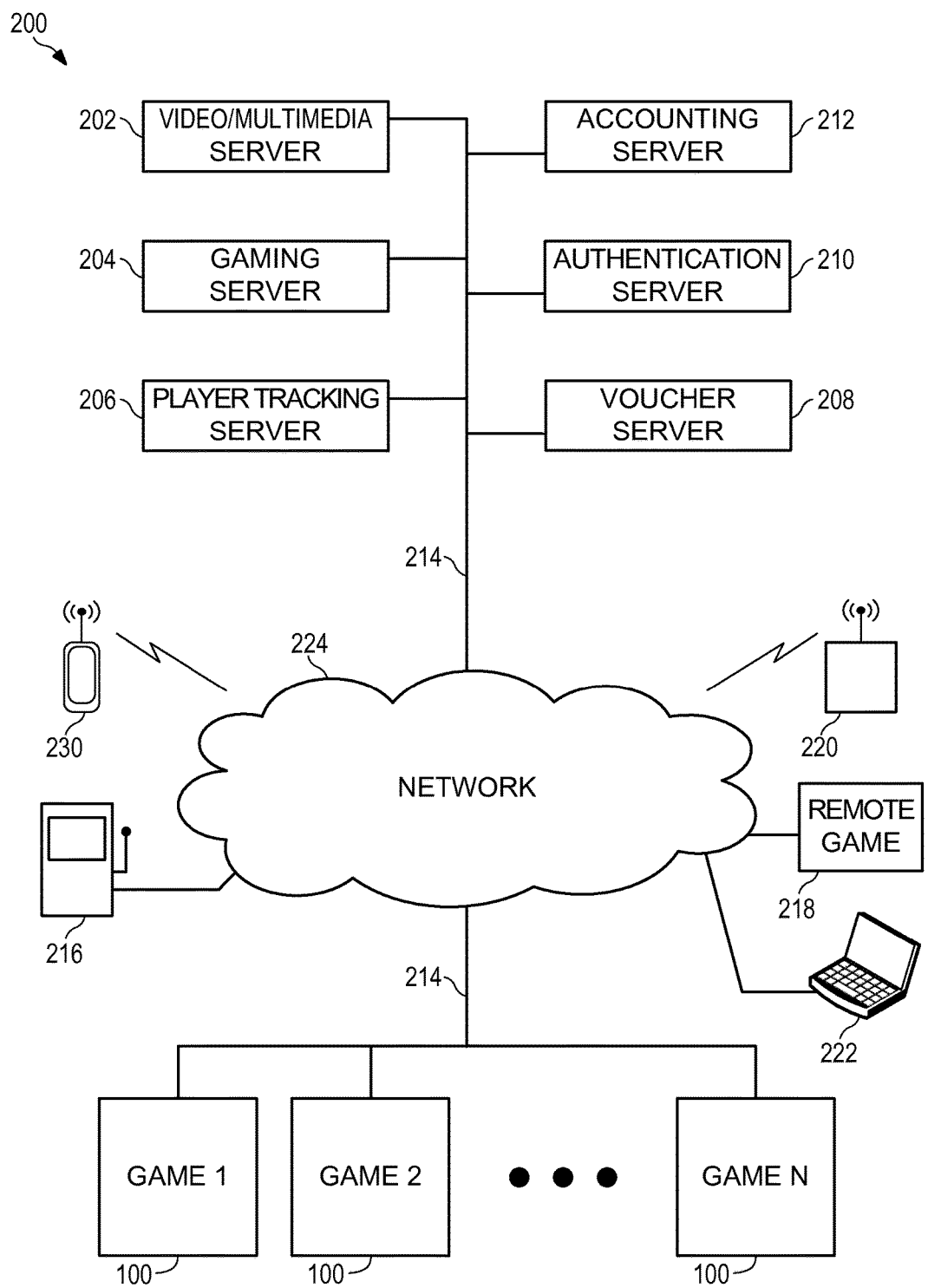
FIG. 2 is an illustration of an electronic gaming system, according to one embodiment.

In FIG. 2, an electronic gaming system 200 is shown. Electronic gaming system 200 may include a video/multimedia server 202, a gaming server 204, a player tracking server 206, a voucher server 208, an authentication server 210, and an accounting server 212.

Electronic gaming system 200 may include video/multimedia server 202, which may be coupled to network 224 via a network link 214. Network 224 may be the Internet, a private network, and/or a network cloud. One or more video streams may be received at video/multimedia server 202 from other electronic gaming devices 100. Video/multimedia server 202 may transmit one or more of these video streams to a mobile phone 230, electronic gaming device 100, a remote electronic gaming device at a different location in the same property 216, a remote electronic gaming device at a different location 218, a laptop 222, and/or any other remote electronic device 220. Video/multimedia server 202 may transmit these video streams via network link 214 and/or network 224.

For example, a remote gaming device at the same location may be utilized at a casino with multiple casino floors, a casino that allows wagering activities to take place from the hotel room, a casino that may allow wagering activities to take place from the pool area, etc. In another example, the remote devices may be at another location via a progressive link to another casino, and/or a link within a casino corporation that owns numerous casinos (e.g., MGM, Caesars, etc.).

Gaming server 204 may generate gaming outcomes. Gaming server 204 may provide electronic gaming device 100 with game play content. Gaming server 204 may provide electronic gaming device 100 with game play math and/or outcomes. Gaming server 204 may provide one or more of a payout functionality, a reel gaming functionality, a reel gaming evaluation functionality, other game functionality, and/or any other virtual game functionality.

Player tracking server 206 may track a player's betting activity, a player's preferences (e.g., language, font, sound level, drinks, etc.). Based on data obtained by player tracking server 206, a player may be eligible for gaming rewards (e.g., free play), promotions, and/or other awards (e.g., complimentary food, drinks, lodging, concerts, etc.).

Voucher server 208 may generate a voucher, which may include data relating to gaming. Further, the voucher may include payline structure option selections. In addition, the voucher may include reel gaming play data, repeat payline data, pattern data, historical payout data, column data, row data, and/or symbols that were modified.

Authentication server 210 may determine the validity of vouchers, player's identity, and/or an outcome for a gaming event.

Accounting server 212 may compile, track, and/or monitor cash flows, voucher transactions, winning vouchers, losing vouchers, and/or other transaction data. Transaction data may include the number of wagers, the size of these wagers, the date and time for these wagers, the identity of the players making these wagers, and/or the frequency of the wagers. Accounting server 212 may generate tax information relating to these wagers. Accounting server 212 may generate profit/loss reports for players' tracked outcomes.

Network connection 214 may be used for communication between dedicated servers, thin clients, thick clients, back-office accounting systems, etc.

Laptop computer 222 and/or any other electronic devices (e.g., mobile phone 230, electronic gaming device 100, etc.)

may be used for downloading new gaming device applications or gaming device related firmware through remote access.

Laptop computer 222 and/or any other electronic device (e.g., mobile phone 230, electronic gaming device 100, etc.) may be used for uploading accounting information (e.g., cashable credits, non-cashable credits, coin in, coin out, bill in, voucher in, voucher out, etc.).

Network 224 may be a local area network, a casino premises network, a wide area network, a virtual private network, an enterprise private network, the Internet, or any combination thereof. Hardware components, such as network interface cards, repeaters and hubs, bridges, switches, routers, firewalls, or any combination thereof may also be part of network 224.

A statistics server may be used to maintain data relating to historical game play for one or more electronic gaming devices 100. This historical data may include winning amounts, winning data (e.g., person, sex, age, time on machine, amount of spins before winning event occurred, etc.), fastest winning event reoccurrence, longest winning event reoccurrence, average frequencies of winning events, average winning amounts, highest winning amount, lowest winning amount, locations for winning events, winning event dates, winning machines, winning game themes, and/or any other data relating to game play.

Statistics server may include data relating to one or more reel based game plays. This data may include the number of times a specific item (e.g., a first part of reel one, reel one, a first part of reel two, a second part of reel two, a rose, a star, etc.) was selected and/or replaced. The frequency of any specific item being selected and the amount won. This data may also include data relating to any interrelationship of elements. For example, when a first part of reel one is replaced with a first replacement symbol, then 30% of the time a second part of reel one is replaced with the first replacement symbol, and then 15% of the time a third part of reel one is replaced with the first replacement symbol. In another example, when a first part of reel one is replaced with a first replacement symbol, then 45% of the time a second part of reel two is replaced with the second replacement symbol, and then 10% of the time a third part of reel three is replaced with the third replacement symbol. In another example, when the star is selected, the player selects a rose on 75% of the time. Further, this selection pairing results in a winning result 55% of the time. This data may include the number of times a specific item (e.g., a tool, a movement pattern (e.g., jump up and to the right, etc.) was selected. The frequency of any specific item being selected and the amount won. This data may also include data relating to any interrelationship of elements. For example, when the rope is utilized, the player selects an upper right symbol to utilize the rope on 75% of the time. Further, this selection pairing results in a winning result 55% of the time. In another example, when the latter is selected as the tool to be utilized by the player, the player uses the latter to go up (instead of down or across) 63% of the time. Further, this selection pairing results in a winning result 79% of the time.

Figure 3:
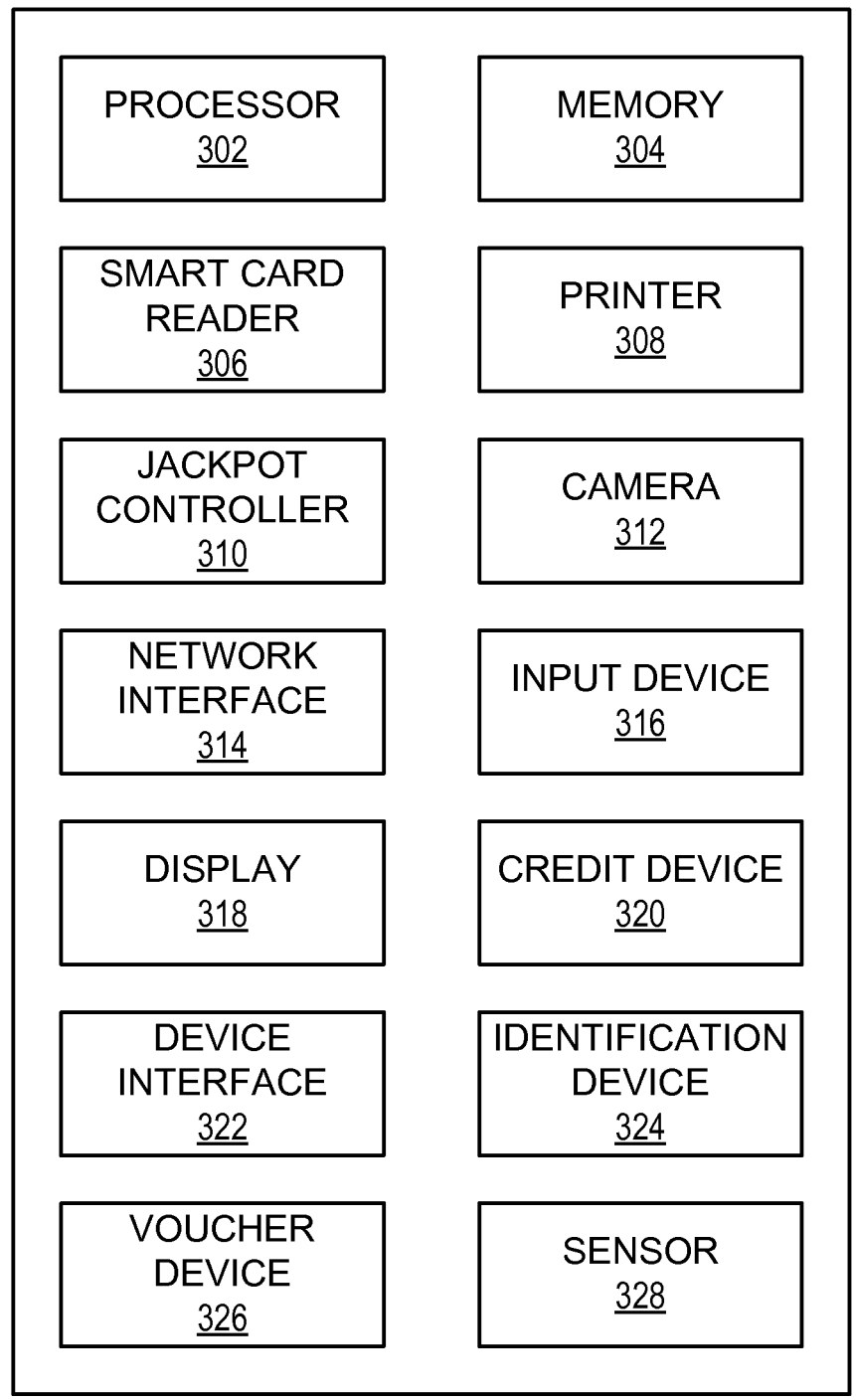
FIG. 3 is a block diagram of the electronic gaming device, according to one embodiment.

FIG. 3 shows a block diagram 300 of electronic gaming device 100. Electronic gaming device 100 may include a processor 302, a memory 304, a smart card reader 306, a printer 308, a jackpot controller 310, a camera 312, a network interface 314, an input device 316, a display 318, a credit device 320, a device interface 322, an identification device 324, a voucher device 326, and one or more sensors 328.

Processor 302 may execute program instructions of memory 304 and use memory 304 for data storage. Processor 302 may also include a numeric co-processor, or a graphics processing unit (or units) for accelerated video encoding and decoding, and/or any combination thereof.

Processor 302 may include communication interfaces for communicating with electronic gaming device 100, electronic gaming system 200, and user interfaces to enable communication with all gaming elements. For example, processor 302 may interface with memory 304 to access a player's mobile device through device interface 322 to display contents onto display 318. Processor 302 may generate a voucher based on a wager confirmation, which may be received by an input device, a server, a mobile device, and/or any combination thereof. A voucher device may generate, print, transmit, or receive a voucher. Memory 304 may include communication interfaces for communicating with electronic gaming device 100, electronic gaming system 200, and user interfaces to enable communication with all gaming elements. For example, the information stored on memory 304 may be printed out onto a voucher by printer 308. Videos or pictures captured by camera 312 may be saved and stored on memory 304. Memory 304 may include a confirmation module, which may authenticate a value of a voucher and/or the validity of the voucher. Processor 302 may determine the value of the voucher based on generated voucher data and data in the confirmation module. Electronic gaming device 100 may include a player preference input device. The player preference input device may modify a game configuration. The modification may be based on data from the identification device.

Memory 304 may be non-volatile semiconductor memory, such as read-only memory ("ROM"), erasable programmable read-only memory ("EPROM"), electrically erasable programmable read-only memory ("EEPROM"), flash memory ("NVRAM"), Nano-RAM (e.g., carbon nanotube random access memory), and/or any combination thereof.

Memory 304 may also be volatile semiconductor memory such as, dynamic random access memory ("DRAM"), static random access memory ("SRAM"), and/or any combination thereof.

Memory 304 may also be a data storage device, such as a hard disk drive, an optical disk drive such as, CD, DVD, Blu-ray, a solid state drive, a memory stick, a CompactFlash card, a USB flash drive, a Multi-media Card, an xD-Picture Card, and/or any combination thereof.

Memory 304 may be used to store read-only program instructions for execution by processor 302, for the read-write storage for global variables and static variables, read-write storage for uninitialized data, read-write storage for dynamically allocated memory, for the read-write storage of the data structure known as "the stack," and/or any combination thereof.

Memory 304 may be used to store the read-only paytable information for which symbol combinations on a given payline that result in a win (e.g., payout) which are established for games of chance, such as slot games and video poker.

Memory 304 may be used to store accounting information (e.g., cashable electronic promotion in, non-cashable electronic promotion out, coin in, coin out, bill in, voucher in, voucher out, electronic funds transfer in, etc.).

Memory 304 may be used to record error conditions on an electronic gaming device 100, such as door open, coin jam, ticket print failure, ticket (e.g., paper) jam, program error, reel tilt, etc., and/or any combination thereof.

Memory 304 may also be used to record the complete history for the most recent game played, plus some number of prior games as may be determined by the regulating authority.

Smart card reader 306 may allow electronic gaming device 100 to access and read information provided by the player or technician, which may be used for setting the player preferences and/or providing maintenance information. For example, smart card reader 306 may provide an interface between a smart card (inserted by the player) and identification device 324 to verify the identity of a player.

Printer 308 may be used for printing slot machine payout receipts, slot machine wagering vouchers, non-gaming coupons, slot machine coupons (e.g., a wagering instrument with a fixed waging value that can only be used for non-cashable credits), drink tokens, comps, and/or any combination thereof.

Electronic gaming device 100 may include a jackpot controller 310, which may allow electronic gaming device 100 to interface with other electronic gaming devices either directly or through electronic gaming system 200 to accumulate a shared jackpot.

Camera 312 may allow electronic gaming device 100 to take images of a player or a player's surroundings. For example, when a player sits down at the machine their picture may be taken to include his or her image into the game play. A picture of a player may be an actual image as taken by camera 312. A picture of a player may be a computerized caricature of the image taken by camera 312. The image obtained by camera 312 may be used in connection with identification device 324 using facial recognition. Camera 312 may allow electronic gaming device 100 to record video. The video may be stored on memory 304 or stored remotely via electronic gaming system 200. Videos obtained by camera 312 may then be used as part of game play, or may be used for security purposes. For example, a camera located on electronic gaming device 100 may capture videos of a potential illegal activity (e.g., tampering with the machine, crime in the vicinity, underage players, etc.).

Network interface 314 may allow electronic gaming device 100 to communicate with video/multimedia server 202, gaming server 204, player tracking server 206, voucher server 208, authentication server 210, and/or accounting server 212.

Input device 316 may be mechanical buttons, electronic buttons, a touch screen, and/or any combination thereof. Input device 316 may be utilized to make a wager, to select one or more reel gaming functionality, to select one or more game elements, to select one or more theme-based gaming options, to make an offer to buy or sell a voucher, to determine a voucher's worth, to cash in a voucher, to modify electronic gaming device 100 (e.g., change sound level, configuration, font, language, etc.), to select a movie or music, to select live video streams (e.g., sporting event 1, sporting event 2, sporting event 3), to request services (e.g., drinks, manager, etc.), and/or any combination thereof.

Display 318 may show video streams from one or more content sources. Display 318 may encompass first display screen 102, second display screen 104, third display screen 106, side display screen 108, and/or another screen used for displaying video content.

Credit device 320 may be utilized to collect monies and distribute monies (e.g., cash, vouchers, etc.). Credit device 320 may interface with processor 302 to allow game play to take place. Processor 302 may determine any payouts, display configurations, animation, and/or any other functions associated with game play. Credit device 320 may interface with display 318 to display the amount of available credits for the player to use for wagering purposes. Credit device 320 may interface via device interface 322 with a mobile device to electronically transmit money and/or credits. Credit device 320 may interface with a player's pre-established account, which may be stored on electronic gaming system 200, to electronically transmit money and/or credit. For example, a player may have a credit card or other mag-stripe card on file with the location for which money and/or credits can be directly applied when the player is done. Credit device 320 may interface with a player's card to exchange player points.

Electronic gaming device 100 may include a device interface 322 that a user may employ with his or her mobile device (e.g., smart phone) to receive information from and/or transmit information to electronic gaming device 100 (e.g., watch a movie, listen to music, obtain verbal betting options, verify identification, transmit credits, etc.).

Identification device 324 may be utilized to allow electronic gaming device 100 to determine an identity of a player. Based on information obtained by identification device 324, electronic gaming device 100 may be reconfigured. For example, the positions of one or more flush screens (or parts thereof) may be moved, the characteristics (e.g., brightness, contrast, etc.) of one or more flush screens may be modified, the language, sound level, music, placement of video streams, placement of images, placement of gaming options, and/or the tables utilized may be modified based on player preference data.

For example, a player may have selected a specific baseball team (e.g., Atlanta Braves) under the sporting event preferences, the electronic gaming device 100 will then automatically (or via player input) display the current baseball game (e.g., Atlanta Braves vs. Philadelphia Phillies) onto side display screen 108 and/or an alternate display screen as set in the player's options.

A voucher device 326 may generate, print, transmit, or receive a voucher. The voucher may represent a wagering option, a wagering structure, a wagering timeline, a value of wager, a payout potential, a payout, and/or any other wagering data. A voucher may represent an award, which may be used at other locations inside of the gaming establishment. For example, the voucher may be a coupon for the local buffet or a concert ticket.

One or more sensors 328 may include at least two different devices. For example, and discussed in more detail below, one of the at least two different devices may be an active device and/or one of the at least two different devices may be a passive device. In one example, such an active device may generate a wave of measurable energy (e.g., light, radio, etc.). In another example, such a passive device may be able to detect reflected waves generated by such an active device. In another example, such an active device and such a passive device may each communicate data related to their respective activity to a processor, and such processor may translate such data in order to determine the depth and/or image of a scene occurring near electronic gaming device 100.

In one example, a player may be seated on a seat in front of an exemplary gaming system. Gaming system may have a gaming cabinet side, which may be immediately adjacent to gaming cabinet front. The gaming system may be positioned on a base (e.g., pedestal) in order to provide, in association with the seat, a more comfortable environment for the interaction and/or playing of the gaming system. In another example, one or more depth image sensing devices 328 may be located on the gaming cabinet front. In one embodiment, one or more depth image sensing devices 328 may have a first field edge and a second field edge, which together may help define a field angle. For example, the first field edge, the second field edge, and the angle may be 2D representations of a sample segment of a 3D cone-shaped field. In another example, the first field edge, the second field edge, and the field angle may be 2D representations of a sample segment of multiple, partially overlapping 3D cone-shaped fields. It should be appreciated that representations of field angles and field boundaries contained herein may simply be exemplary in nature, and may not intend to limit the extent of any particular field angle and/or field boundary.

In one embodiment, the first field edge, the second field edge, and the field angle may define the limits of a scene, which is capable of being sensed by one or more depth image sensing devices 328. For example, if a portion of a scene occurs outside of both the first field edge and the second field edge, then one or more depth image sensing devices 328 may not recognize such an occurrence, and therefore may not detect any change thereof. In another embodiment, the first field edge, the second field edge, and the field angle may define relative limits of a scene, which is capable of being sensed by one or more depth image sensing devices 328 to a relative degree of certainty. For example, if a portion of a scene repeatedly occurs just above the first field edge, then one or more depth image sensing devices 328 may only recognize such occurrence a percentage of the time (e.g., 10%).

In another example, the first field edge, the second field edge, the field angle, and/or any combination thereof may move and/or shift to obtain one or more scenes. For example, the first field edge and the second field edge may move while keeping the field angle constant. This movement may be based on the movement of one or more objects. In one example, a person moving from scene one to scene two may trigger the movement and/or shifting of the first field edge, the second field edge, the field angle, and/or any combination thereof.

In one embodiment, the player may not be made aware of the first field edge and/or the second field edge. In another embodiment, the player may be made aware of the first field edge and/or the second field edge. This may occur via a display screen, which indicates the viewable area (e.g., sensed area). In one example, one or more depth image sensing devices 328 may include, and/or electronic gaming device 100 may separately include, a visible light generator which may cause a light that is generally visible to the human eye to be generated along the first field edge and/or the second field edge. In one example, such a visible light may be a visible laser. In another example, such a visible light might be a colored light.

In another example, one or more depth image sensing devices 328 includes, and/or electronic gaming device 100 separately includes, a visible light generator which may cause a light that is generally visible to the human eye to be generated along a different field edge from both the first field edge and/or the second field edge. For example, one or more depth image sensing devices 328 may include a visible light generator which generates a visible light having two field edges which are in between the first field edge and/or the second field edge, such that the visible light's field angle is smaller than the field angle. In such an example, such a smaller visible light field angle may be beneficial in informing the player of a more optimal field for which scene changes may be detected.

In another example, one or more depth image sensing devices 328 may include a first source. First source may have a source angle. One or more depth image sensing devices 328 may also include a first sensor, which may have an associated sensor angle. Source angle and sensor angle may together define a first field edge and a second field edge. Together, the first field edge and the second field edge may define a field for which a body may be detected. In another example, the first source may be a light source. In one example, the first source may be a light source that produces a light that is typically not visible to the human eye. In another example, the first source may be an infrared ("IR") light source. In another example, the first sensor may be an active-pixel sensor ("APS"). In another embodiment, the first sensor may be a complementary metal-oxide-semiconductor sensor ("CMOS sensor"). In another embodiment, the first sensor may be a charge-coupled device ("CCD") image sensor. In another embodiment, the first sensor may be an APS imager or an active-pixel image sensor.

In one embodiment, the first source may be a sound source. In one example, the first source may be a sound source that produces a sound that is typically not perceptible to the human ear. In another example, the first source may produce an ultrasonic sound wave. In another example, the first sensor may be a piezoelectric transceiver. In another embodiment, the first sensor may include one or more piezoelectric crystals. In another embodiment, the first sensor may include one or more microphones.

In one embodiment, operation of one or more depth image sensing devices 328 may include the first source generating waves of energy within the source angle, and the first sensor may detect the return, bouncing, and/or distortion of such generated waves within the first sensor angle. For example, the first source may generate an IR light, which may illuminate and reflect or otherwise bounce off of physical objects located within the first field, and the first sensor may be a CMOS sensor, which may detect such reflected IR light. In this manner, it is possible to analyze the resulting data, which may include data about the IR light transmission and the resulting detection of the reflected IR light, to determine the composition of a scene occurring within the first field.

In one embodiment, the composition of a scene and/or body occurring at least partially within an associated field may be determined in a 3D basis (and/or a 2D basis). In one example, one or more depth image sensing devices 328 may help determine the relative depth and/or position of multiple physical objects within an associated field. In another example, the movement of a physical object within an associated field may be detected in a 3D sense, and the associated gaming system may respond to such 3D movements, as discussed more fully below. In one example, one or more depth image sensing devices 328 may help determine the identity of one or more physical objects within an associated field. For example, an IR light source may illuminate a player's hand, and an associated CMOS sensor may detect the reflected IR light off of the player's hand, and the processing of the data from the IR light source and/or the CMOS sensor may then recognize the object within the scene as a player's hand.

In one embodiment, a source may be a laser, which may be beamed across an entire field of play, and a sensor may measure reflected light. In one example, the sensor may detect varying colors of reflected light, and an associated game logic controller may interpret the varying colors to determine objects and/or object depths within the field of play. It should be appreciated that laser light sources may, when reflected off of objects, have different characteristics such as color, depending on the size and/or location of the objects. In one embodiment, the source is a light source. In another embodiment, the source is an IR light source. In one embodiment, the sensor may be an IR video graphics array ("VGA") camera.

In one embodiment, one or more depth image sensing devices 328 may include a capacitive proximity sensor, a capacitive displacement sensor, a doppler effect sensor, an eddy-current sensor, an inductive sensor, a laser rangefinder, a magnetic sensor, a magnetic proximity fuse, a passive optical sensor, a passive thermal infrared sensor, a photocell sensor, a radar, a reflection of ionizing radiation sensor, sonar, an ultrasonic sensor, and/or any combination thereof.

In one embodiment, one or more depth image sensing devices 328 may include a video camera. In one example, such a video camera may detect objects and movement. The data from the video camera may be used to determine a relative 2D position and/or movement of such objects.

In one embodiment, one or more depth image sensing devices 328 may include only a single source and/or only a single sensor. In another embodiment, one or more depth image sensing devices 328 may include multiple sources and/or multiple sensors. In another embodiment, one or more depth image sensing devices 328 may include various-sized sources and sensors. For example, a large depth image sensing device may capture larger movements, such as the moving and/or waving of a player's arm, while a smaller depth image sensing device may capture more fine movements, such as the moving of a player's fingers.

In various embodiments, one or more sources, one or more sensors, one or more field edges, one or more fields, one or more field levels, one or more field strengths, and/or any combination thereof may be moved, shifted, strengthened, weakened, varied, and/or modified in any way to obtain one or more scenes.

In one embodiment, one or more scenes (e.g., moving, static, and/or any other type) may be obtained from one or more gaming devices to generate a bigger scene. For example, a first gaming device may obtain a first scene image of three people doing an activity (e.g., playing an interactive game), a second gaming device may obtain a second scene image of two people doing the same activity, and a third gaming device may obtain a third scene image of four people watching the same activity. In one example, these images (e.g., first scene image, second scene image, and/or third scene image) may be combined to generate an integrated scene of all nine people (e.g., three from first scene image, two from second scene image, and four from third scene image).

In one embodiment, one or more depth image sensing devices 328 may include a video camera. In one example, such a video camera may detect objects and movement. The data from the video camera may be used to determine a relative 2D position and/or movement of such objects. In another example, the 2D data may be combined with 3D data to generate one or more scenes.

In one embodiment, one or more depth image sensing devices may include only a single source and/or only a single sensor. In another embodiment, one or more depth image sensing devices may include multiple sources and/or multiple sensors. In another embodiment, one or more depth image sensing devices may include various-sized sources and sensors. In one example, a single gaming system may include one or more larger sized depth image sensing devices and may also include one or more smaller sized depth image sensing devices. In one example, the use of multiple but different-sized sources and sensors may help in capturing both large scene changes as well as small scene changes, which may add both reliability and functionality to such a gaming system. For example, a large depth image sensing device may capture larger movements, such as the moving and/or waving of a player's arm, while a smaller depth image sensing device may capture more fine movements, such as the moving of a player's fingers.

In various examples, the gaming system may utilized one or more small sized depth image sensing devices (e.g., one or more sources and/or one or more sensors), one or more medium sized depth image sensing devices (e.g., one or more sources and/or one or more sensors), one or more large sized depth image sensing devices (e.g., one or more sources and/or one or more sensors), and/or any combination thereof.

Figure 4:
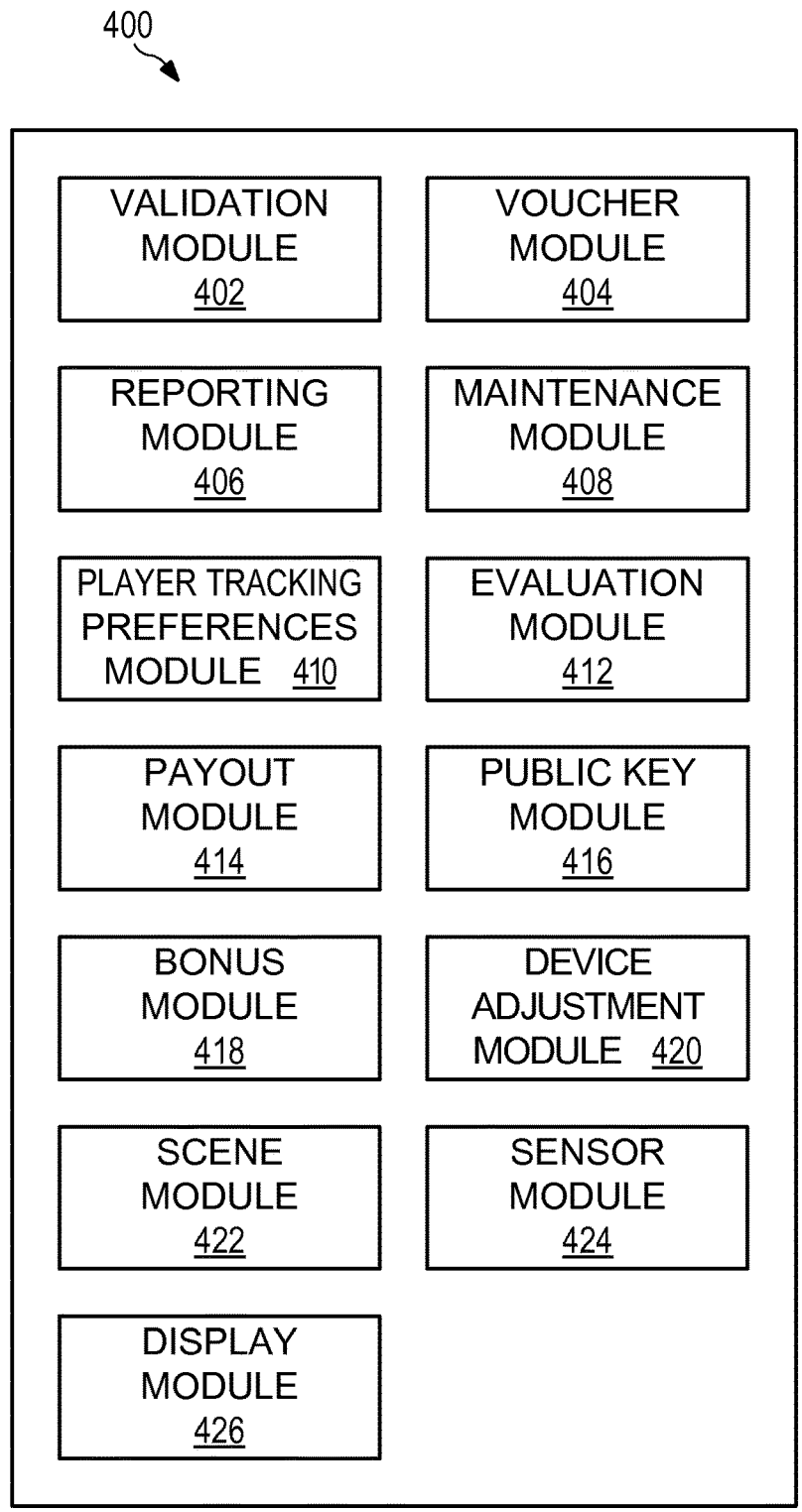
FIG. 4 is another block diagram of the electronic gaming device, according to one embodiment.

FIG. 4 shows a block diagram of memory 304, which includes various modules. Memory 304 may include a validation module 402, a voucher module 404, a reporting module 406, a maintenance module 408, a player tracking preferences module 410, an evaluation module 412, a payout module 414, a scatter module 416, a bonus module 418, a device adjustment module 420, a scene module 422, a sensor module 424, and/or a display module 426.

Validation module 402 may utilize data received from voucher device 326 to confirm the validity of the voucher.

Voucher module 404 may store data relating to generated vouchers, redeemed vouchers, bought vouchers, and/or sold vouchers.

Reporting module 406 may generate reports related to a performance of electronic gaming device 100, electronic gaming system 200, video streams, gaming objects, credit device 114, and/or identification device 118.

Maintenance module 408 may track any maintenance that is implemented on electronic gaming device 100 and/or electronic gaming system 200. Maintenance module 408 may schedule preventative maintenance and/or request a service call based on a device error.

Player tracking preferences module 410 may compile and track data associated with a player's preferences.

Evaluation module 412 may evaluate one or more outcomes for one or more events which may not be based on one or more outcomes for one or more reel games. Evaluation module 412 may evaluate one or more outcomes for one or more events which may be based on one or more outcomes for one or more reel games.

Payout module 414 may determine one or more payouts which may relate to one or more inputs received from the player, electronic gaming device 100, and/or electronic gaming system 200. Payout module 418 may determine one or more payouts based on one or more selections.

Scatter module 416 may determine one or more scatter structures and/or store any data relating to one or more scatter symbols.

Bonus module 418 may generate a bonus game, evaluate the results of the bonus game, trigger bonus game presentations, generate bonus game payouts, and/or display any data relating to the bonus game.

Device adjustment module 420 may generate, compile, transmit, and/or store instructions to move one or more devices, generate commands to move one or more devices, movement history, and/or any combination thereof.

Scene module 422 may generate, compile, transmit, and/or store one or more scene data, one or more scenes, one or more reference models, one or more game play data, one or more player profiles, and/or any combination thereof.

Sensor module 424 may generate, compile, transmit, and/or store any data relating to one or more scene data, one or more scene, and/or any other sensor data. This data may include one or more gestures (e.g., body movement made by one or more players).

Sensor and scene evaluation module may evaluate any data stored on, transmitted to, and/or transmitted from sensor module 424 and scene module 422. Sensor and scene evaluation module may obtain data including one or more gestures (e.g., body movement made by one or more players) from sensor module 424 and compare this data to one or more body reference models, body part reference models, device reference models, gaming device reference models, floor plan reference models, and/or any other reference models from reference models module to determine one or more actions.

Sensor and scene output module may evaluate the combined output of sensor module 424 and scene module 422. Reference models module may generate, compile, transmit, and/or store one or more body reference models, body part reference models, device reference models, gaming device reference models, floor plan reference models, and/or any other reference models which can be utilized by any of the other modules.

Display module 426 may generate, compile, transmit, and/or store one or more display data (e.g., installation date, etc.), display characteristics data, maintenance data (e.g., last maintenance check, maintenance history, etc.), device and/or material movement data, one or more game play data, and/or any combination thereof.

A presentation generation module may generate the presentation data (e.g., visual and audio) relating to one or more game play options. A presentation module may display one or more of the generated presentations.

It should be noted that one or more modules may be combined into one module. Further, there may be one evaluation module where the determined payout does not depend on whether there were any wild symbols, scatter symbols; other reel gaming functionality based game play, and/or any other specific symbols. Further, any module, device, and/or logic function in electronic gaming device 100 may be present in electronic gaming system 200. In addition, any module, device, and/or logic function in electronic gaming system 200 may be present in electronic gaming device 100.

Figure 5:
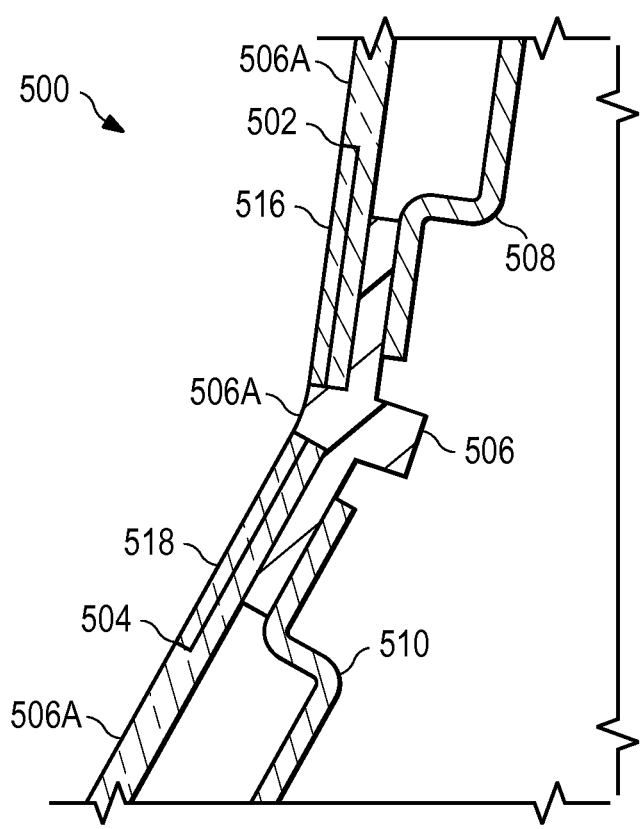
FIG. 5 is partial cross-section view of an adjacent screen mounting system, in accordance with one embodiment, as indicated by cross-section lines of FIG. 6A.
Figure 6A:
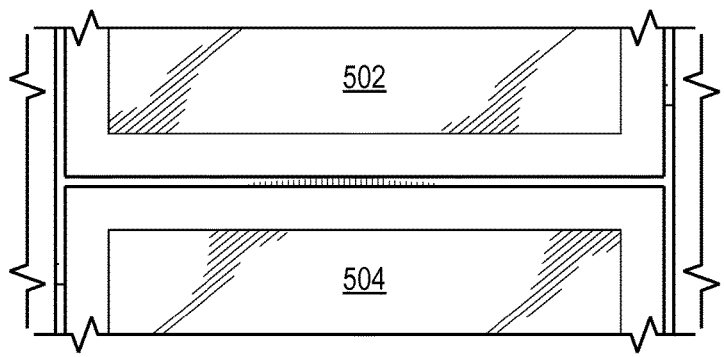
FIG. 6A is an illustration of an exemplary gaming system including adjacent flush mount displays, according to one embodiment.

FIG. 5 is partial cross-section view of an adjacent screen mounting system, in accordance with one embodiment, as indicated by cross-section lines of FIG. 6A. In this example, a first monitor module 502 may be mounted adjacent to a second monitor module 504. In one embodiment, such monitor modules may be mounted in a non-planar manner, as discussed in more detail below. In another embodiment, one or more of the monitor modules may be a liquid crystal display ("LCD"), an organic light emitting display ("OLED"), a plasma display, an organic light emitting transistor ("OLED"), a surface-conduction electron-emitter display ("SED"), a field emission display ("FED"), a quantum dot liquid crystal display, a ferro liquid display ("FLD"), a Thick-film dielectric electroluminescent ("TDEL"), a telescopic pixel display ("TPL"), and/or a laser phosphor display ("LPD").

In one embodiment, a first glass 516 may be mounted in front of first monitor module 502, and/or a second glass 518 may be mounted in front of second monitor module 504. In another embodiment, first glass 516 and/or second glass 518 may be comprised of glass, a glass composite material, sapphire, manufactured sapphire, plastic, and/or other clear material which may also provide protection and/or durability properties. In various embodiments, first glass 516, second glass 518, first monitor module 502, and/or second monitor module 504 may be flush with their surrounding surfaces (e.g., other materials and/or devices).

FIG. 5 also illustrates a first securing strip 506 and one or more additional securing strips 506A. In one embodiment, one or more securing strips may be comprised of plastic. In another embodiment, one or more securing strips may be comprised of rigid or semi-rigid material. In a further embodiment, one or more securing strips may be comprised of a material that has limited and/or no electrical conductivity properties. It is contemplated that securing strips (506 and 506A) may work to help secure a respective monitor module (e.g., 502, 504) and/or a respective glass (e.g., 516, 518) to a gaming system, as discussed in more detail below. It is further contemplated that securing strips may also provide additional advantages, including acting as an electrical insulator between a touchscreen and a metallic frame. It is also contemplated that securing strips (506 and 506A) may also act as a shock absorber for one or more monitor modules (e.g., 502, 504). Gaming systems, such as the one illustrated in FIG. 6A, are often subject to harsh environments which may include intentional or accidental abuse by casino patrons, shocking or jarring movements related to opening and closing of electronic gaming machine doors, and the like, and providing one or more securing elements which help dampen such harsh movements, which may help prolong the longevity of effected electronics and mechanical components.

The one or more shock strips may be comprised of a single color (e.g., opaque black, black, white, red, blue, etc.). In one example, securing strips may be all black. In another embodiment, shock absorption strips may be all white. In another embodiment, discussed more below, one or more shock absorption strips may include branding and/or other messaging. In a further embodiment, one or more shock absorption strips may be comprised of multiple colors. In another example, the one or more shock strips may be colorized and illuminated (e.g., glow). In various examples, the illumination may be a soft glow, a crystal glow, a sparkle glow, any other glowing type, and/or any combination thereof.

FIG. 5 further illustrates an adjacent gasket which may be installed in between adjacent monitor modules (e.g. 502 & 504) and/or adjacent glass (e.g. 516 & 518). In one embodiment, adjacent gasket is comprised of rubber and/or other elastic polymeric material. In another embodiment, adjacent gasket is comprised of plastic, compressed fiber, Polytetrafluoroethylene ("PTFE"), synthetic material, part or wholly recycled material, and/or any combination of one or more thereof. It is contemplated that adjacent gasket may provide shock absorbing properties and/or sealing properties for one or more monitor modules (e.g., 502 & 504) and/or one or more glass components (e.g. 516 & 518). It is further contemplated that adjacent gasket may provide protection to sensitive components, such as a monitor module (e.g. 512 or 514) from foreign debris and/or liquids. It is understood that electronic gaming systems must provide dependable service under rigorous conditions, such as constant use by casino patrons, exposure to smoke and spilled beverages, and other such environmental exposure conditions one might expect in a casino, and it is expressly contemplated that providing one or more adjacent gaskets positioned in between flush mounted monitors may provide significant benefits in preventing such contaminants from affecting one or more components of an electronic gaming system. Further, FIGS. 22-26 show various configurations to limit light, liquid, particles from entering the electronic gaming device and/or the electronic gaming system, and/or from affecting the one or more glass components (e.g., 516 and 518).

FIG. 5 further illustrates one embodiment where, positioned at the backside of first monitor module 502, a first support structure 508 and positioned at the backside of second monitor module 504, a second support structure 510 are arranged. In one embodiment, one or more such support structures may be comprised of rigid or semi-rigid material. In one example, such support structures may be comprised of metal, plastic, wood, rubber, carbon fiber, and/or any combination thereof. In one embodiment, one or more support structures (e.g., 508 and/or 510) may not be attached directly to an associated monitor module (e.g., 502 and/or 504), but rather may be attached directly to one or more adjacent gaskets. In one example, first support structure 508 is attached, via adhesive (as discussed in more detail below) to adjacent gasket, which may itself be attached to first glass 516, and collectively such an arrangement may "sandwich" the associated first monitor module 502 and/or otherwise secure first monitor module 502 in place. In another example, first support structure 508 may be attached via a mechanical securing device (such as a nail, screw, rivet, etc.) to one or more elements of an associated electronic gaming system.

FIG. 6A is an illustration of an exemplary gaming system including adjacent flush mount displays, according to one embodiment. As illustrated at FIG. 6A, the cross-section lines represent a limited view of one embodiment of adjacently flush mounted display devices, as further illustrated in FIG. 5. As is evident from FIG. 6A, one embodiment as disclosed herein may include adjacent flush mounted displays arranged in a non-planar manner.

Figure 6B:
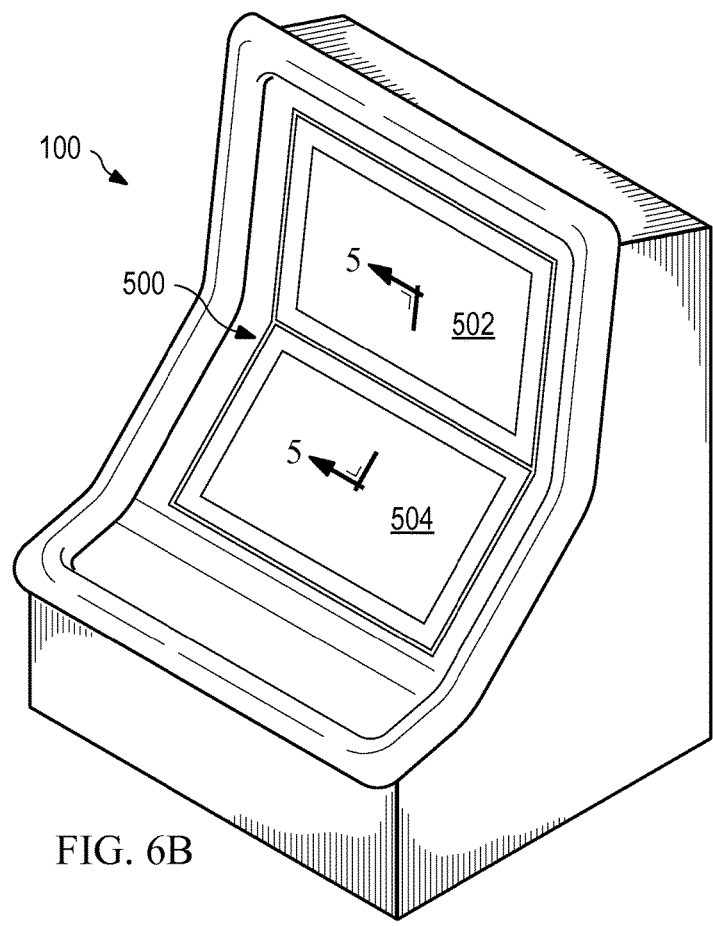
FIG. 6B is another illustration of an exemplary gaming system including adjacent flush mount displays, according to one embodiment.

In FIG. 6B, another illustration of an exemplary gaming system including adjacent flush mount displays is shown, according to one embodiment. In one example, first monitor module 502 and second monitor module 504 may be positioned at various angles (e.g. 0 to 180 degrees) to each other. For example, first monitor module 502 and second monitor module 504 may be positioned at a 1 percent angle to each other. In another example, first monitor module 502 and second monitor module 504 may be positioned at a 5 percent angle to each other. In another example, first monitor module 502 and second monitor module 504 may be positioned at a 7 percent angle to each other. In another example, first monitor module 502 and second monitor module 504 may be positioned at a 10 percent angle to each other. In another example, first monitor module 502 and second monitor module 504 may be positioned at a 13 percent angle to each other. In another example, first monitor module 502 and second monitor module 504 may be positioned at a 15 percent angle to each other. In another example, first monitor module 502 and second monitor module 504 may be positioned at an 18 percent angle to each other. In another example, first monitor module 502 and second monitor module 504 may be positioned at a 20 percent angle to each other. In another example, first monitor module 502 and second monitor module 504 may be positioned at a 25 percent angle to each other. In another example, first monitor module 502 and second monitor module 504 may be positioned at a 26.5 percent angle to each other. In another example, first monitor module 502 and second monitor module 504 may be positioned at a 28.3 percent angle to each other. In another example, first monitor module 502 and second monitor module 504 may be positioned at a 30 percent angle to each other. In another example, first monitor module 502 and second monitor module 504 may be positioned at a 36 percent angle to each other. In another example, first monitor module 502 and second monitor module 504 may be positioned at a 45 percent angle to each other. In another example, first monitor module 502 and second monitor module 504 may be positioned at a 49 percent angle to each other. In another example, first monitor module 502 and second monitor module 504 may be positioned at a 50 percent angle to each other. In another example, first monitor module 502 and second monitor module 504 may be positioned at a 53 percent angle to each other. In another example, first monitor module 502 and second monitor module 504 may be positioned at a 55 percent angle to each other. In another example, first monitor module 502 and second monitor module 504 may be positioned at a 67 percent angle to each other. In another example, first monitor module 502 and second monitor module 504 may be positioned at a 70 percent angle to each other. In another example, first monitor module 502 and second monitor module 504 may be positioned at a 73 percent angle to each other. In another example, first monitor module 502 and second monitor module 504 may be positioned at a 75 percent angle to each other. In another example, first monitor module 502 and second monitor module 504 may be positioned at an 88 percent angle to each other. In another example, first monitor module 502 and second monitor module 504 may be positioned at a 90 percent angle to each other. In another example, first monitor module 502 and second monitor module 504 may be positioned at a 91 percent angle to each other. In another example, first monitor module 502 and second monitor module 504 may be positioned at a 95 percent angle to each other. In another example, first monitor module 502 and second monitor module 504 may be positioned at a 100 percent angle to each other. In another example, first monitor module 502 and second monitor module 504 may be positioned at a 110 percent angle to each other. In another example, first monitor module 502 and second monitor module 504 may be positioned at a 113.1 percent angle to each other. In another example, first monitor module 502 and second monitor module 504 may be positioned at a 115 percent angle to each other. In another example, first monitor module 502 and second monitor module 504 may be positioned at a 118 percent angle to each other. In another example, first monitor module 502 and second monitor module 504 may be positioned at a 120 percent angle to each other. In another example, first monitor module 502 and second monitor module 504 may be positioned at a 125 percent angle to each other. In another example, first monitor module 502 and second monitor module 504 may be positioned at a 125.2 percent angle to each other. In another example, first monitor module 502 and second monitor module 504 may be positioned at a 127 percent angle to each other. In another example, first monitor module 502 and second monitor module 504 may be positioned at a 130 percent angle to each other. In another example, first monitor module 502 and second monitor module 504 may be positioned at a 143 percent angle to each other. In another example, first monitor module 502 and second monitor module 504 may be positioned at a 145 percent angle to each other. In another example, first monitor module 502 and second monitor module 504 may be positioned at a 148 percent angle to each other. In another example, first monitor module 502 and second monitor module 504 may be positioned at a 150 percent angle to each other. In another example, first monitor module 502 and second monitor module 504 may be positioned at a 165 percent angle to each other. In another example, first monitor module 502 and second monitor module 504 may be positioned at a 170 percent angle to each other. In another example, first monitor module 502 and second monitor module 504 may be positioned at a 172 percent angle to each other. In another example, first monitor module 502 and second monitor module 504 may be positioned at a 180 percent angle to each other. In another example, first monitor module 502 and second monitor module 504 may be positioned at a 183 percent angle to each other. In another example, first monitor module 502 and second monitor module 504 may be positioned at a 185 percent angle to each other. In another example, first monitor module 502 and second monitor module 504 may be positioned at a 189 percent angle to each other. In another example, first monitor module 502 and second monitor module 504 may be positioned at a 220 percent angle to each other. In another example, first monitor module 502 and second monitor module 504 may be positioned at a 225 percent angle to each other.

In another example, one or more gaskets, shock absorption material, electrical isolation material, and/or any other material may be utilized between first monitor module 502, second monitor module 504, and/or any other device and/or any other monitoring device to provide electrical isolation, shock absorption, sealing functionality, reduced material wear, and/or allow for material expansion and/or material contractions. In another example, first monitor module 502, second monitor module 504, and/or any other device and/or any other monitoring device may be located in the same plane and/or flush with each other. Further, as shown in FIGS. 22-26, the angled displays (e.g., reference numbers 502 and 504) from FIGS. 6A and 6B may utilize a non-straight channel (see reference numbers 2212 and 2214) between the oversized glass area (see reference number 2202 and the cabinet. This non-straight channel may have one turn, two turns, a few turns, and/or a plurality of turns. These turns can be utilized to minimize and/or eliminate the entry of liquids and/or gases into any other cabinet area. In addition, this non-straight channel may have materials inserted into the non-straight channel which further blocks either liquids and/or gases from entering any other cabinet area.

Figure 7A:
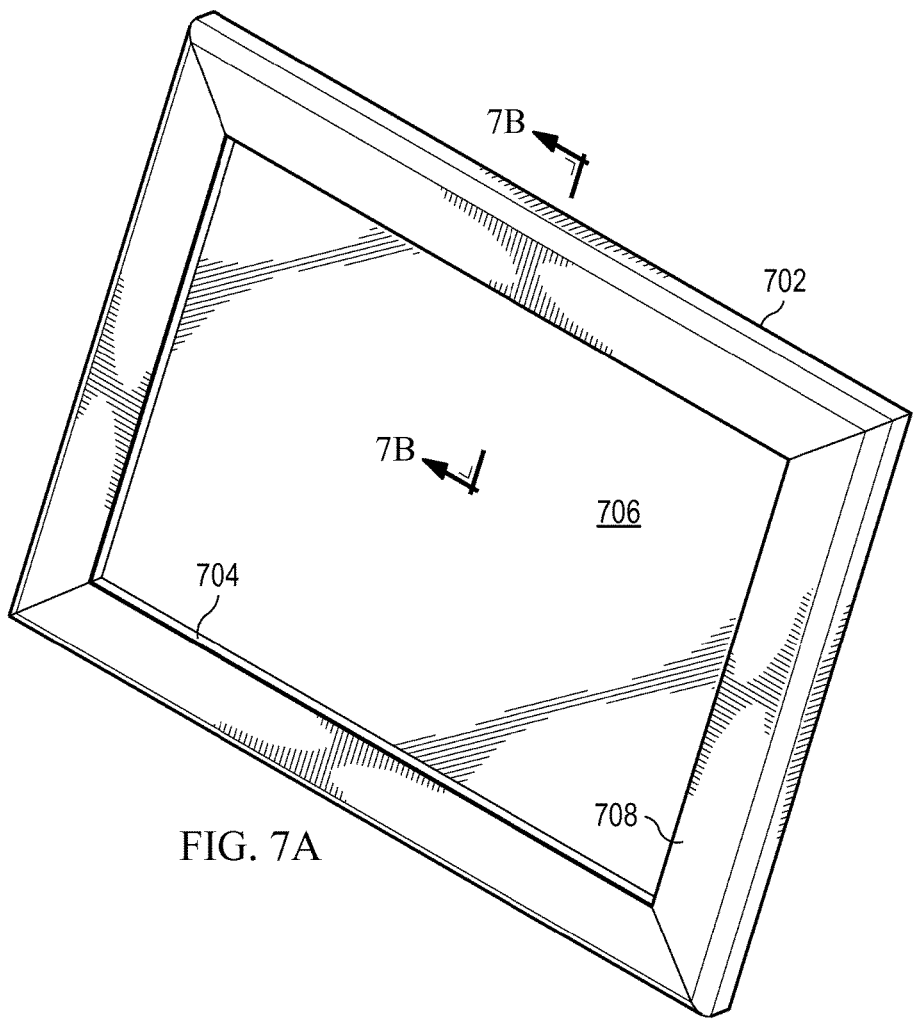
FIG. 7A is an illustration of a display mounting configuration.
Figure 7B:
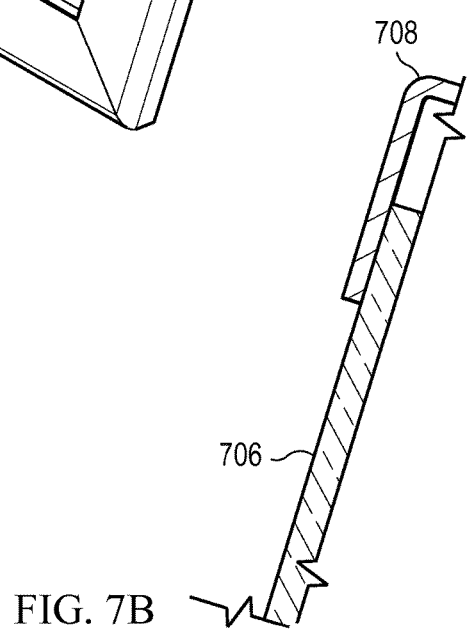
FIG. 7B is a partial cross-section view of the display mounting configuration of FIG. 7A.

FIG. 7A is an illustration of a display mounting configuration. FIG. 7A further includes a cross section area, which is further illustrated in FIG. 7B. In one embodiment, a first display assembly, generally shown at 702, may include front screen 706. Front screen 706 may be comprised of glass, plastic, and/or other clear material. In a further embodiment, first display assembly 702 may include a front securing bracket 708. Front securing bracket 708 may be comprised of rigid and/or semi-rigid material, such as metal, rubber, plastic, and/or like material. In another embodiment, front securing bracket 708 may include a raised edge 704. Raised edge 704 may assist a player in understanding the boundaries of a display but has significant ergonomic disadvantages (e.g., player's hands getting tired, hurt, etc.). For example, front screen 706 may include touchscreen functionality, and raised edge 704 may rub along a player's hand during one or more interactions. Further, raised edge 704 may provide an area for debris to collect, which may in turn cause undesirable effects, such as a dirty and/or unclean appearance of first display assembly 702, or perhaps even cause interference for an associated touchscreen which could cause such touchscreen to work improperly. In another example, the touch screen material may include a low energy surface coating, which may be accomplished utilizing flouropolymers. These coatings may be clear, colorless treatments for one or more surfaces (e.g., glass, tile, plastic, etc.). These flouropolymers may react with the one or more surfaces to generate a low surface coating. This has the benefit of reducing the probability that one or more surfaces will be wetted out with liquids. Another benefit is that soils and liquids do not stick to the one or more surfaces but instead slide-off, which reduces any build-up on the one or more surfaces. In addition, the coating helps the one or more surfaces to resist strains. The coating also reduces any sanitary requirements. These configurations may provide a soft glide on the glass surface (and/or any other surface) that is ergonomically comfortable for the player's dragging fingers.

Figure 8A:
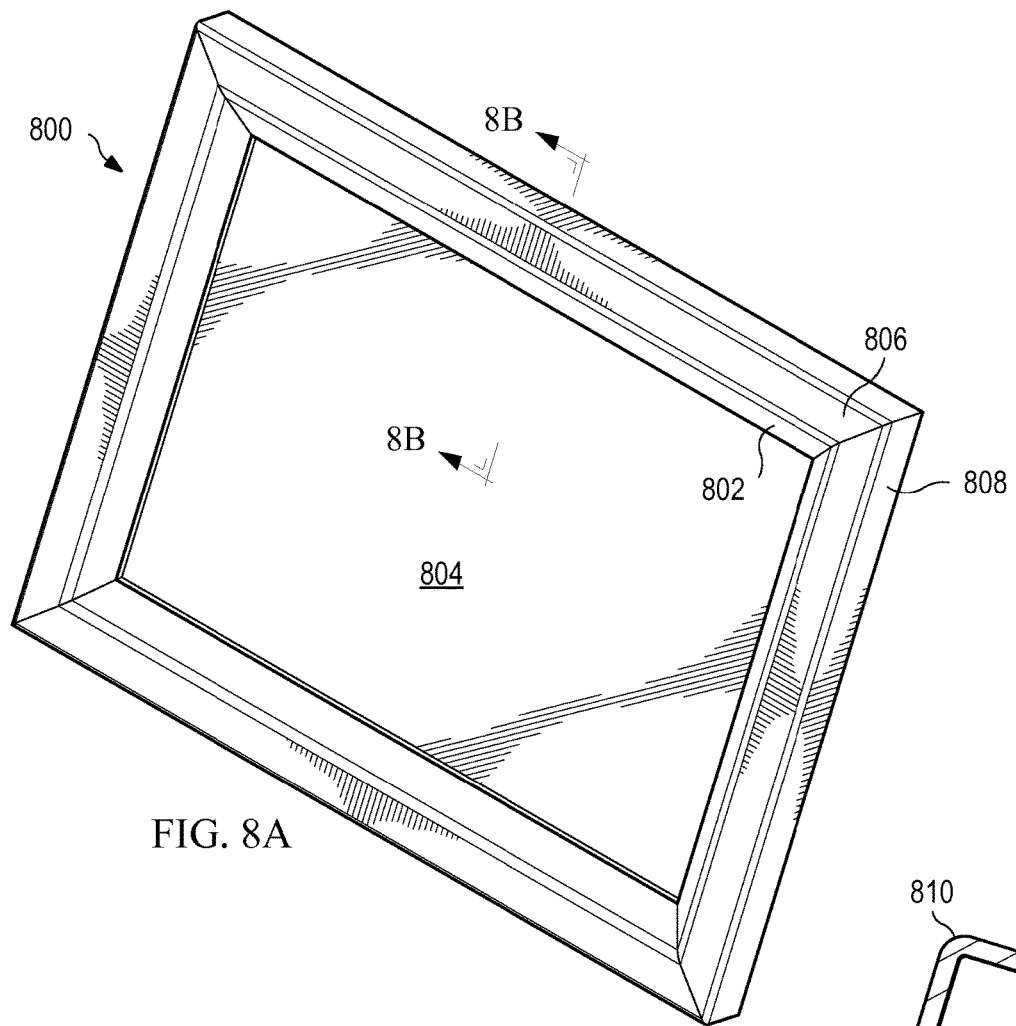
FIG. 8A is an illustration of another display mounting configuration.
Figure 8B:
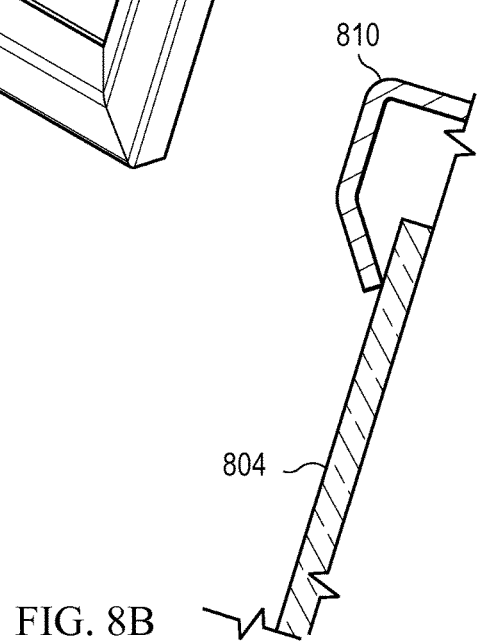
FIG. 8B is a partial cross-section view of the display mounting configuration of FIG. 8A.

FIG. 8A is another illustration of another display mounting configuration. FIG. 8A further includes a cross section area, which is further illustrated in FIG. 8B. In one embodiment, a second display assembly, generally shown at 800, may include front screen 804. Front screen 804 may be comprised of glass, plastic, and/or other clear material. In a further embodiment, second display assembly 800 may include a securing frame 808. Securing frame 808 may be comprised of rigid or semi-rigid material, such as metal, rubber, plastic, and/or like material. In another embodiment, securing frame 808 may include first raised feature 806 and a second raised feature 810. In a further embodiment, securing frame 808 may include a raised edge 802. These raised features create boundaries of a display and have significant ergonomic disadvantages (e.g., player's hands getting tired, hurt, etc.). For example, these raised areas may rub along a player's hand during one or more interactions. Further, these raised areas may provide an area for debris to collect, which may in turn cause undesirable effects, such as a dirty and/or unclean appearance of display assembly, and/or perhaps even cause interference for an associated touchscreen which could cause such touchscreen to work improperly.

Figure 9A:
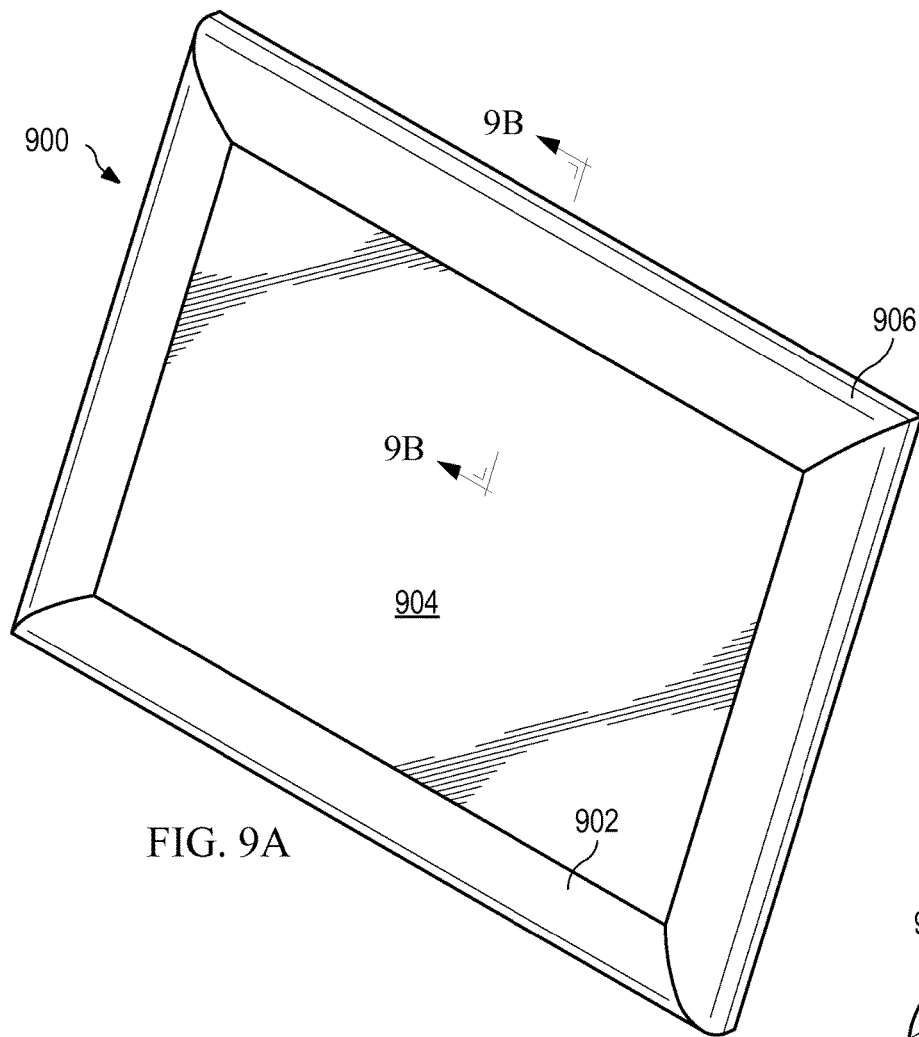
FIG. 9A is an illustration of another display mounting configuration.
Figure 9B:
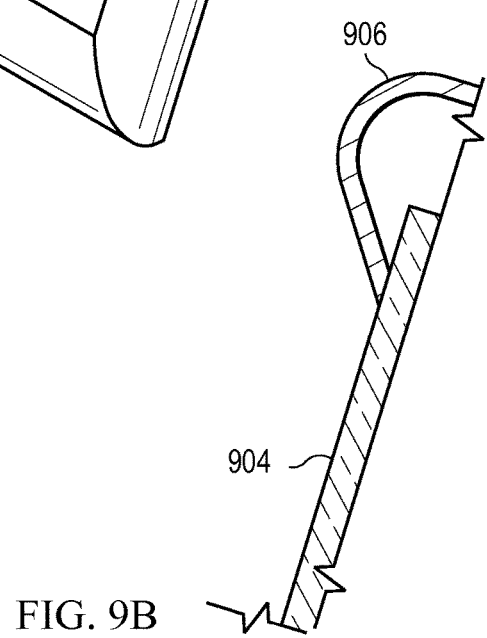
FIG. 9B is a partial cross-section view of the display mounting configuration of FIG. 9A.

FIG. 9A is a further illustration of another display mounting configuration. FIG. 9A further includes a cross section area, which is further illustrated in FIG. 9B. In one embodiment, a third display assembly, generally shown at 900, may include front screen 904. Front screen 904 may be comprised of glass, plastic, or other clear material. In a further embodiment, third display assembly 900 may include a securing frame 906. Securing frame 906 may be comprised of rigid or semi-rigid material, such as metal, rubber, plastic, or like material. In another embodiment, securing frame 906 may include a raised edge 902. These raised features create boundaries of a display and have significant ergonomic disadvantages (e.g., player's hands getting tired, hurt, etc.). For example, these raised areas may rub along a player's hand during one or more interactions. Further, these raised areas may provide an area for debris to collect, which may in turn cause undesirable effects, such as a dirty and/or unclean appearance of display assembly, and/or perhaps even cause interference for an associated touchscreen which could cause such touchscreen to work improperly.

Figure 10:
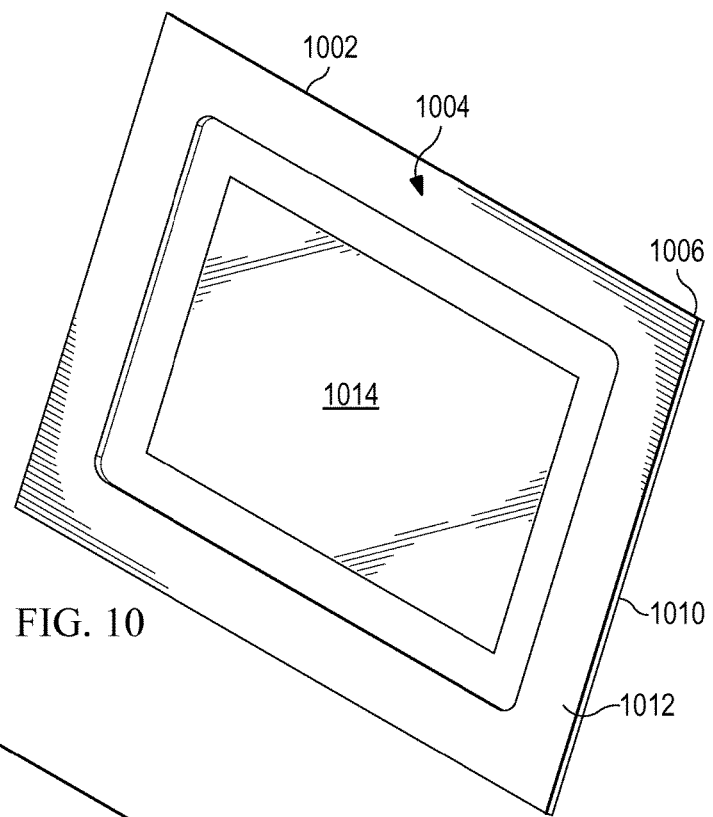
FIG. 10 is an illustration of an exemplary flush mounted display screen, in accordance with one or more embodiments disclosed herein.
Figure 11:
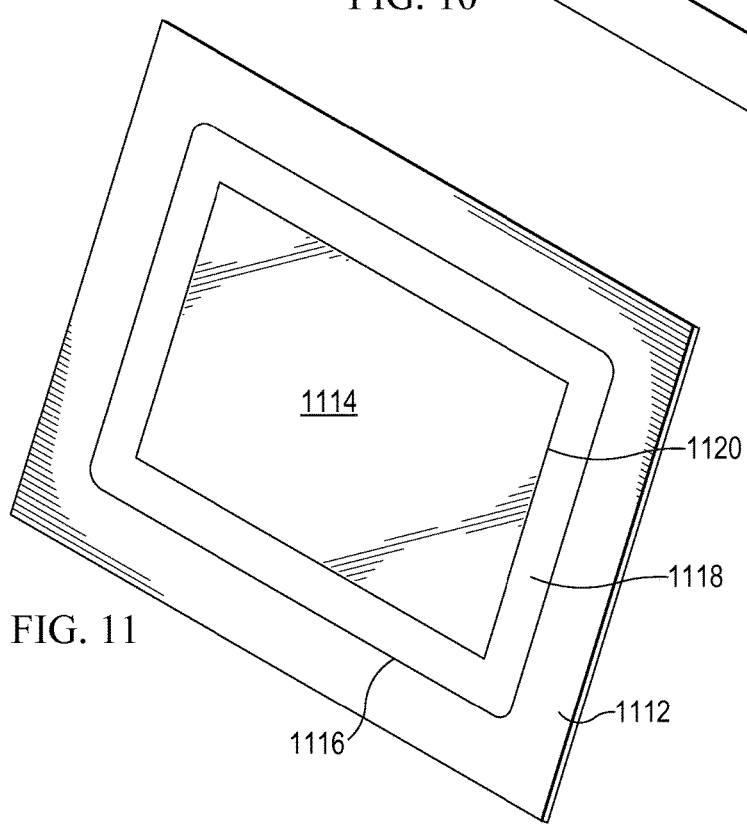
FIG. 11 is another illustration of an exemplary flush mounted display screen, in accordance with one or more embodiments disclosed herein.

FIG. 10 illustrates another example of a flush mounted display, in accordance with one embodiment herein. FIG. 11 illustrates a further example of a flush mounted display in accordance with another embodiment herein. It is to be understood that FIGS. 10 &11 represent different embodiments, and that they are illustrated with common elements strictly as representative examples, and such examples are not to be construed to limit either embodiment.

A first flush mounted display, generally shown at 1002, may include a front glass 1014. As discussed previously, front glass 1014 may be comprised of glass, a glass composite material, sapphire, manufactured sapphire, plastic, and/or other clear material which may also provide protection and/or durability properties. In one embodiment, front glass 1014 may include touchscreen functionality.

First flush mounted display 1002 may include a frame 1012. In one embodiment, frame is comprised of metal or partially metallic material. It is contemplated that metal and/or partially metallic material may provide desirable properties, including being durable while also maintaining a desired appearance. For example, frame 1012 may be comprised of polished aluminum, which may withstand constant use by casino patrons, repeated cleaning by casino staff, and still maintain a desired polished appearance. In another embodiment, frame 1012 may be comprised of plastic. In a further embodiment, frame 1012 may be comprised of other rigid material. Frame 1012 is illustrated with an exemplary frame edge 1006 and a frame depth 1010. In another embodiment, frame 1012 may accommodate a camera 1004. Camera 1004 may be a still camera, a video camera, a web-enabled camera, a digital camera, and/or any combination thereof.

As further illustrated in FIG. 11, a securing strip 1118 (and/or 1206) may have a first flush edge 1116 and a second flush edge 1120, as discussed in more detail below. In one example, second flush edge 1120 forms a first flush surface with front glass 1114. In another example, first flush edge 1116 forms a second flush surface with frame 1112. In one embodiment, first flush edge 1116 and/or second flush edge 1120 are visibly perceptible. In one example, one or more such visually perceptible edges may assist a player in understanding the effective boundaries of an associated display. For example, front glass 1114 may include touchscreen functionality, and first flush edge 1116 may assist a player in recognizing when their physical interactions with an associated display assembly are inside or outside of an associated field of recognition. In another embodiment, first flush edge 1116 and/or second flush edge 1120 are generally not perceptible by a person's touch only. For example, second flush edge 1120 may not be perceptible by a player if they were to generally run their finger over the edge in the standard course of playing an electronic gaming system, but may in some circumstances be perceptible by a player if they were intended (e.g., designed with bumps to allow for the surfaces to be perceived, etc.) on feeling such second flush edge 1120.

Figure 12:
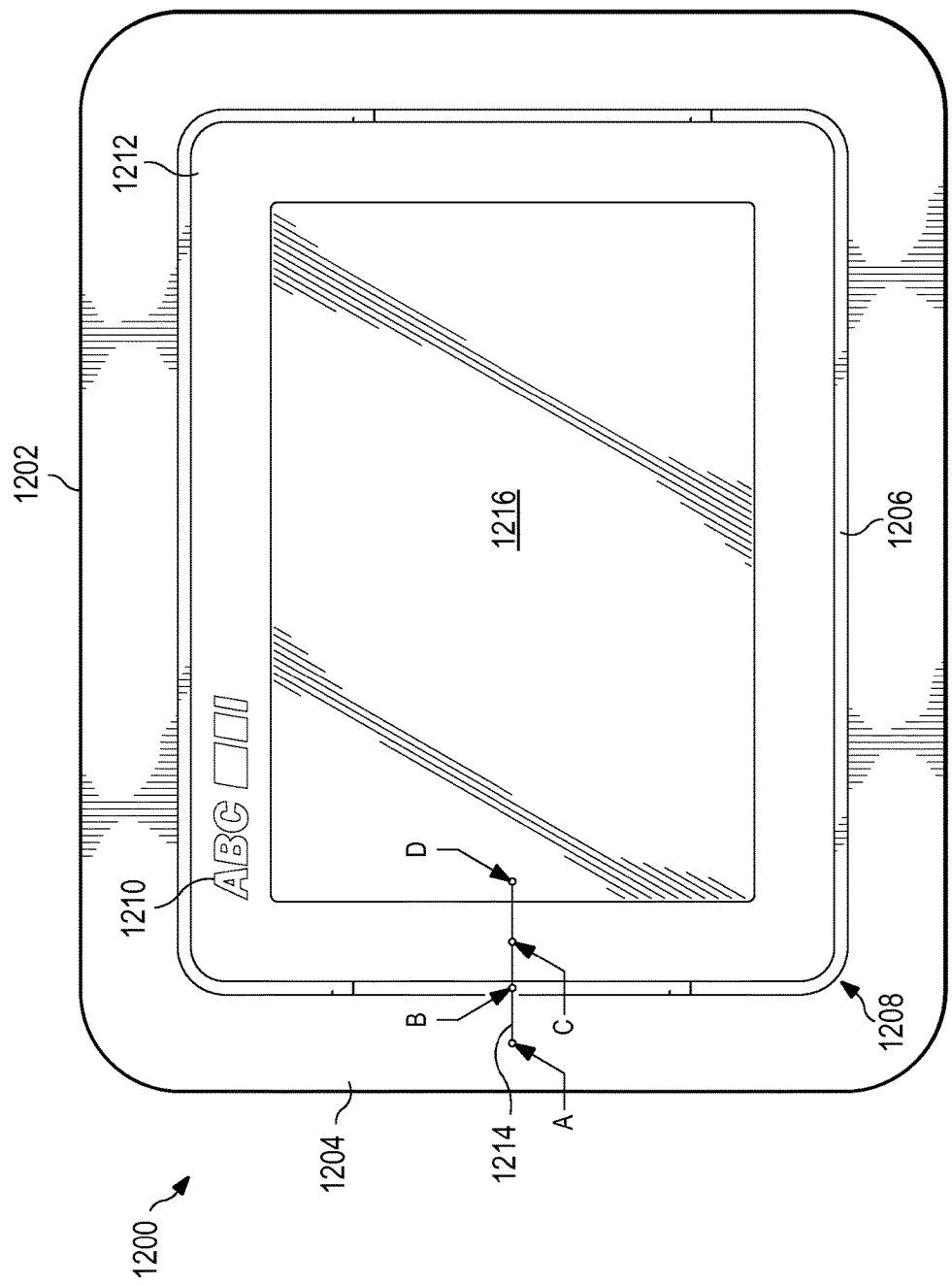
FIG. 12 is another illustration of an exemplary flush mounted display screen, in accordance with one or more embodiments disclosed herein.

FIG. 12 illustrates another exemplary flush mounted display screen, in accordance with one embodiment disclosed herein. In accordance with one embodiment, a flush mounted display, generally shown at 1200, may include a frame 1204. As previously discussed herein, frame 1204 may be comprised of metal, plastic, and/or other rigid or semi-rigid material. Frame 1204 is illustrated in the present embodiment having a frame edge 1202.

FIG. 12 also illustrates flush mounted display 1200 having one or more strips (e.g., 1206, 1212, etc.) which may assist in securing front screen 1216 to frame 1204. In one embodiment, one or more securing strips may be comprised of plastic. In another embodiment, one or more securing strips may be comprised of rigid or semi-rigid material. In a further embodiment, one or more securing strips may be comprised of a material (e.g., an insulator) that has limited and/or no electrical conductivity properties. It is contemplated that one or more securing strips may work to help secure a respective monitor module and/or a respective front screen 1216 to a gaming system. It is further contemplated that one or more securing strips may also provide additional advantages, including acting as an electrical insulator between a touchscreen interface (understood to possibly being combined with front screen 1216) and a frame 1204 (which may be metallic and/or otherwise have electrical conductivity properties). It is also contemplated that one or more securing strips may also act as a shock absorber and/or sealant for an associated display module (e.g., 502 and/or 504 of FIG. 5). Gaming systems, such as the one illustrated in FIG. 6A, are often subject to harsh environments which may include intentional or accidental abuse by casino patrons, shocking or jarring movements related to opening and closing of electronic gaming machine doors, and the like, and providing one or more elements which help dampen such harsh movements may help prolong the longevity of effected electronics and mechanical components.

Further, one or more of the securing strips, first glass, second glass, first display, and/or second display may be moved via one or more movement devices (e.g., motors, springs, etc.). In another example, one or more of the securing strips, first glass, second glass, first display, second display, and/or any other devices may be moved based on a player's input and/or a player's preference. Further, one or more of the securing strips, first glass, second glass, first display, second display, and/or any other devices may be moved for a maintenance procedure and/or any other device procedure (e.g., game play, promotion presentation, etc.).

In another embodiment, one or more securing strips may be comprised of a single color. In one example, securing strips may be all black. In another embodiment, one or more securing strips may be all white. In another embodiment, one or more securing strips may include border display.

In another example, border customization 1210 may be utilized to advertise the brand of the electronic gaming system manufacturer, the branding of the associated gaming system theme, and/or any other desired display. In another embodiment, border customization 1210 may be added material to one or more securing strips, such as a decal, paint, overlay, and/or other such decorative process. In a further embodiment, border customization 1210 may be implemented in the forming or molding process for any device. For example, border customization 1210 may be formed by placing elements of a first material in mold, and then pouring a second material into the mold to form the rest of the device. In still a further embodiment, border customization 1210 may be formed by removing and/or otherwise not including a portion of the device. For example, device may, in a first state, not include part or all of a border customization 1210, but then a puncher or other device removes part of the device in order to leave a punched out border customization 1210. In another example, device is formed in the first place without the material, the absence of which creates the desired border customization 1210.

Illustrated in FIG. 12 is an insulating edge 1206. As discussed above, in one or more embodiments, one or more securing strips may act as an electrical insulator between a touchscreen (generally shown as front screen 1216) and frame 1204, which is contemplated to provide significant benefits. In the present example, insulating edge 1206 is illustrated as being visually perceptible for purposes to illustrating the present embodiment, and it is to be understood that such an insulating edge may and/or may not be visually perceptible.

In one embodiment, one or more securing strips and frame 1204 may form rounded corner 1208. In another embodiment, one or more securing strips and frame 1204 form any other desirable corner style. In a further embodiment, a continuous surface, generally shown at 1214 and associated points A-D, is formed by the assembly of the front screen 1216, one or more securing strips, insulating edge 1206 (again, illustrated for clarity), and frame 1204. As discussed above, in one embodiment, continuous surface 1214 are not generally perceptible by a player's fingers/touch.

In an example, a display 1202 may include frame 1204, insulating edge 1206, rounded corner 1208, border customization 1210, a silk-screen area 1212, continuous surface 1214, and front screen 1216. Continuous surface 1214 may include areas in frame 1204, insulating edge 1206, rounded corner 1208, border customization 1210, silk-screen area 1212, front screen 1216, and/or any other device and/or material. Continuous surface 1214 may be in the same plane and may have a flush surface. This flush surface may not be perceivable to the player. In another example, this flush surface may be perceivable to the player based on utilizing different colors (and/or adding bumps, etc.) for different areas. This flush surface may be flat, curved, and/or any combination thereof.

Display 1202, frame 1204, insulating edge 1206, rounded corner 1208, border customization 1210, silk-screen area 1212, continuous surface 1214, front screen 1216, gaskets, and/or any other area may be utilized as an electrical isolator, mechanical isolator, and/or a shock absorption device.

Figure 13:
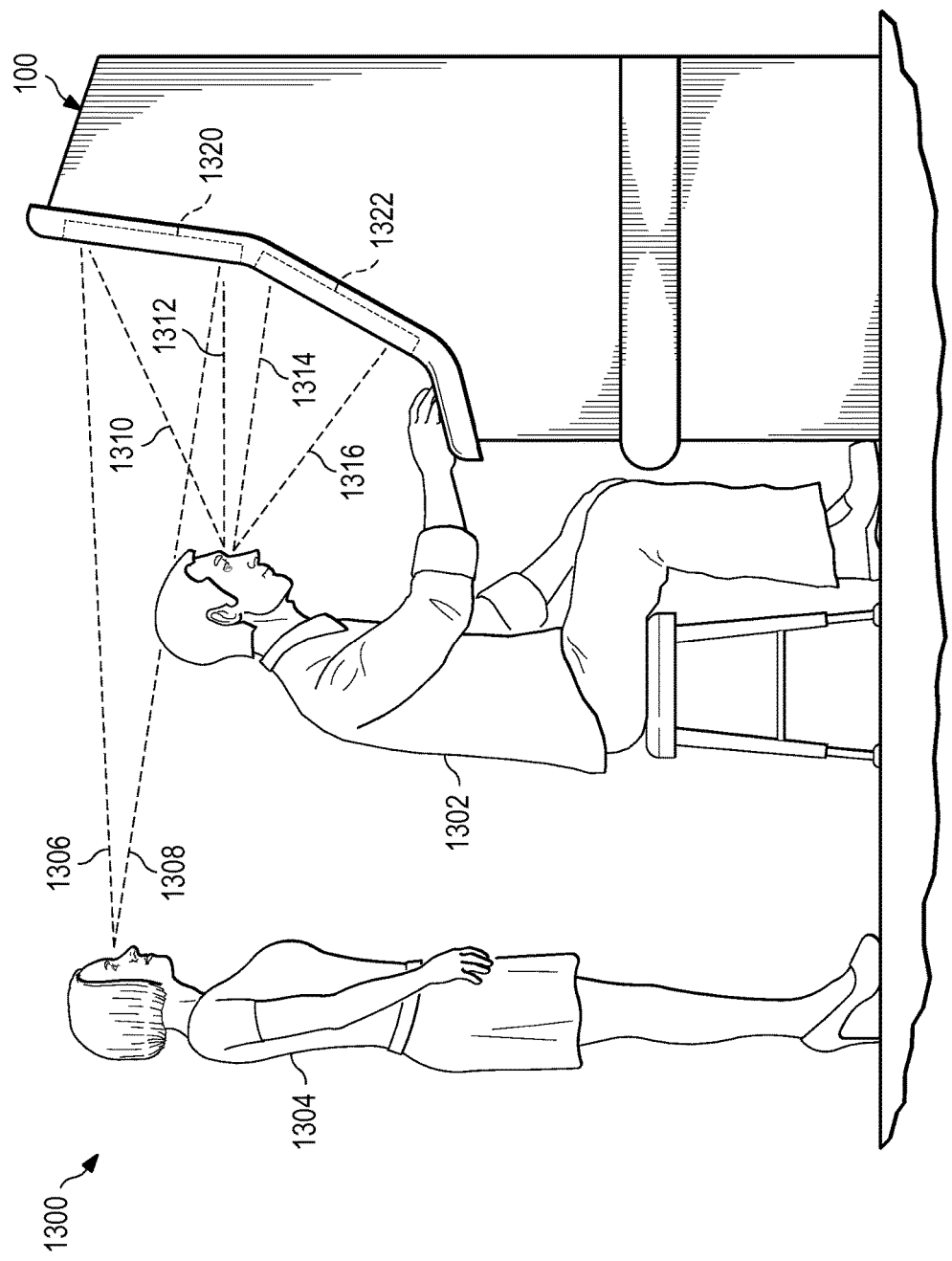
FIG. 13 is another illustration of an exemplary gaming system including adjacent flush mount displays, according to one embodiment.

FIG. 13 is another illustration of an exemplary gaming system including adjacent flush mount displays, according to one embodiment. In the present embodiment, an electronic gaming machine 100 may include a second display assembly 1320 at a more vertical orientation than an adjacent first display assembly 1322. It is contemplated that with such an arrangement, particular advantages may be realized. Specifically, in a typical spectator scenario, generally illustrated at 1300, a spectator 1304 may still be able to view second display 1320 while a seated player 1302 may be able to view both first display 1322 and second display 1320. In one embodiment, first display 1322 and/or second display 1320 may be a flush mounted display assembly as disclosed herein.

Specifically, in a typical spectator scenario 1300, a spectator may have a spectator field of view (FOV), generally delineated by edges 1306 and 1308, of second display assembly 1320. Additionally, in such a typical spectator scenario 1300, a seated player 1302 may have two FOV's, and specifically a player first FOV (generally outlined by edges 1314 and 1316) and a player second FOV (generally outlined by edges 1310 and 1312). It is contemplated that such an arrangement of first display assembly 1322 and second display assembly 1320 may promote interest by other casino patrons as they can easily view second display assembly 1320, which in turn may create interest in the electronic gaming system 100 and excitement to play the associated game. It is further contemplated that such an arrangement, as discussed in more detail below, may provide significant advantages in providing similar optimal viewing angles for multiple persons located around an electronic gaming system.

The one or more flush screens may be positioned at any angle relative to each other. In various examples, first monitor module 502 and second monitor module 504 may be positioned at various angles (e.g. 0 to 360 degrees) to each other. For example, first monitor module 502 and second monitor module 504 may be positioned at a 4 percent angle to each other. In another example, first monitor module 502 and second monitor module 504 may be positioned at a 6 percent angle to each other. In another example, first monitor module 502 and second monitor module 504 may be positioned at an 8 percent angle to each other. In another example, first monitor module 502 and second monitor module 504 may be positioned at a 195 percent angle to each other. In another example, first monitor module 502 and second monitor module 504 may be positioned at a 235 percent angle to each other. In another example, first monitor module 502 and second monitor module 504 may be positioned at a 315 percent angle to each other. In another example, first monitor module 502 and second monitor module 504 may be positioned at a 318 percent angle to each other. In another example, first monitor module 502 and second monitor module 504 may be positioned at a 355 percent angle to each other. In another example, first monitor module 502 and second monitor module 504 may be positioned at a 125.1 percent angle to each other. In another example, first monitor module 502 and second monitor module 504 may be positioned at a 126.5 percent angle to each other. In another example, first monitor module 502 and second monitor module 504 may be positioned at a 281.3 percent angle to each other. In another example, first monitor module 502 and second monitor module 504 may be positioned at a 130 percent angle to each other. In another example, first monitor module 502 and second monitor module 504 may be positioned at a 137 percent angle to each other. In another example, first monitor module 502 and second monitor module 504 may be positioned at a 145 percent angle to each other. In another example, first monitor module 502 and second monitor module 504 may be positioned at a 149 percent angle to each other. In another example, first monitor module 502 and second monitor module 504 may be positioned at a 150 percent angle to each other. In another example, first monitor module 502 and second monitor module 504 may be positioned at a 153 percent angle to each other. In another example, first monitor module 502 and second monitor module 504 may be positioned at a 255 percent angle to each other. In another example, first monitor module 502 and second monitor module 504 may be positioned at a 267 percent angle to each other. In another example, first monitor module 502 and second monitor module 504 may be positioned at a 70 percent angle to each other. In another example, first monitor module 502 and second monitor module 504 may be positioned at a 173 percent angle to each other. In another example, first monitor module 502 and second monitor module 504 may be positioned at a 175 percent angle to each other. In another example, first monitor module 502 and second monitor module 504 may be positioned at a 188.8 percent angle to each other. In another example, first monitor module 502 and second monitor module 504 may be positioned at a 90 percent angle to each other. In another example, first monitor module 502 and second monitor module 504 may be positioned at a 91 percent angle to each other. In another example, first monitor module 502 and second monitor module 504 may be positioned at a 95 percent angle to each other. In another example, first monitor module 502 and second monitor module 504 may be positioned at a 100 percent angle to each other. In another example, first monitor module 502 and second monitor module 504 may be positioned at a 210 percent angle to each other. In another example, first monitor module 502 and second monitor module 504 may be positioned at a 113.3 percent angle to each other. In another example, first monitor module 502 and second monitor module 504 may be positioned at a 115 percent angle to each other. In another example, first monitor module 502 and second monitor module 504 may be positioned at a 118 percent angle to each other. In another example, first monitor module 502 and second monitor module 504 may be positioned at a 133 percent angle to each other. In another example, first monitor module 502 and second monitor module 504 may be positioned at a 105 percent angle to each other. In another example, first monitor module 502 and second monitor module 504 may be positioned at a 125.2 percent angle to each other. In another example, first monitor module 502 and second monitor module 504 may be positioned at a 127 percent angle to each other. In another example, first monitor module 502 and second monitor module 504 may be positioned at a 130 percent angle to each other. In another example, first monitor module 502 and second monitor module 504 may be positioned at a 143 percent angle to each other. In another example, first monitor module 502 and second monitor module 504 may be positioned at a 145 percent angle to each other. In another example, first monitor module 502 and second monitor module 504 may be positioned at a 148 percent angle to each other. In another example, first monitor module 502 and second monitor module 504 may be positioned at a 151 percent angle to each other. In another example, first monitor module 502 and second monitor module 504 may be positioned at a 166 percent angle to each other. In another example, first monitor module 502 and second monitor module 504 may be positioned at a 171 percent angle to each other. In another example, first monitor module 502 and second monitor module 504 may be positioned at a 172 percent angle to each other. In another example, first monitor module 502 and second monitor module 504 may be positioned at a 180 percent angle to each other. In another example, first monitor module 502 and second monitor module 504 may be positioned at a 183 percent angle to each other. In another example, first monitor module 502 and second monitor module 504 may be positioned at a 185 percent angle to each other. In another example, first monitor module 502 and second monitor module 504 may be positioned at a 189 percent angle to each other. In another example, first monitor module 502 and second monitor module 504 may be positioned at a 220.1 percent angle to each other. In another example, first monitor module 502 and second monitor module 504 may be positioned at a 225.5 percent angle to each other.

Figure 14:
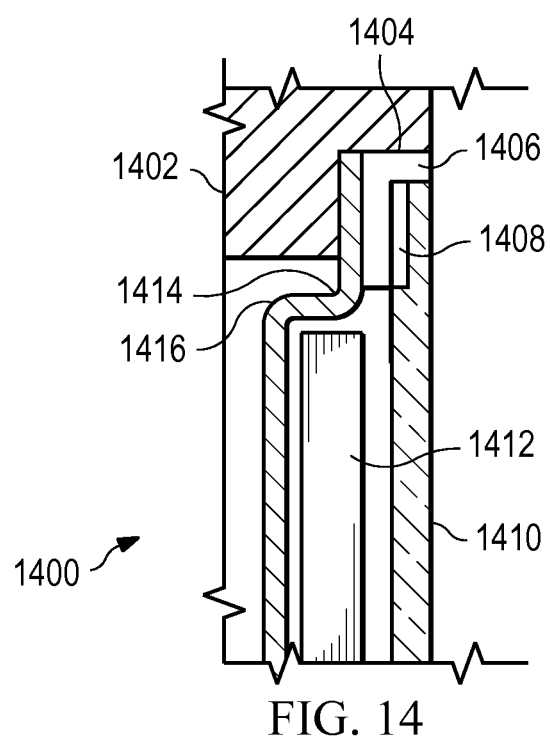
FIG. 14 is a partial cross-section view of a display mounting configuration, in accordance with one or more embodiments disclosed herein.

FIG. 14 is partial cross-section view of a flush mounted screen mounting system, in accordance with one embodiment. In this example, a monitor module 1412 may be mounted within a cabinet body 1402. In one embodiment, monitor module 1412 may be a liquid crystal display ("LCD"), an organic light emitting display ("OLED"), a plasma display, an organic light emitting transistor ("OLED"), a surface-conduction electron-emitter display ("SED"), a field emission display ("FED"), a quantum dot liquid crystal display, a ferro liquid display ("FLD"), a Thick-film dielectric electroluminescent ("TDEL"), a telescopic pixel display ("TPL"), and/or a laser phosphor display ("LPD").

In one embodiment, glass 1410 may be mounted in front of monitor module 1412. In another embodiment, glass 1410 may be comprised of glass, a glass composite material, sapphire, manufactured sapphire, plastic, and/or other clear material which may also provide protection and/or durability properties.

FIG. 14 also illustrates gasket 1406 which may be installed in between glass 1410, cabinet body 1402, and/or support structure 1416. In one embodiment, gasket 1406 is comprised of rubber and/or other elastic polymeric material. In another embodiment, gasket 1406 is comprised of plastic, compressed fiber, Polytetrafluoroethylene ("PTFE"), synthetic material, part or wholly recycled material, and/or any combination of one or more thereof. It is contemplated that gasket 1406 may provide shock absorbing properties for monitor module 1412 and/or glass 1410. It is further contemplated that gasket 1406 may provide protection to sensitive components, such as a monitor module 1412, from foreign debris and/or liquids. It is understood that electronic gaming systems must provide dependable service under rigorous conditions, such as constant use by casino patrons, exposure to smoke and spilled beverages, and other such environmental exposure conditions one might expect in a casino, and it is expressly contemplated that providing gasket 1406 may provide significant benefits by preventing part or all of such contaminants from damaging internal components of the associated electronic gaming system. In regards to FIG. 14 in relation to FIGS. 22-26, the non-straight channels (see reference numbers 2212 and 2214) can be utilized between glass 1410 and cabinet body 1402.

FIG. 14 further illustrates one embodiment where, positioned at the backside of monitor module 1412, support structure 1416 helps secure monitor module 1412 to cabinet body 1402. In one embodiment, one or more support structures 1416 may be comprised of rigid or semi-rigid material. In one example, support structure 1416 may be comprised of metal, plastic, wood, rubber, carbon fiber, and/or any combination thereof.

In a further embodiment, various components may be secured by adhesive. For example, glass 1410 may be secured to gasket 1406 by adhesive 1408. In another example, support structure 1416 may be secured to gasket 1406 by adhesive 1414. In still another example, gasket 1406 may be secured to cabinet body 1402 by adhesive 1404. One or more such adhesives (e.g., 1404, 1408, 1414) may be comprised of epoxies, polyurethanes, polyimides, paste, liquid, film, pellets, tape, hot melt, reactive hot melt, thermosetting, pressure sensitive, contact, structural, semi-structural, non-structural, and/or any combination of one or more thereof. In another embodiment, support structure 1416 may, in addition to or in place of adhesive, be secured to cabinet body 1402 by a mechanical device, such as a nail, screw, rivet, and/or other such mechanical attachment device.

FIGS. 15 and 16 illustrate a gaming system including adjacent flush mounted displays. Specifically, electronic gaming system 100 may include a first monitor module 1604 and a second monitor module 1602 in a generally planar arrangement. In one embodiment, it is contemplated that a seated player 1302 may have a first FOV, generally delineated by lines 1610 and 1612, of the first monitor module 1604. In another embodiment, it is contemplated that a seated player 1302 may have a second FOV, generally delineated by lines 1606 and 1608, of the second monitor module 1602. As is apparent from FIG. 16, lines 1610 and 1612 are relatively equal in length, in comparison to lines 1606 and 1608, wherein top line 1606 is illustrated as being longer than bottom line 1608. FIG. 16 helps illustrate an example of where monitor modules (e.g. 1604 and 1602) are placed in a planar manner, it may create different viewing angles from a single player (e.g. 1302). It is contemplated that certain monitor modules may have optimum viewing angles than other monitor modules.

It is further contemplated that in some embodiments, in a configuration such as illustrated in FIG. 16, it may be preferable to install two different monitor module configurations in such a planar fashion, in order to provide a first monitor module 1604 with an optimum viewing angle occurring where the two lines of the expected FOV are relatively equidistant, and a second monitor module 1602 with an optimum viewing angle occurring where the top line 1606 of the expected FOV is longer than the bottom line

1608 of the FOV. It is also contemplated that in some embodiments, in a configuration as illustrated in FIG. 13, it may be preferable to install the same or similar monitor module configurations in a non-planar fashion, as expected FOV's have associated equidistant lines (e.g., 1314 to 1316, and 1306 to 1308) and/or have associated lines that do not have one significantly longer than another (e.g. 1310 to 1312). In such a configuration, it is contemplated that manufacturing and/or associated supply costs may be minimized as a single monitor module configuration may be utilized for either of the monitor modules associated with an electronic gaming system 100.

Figure 17:
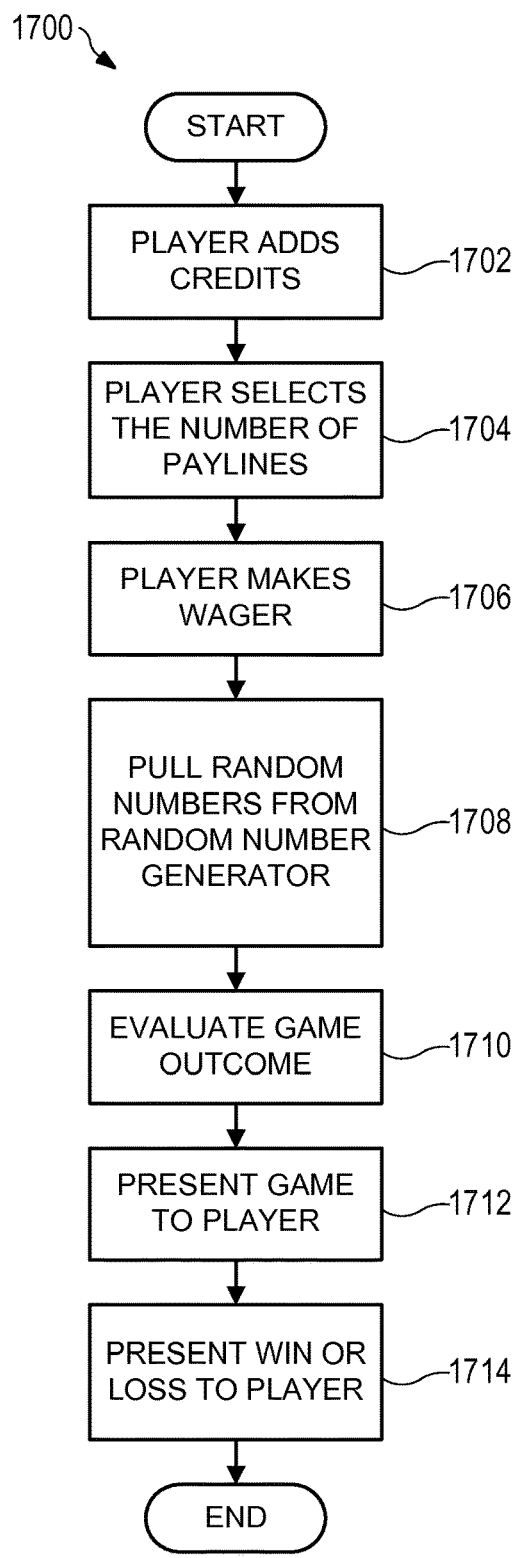
FIG. 17 is a flow diagram for game play, according to one embodiment.

FIG. 17 is a process flowchart of one example of a primary game play 1700 on an electronic gaming system, according to one embodiment. The method may include the step of a player adding credit to the electronic gaming system (step 1702). It is contemplated that a player can do this by inserting cash, coins, a ticket representative of a cash value, a credit card, a player card, requesting an electronic funds transfer ("EFT"), otherwise requesting access to an account having monetary funds, and/or any combination thereof.

At step 1704, the player selects the number of paylines to play. In one embodiment, the player can select from a plurality of different paylines to play. In a further embodiment, the player can only play a predetermined number of paylines. An example of this embodiment may be the instance where the gaming system only allows a player to play forty paylines, and cannot select to play more or less paylines. In another embodiment, the gaming system does not offer paylines, but rather offers a different way to evaluate the game play. One example of a different way may be sometimes referred to as a 243-ways evaluation, where symbols may be evaluated based on the existence of like-symbol clusters on adjacent reels, starting with the left-most reel and continuing right, instead of how many paylines run through the like-symbol clusters.

At step 1706, the player makes a wager on the game. In one embodiment, the wager may be a multiple of the number of paylines selected at step 1704. In another embodiment, the wager may not be a multiple of the number of paylines selected at step 1704. In a further embodiment, the wager may include a side-wager (e.g., ante bet), which may, in one example of such an embodiment, be used to make the player eligible to be awarded the extra functionality discussed above. It should be appreciated that in some embodiments, the order of steps 1704 and 1706 may be not critical, and so for example, a player can select the wager they wish to place, and then select the number of paylines they want it applied to, and that these embodiments are expressly contemplated as being within the scope of the present disclosure.

Continuing to step 1708, the gaming system pulls random numbers from a random number generator ("RNG"). In one embodiment, the system pulls one random number for each reel. In another embodiment, the system pulls one random number which may be utilized to determine the stop positions for each reel. In another embodiment, the random numbers determined by the RNG may be based on the time that the numbers may be pulled. In another embodiment, the random numbers determined by the RNG may be based on the prior numbers pulled.

At steps 1710 and 1712, the gaming system utilizes the random numbers pulled at step 1708 to determine the primary game symbols to display in the play of the primary game, which in turn both determines the presentation of the game to the player and evaluates the game outcome. In one embodiment, the random numbers pulled determine the stopping positions for the reels, which may be then caused to stop at those associated positions, and then the gaming system evaluates the displayed primary game symbols to determine the game outcome. In another embodiment, the gaming system determines the game outcome based on the pulled random numbers, and then causes the game to present an associated outcome to the player.

At step 1714, the win or loss outcome may be identified for the player. In one embodiment, this step can include additional messaging, which provides information related to the win or loss, such as why the player won or lost. In another embodiment, this step can include identification of the amount of any award earned by the player.

Figure 18:
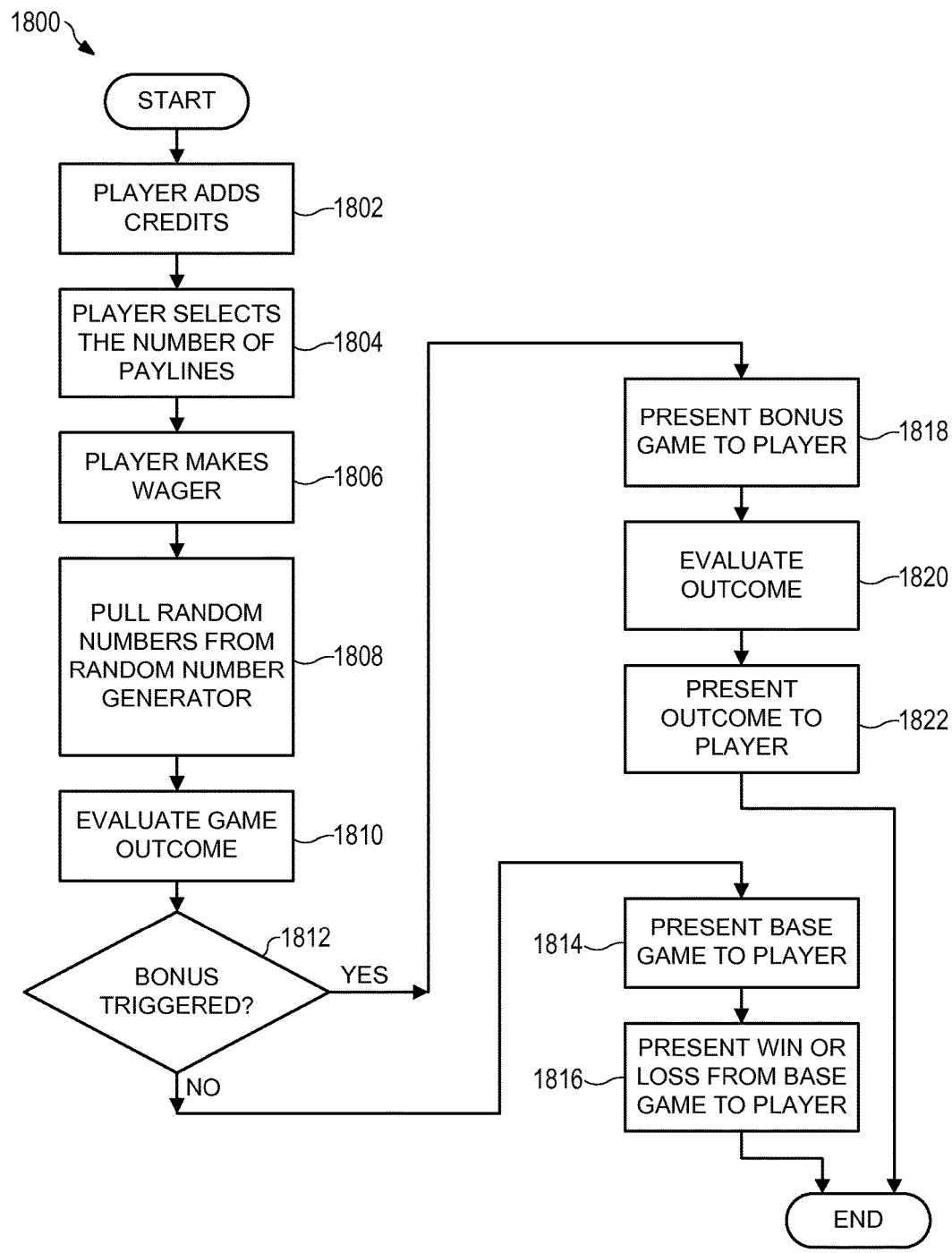
FIG. 18 is another flow diagram for game play, according to one embodiment.

FIG. 18 is a process flowchart of one example of a combined primary and secondary game play 1800 on an electronic gaming system, according to one embodiment. The method may include the step of a player adding credit to the electronic gaming system (step 1802). It is contemplated that a player can do this by inserting cash, coins, a ticket representative of a cash value, a credit card, a player card, requesting an electronic funds transfer ("EFT"), otherwise requesting access to an account having monetary funds, and/or any combination thereof.

At step 1804, the player selects the number of paylines to play. In one embodiment, the player can select from a plurality of different paylines to play. In a further embodiment, the player can only play a predetermined number of paylines. An example of this embodiment may be the instance where the gaming system only allows a player to play forty paylines, and cannot select to play more or less paylines. In another embodiment, the gaming system does not offer paylines, but rather offers a different way to evaluate the game play. One example of a different way may be sometimes referred to as a 243-ways evaluation, where symbols may be evaluated based on the existence of like-symbol clusters on adjacent reels, starting with the left-most reel and continuing right, instead of how many paylines run through the like-symbol clusters.

At step 1806, the player makes a wager on the game. In one embodiment, the wager may be a multiple of the number of paylines selected at step 1804. In another embodiment, the wager may not be a multiple of the number of paylines selected at step 1804. In a further embodiment, the wager may include a side-wager, which may, in one example of such an embodiment, be used to make the player eligible to be awarded the extra functionality discussed above. It should be appreciated that in some embodiments, the order of steps 1804 and 1806 may be not critical, and so for example, a player can select the wager they wish to place, and then select the number of paylines they want it applied to, and that these embodiments may be expressly contemplated as being within the scope of the present disclosure.

Continuing to step 1808, the gaming system pulls random numbers from a random number generator "RNG". In one embodiment, the system pulls one random number for each reel. In another embodiment, the system pulls one random number which may be utilized to determine the stop positions for each reel. In another embodiment, the random numbers determined by the RNG may be based on the time that the numbers may be pulled. In another embodiment, the random numbers determined by the RNG may be based on the prior numbers pulled.

At step 1810, the gaming system utilizes the random numbers pulled at step 1808 to evaluate the game outcome. In one embodiment, the random numbers pulled determine the stopping positions for the reels, which may be then caused to stop at those associated positions, and then the gaming system evaluates the displayed primary game symbols to determine the game outcome. In another embodiment, the gaming system determines the game outcome based on the pulled random numbers, and then causes the game to present an associated outcome to the player.

At step 1812, the gaming system determines if a secondary or bonus game may be triggered. In one embodiment, the bonus game is triggered by the display of a plurality of matching symbols at a plurality of predetermined symbol positions within a play of the primary game. In one example, the bonus game may be triggered if a plurality of matching symbols is displayed on the 2nd, 3rd and $4^{th}$ reel. In another example, the bonus game may be triggered if matching symbols are displayed on the $1^{st}$, $2^{nd}$ and $3^{rd}$ reels. In a further example, the bonus game may be triggered if matching symbols occur at predetermined symbol positions that include consecutive and non-consecutive reels. In another example, a bonus game (e.g., secondary game) may be triggered in any way (e.g., one special symbols in any locations, one special symbol in one or more predetermined locations, two special symbols in any locations, two special symbols in one or more predetermined locations, three special symbols in any locations, three special symbols in one or more predetermined locations, etc.).

If it is determined that a bonus or secondary game was not triggered, the process continues to step 1814, where the base game may be fully presented to the player. As discussed above, the orders of step 1810, 1812, and 1814 can be changed without affecting the novel concepts disclosed herein.

At step 1816, the win or loss outcome of the primary game may be identified for the player. In one embodiment, this step can include additional messaging, which provides information related to the win or loss, such as why the player won or lost. In another embodiment, this step can include identification of the amount of any award earned by the player If it is determined at step 1812 that a bonus or secondary game was triggered, then process 1800 continues to step 1818, where the secondary game may be presented to the player. As discussed above, there are numerous ways to present the secondary or bonus game to the player.

At steps 1820 and 1822, the outcome of the secondary game may be evaluated and presented to the player. In one embodiment, the outcome of the bonus game will always be a winning outcome. In another embodiment, the outcome of the secondary game will cause a significant award to be provided to the player. In one example of such an embodiment, the award may not be provided by the gaming system, as a casino operator may need to verify tax information before allowing such an award to be provided to the player. In one embodiment, instead of the process 1800 ending after step 1822, the process continues to step 1814 so as to finalize the primary game outcome presentation to the player.

Figure 19:
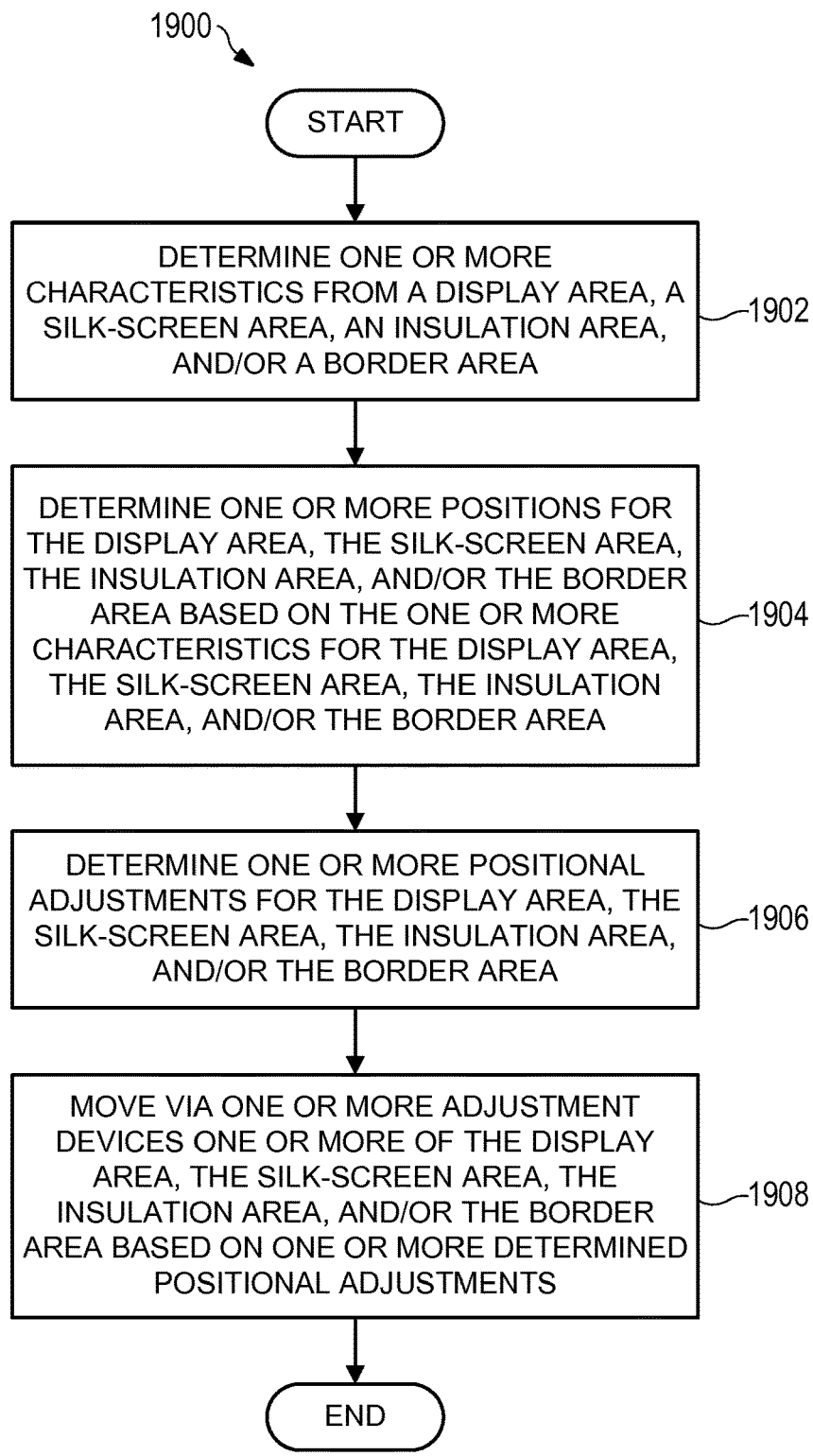
FIG. 19 is a flow diagram to reposition device areas, according to one embodiment.

In FIG. 19, a flow diagram to reposition device areas is shown, according to one embodiment. The method may include determining one or more characteristics from a first display area, a silk-screen area, an insulation area, and/or a border area (step 1902). The method may include determining one or more positions for the first display area, the silk-screen area, the insulation area, and the border area based on the one or more characteristics for the first display area, the silk-screen area, the insulation area, and/or the border area (step 1904). The method may include determining one or more positional adjustments for the first display area, the silk-screen area, the insulation area, and/or the border area (step 1906). The method may include moving via one or more adjustment devices one or more of the first display area, the silk-screen area, the insulation area, and/or the border area based on one or more determined positional adjustments (step 1908).

Figure 20:
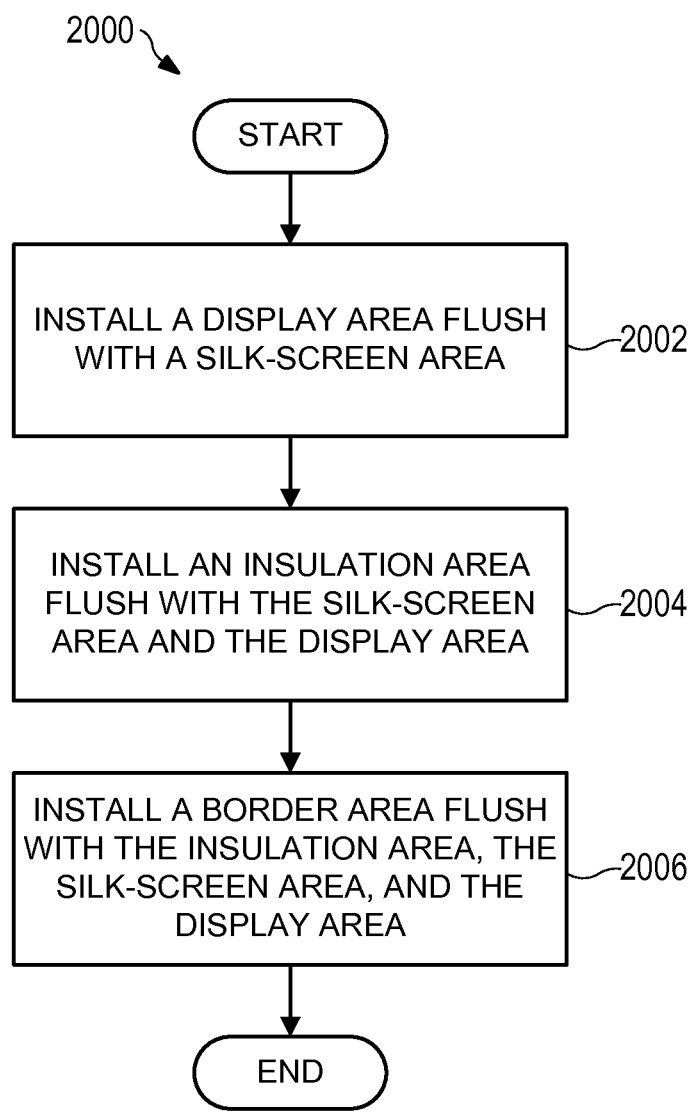
FIG. 20 is assembly flow diagram for the gaming device, according to one embodiment.

In FIG. 20, an assembly flow diagram for the gaming device is shown, according to one embodiment. The method may include installing a display area flush with a silk-screen area (step 2002). The method may include installing an insulation area flush with the silk-screen area and/or the display area (step 2004). The method may include installing a border area flush with the insulation area, the silk-screen area, and/or the display area (step 2006).

In one embodiment, the electronic gaming system may include a first display device. The first display device may include a first display area, a first silk-screen area, a first insulation area, and a first border area. The first display area, the first silk-screen area, the first insulation area, and the first border area may be flush with each other. The first display area, the first silk-screen area, the first insulation area, and the first border area may have surfaces that are in the same plane and/or even with each other. For example, when a player moves his and/or her hand over these surfaces the player would not be able to tell when one surface started and stopped. The first insulation area may provide electrical isolation and/or mechanical buffering between the border area, the first display area, the first silk-screen area, and/or any other areas. The electronic gaming system may include one or more memory devices and one or more processors. The one or more processors may be configured to receive a plurality of instructions from the one or more memory devices, which when executed by the one or more processors, cause the one or more processors to operate with the first display device, for a play of a game, to; determine a wager placed by a player of the electronic gaming system; cause the first display device to display a game play; determine an outcome for the game play; and/or cause the gaming system to provide any awards based at least in part on the determined outcome of the game play.

In another example, the electronic gaming system may include a second display device. The second display device may include a second display area, a second silk-screen area, a second insulation area, and a second border area. The second display area, the second silk-screen area, the second insulation area, and/or the second border area may be flush with each other. The second insulation area may provide electrical isolation between the second border area and at least one of the second area and the second silk-screen area. The second insulation area may provide a mechanical buffer between the second border area and at least one of the second display area and the second silk-screen area.

In another example, the electronic gaming system may further include a seal area located between the first display device and the second display device. The seal area may provide shock absorption between the first display device, the second display device, and/or any other devices.

The first display device, the second display device, and/or any display device may be a touchscreen display device. The silk-screen area may include one or more display advertisements.

In another example, the electronic gaming system may include one or more cameras, one or more sensing devices, and/or one or more motion detection devices.

In another example, the one or more cameras, the one or more sensing devices, and/or the one or more motion detection devices may be utilized to receive one or more inputs. In another example, the electronic gaming system may include one or more adjustment devices. The one or more adjustment devices may reposition one or more of the first display area, the silk-screen area, the insulation area, and/or the border area.

In another example, the one or more adjustment devices may reposition the first display area, the silk-screen area, the insulation area, and/or the border area based on a player's input and/or one or more characteristics from the first display area, the silk-screen area, the insulation area, and/or the border area.

In another embodiment, a method of game play via an electronic gaming system may include: determining one or more characteristics from a first display area, a silk-screen area, an insulation area, and/or a border area; determining one or more positions for the first display area, the silk-screen area, the insulation area, and/or the border area based on the one or more characteristics for the first display area, the silk-screen area, the insulation area, and/or the border area; determining one or more positional adjustments for the first display area, the silk-screen area, the insulation area, and/or the border area; and/or moving via one or more adjustment devices one or more of the first display area, the silk-screen area, the insulation area, and/or the border area based one or more determined positional adjustments.

In another example, the one or more positional adjustments may be at least in part based on player input. In another example, the one or more positional adjustments may be at least in part based on performance data (e.g., lumens, output characteristics, etc.) from the first display device.

In another example, the one or more positional adjustments may be are at least in part based on a device procedure. In another example, the device procedure may be a maintenance procedure (e.g., cleaning, recalibrating, etc.).

In another embodiment, the electronic gaming system may include a first display device. The first display device may include a first display area, a first silk-screen area, a first insulation area, and/or a first border area. The first display area; the first silk-screen area; the first insulation area; and/or the first border area may be flush with each other. The first insulation area may provide electrical isolation between the first border area, the first display area, the first silk-screen area, and/or any other areas. The insulation area may provide a mechanical buffer between the border area, the first display area, the first silk-screen area, and/or any other areas. The electronic gaming system may include a second display device. The second display device may include a second display area, a second silk-screen area, a second insulation area, and a second border area. The second display area, the second silk-screen area, the second insulation area, and/or the second border area may be flush with each other. The second insulation area may provide electrical isolation between the second border area, the second area, the second silk-screen area, and/or any other areas. The second insulation area may provide a mechanical buffer between the second border area, the second area, the second silk-screen area, and/or any other areas.

The electronic gaming system may include a seal area located between the first display device and the second display device. The seal area may be at least one of a mechanical buffer and/or an electrical isolator between the first display device and the second display device. The electronic gaming system may include one or more memory devices. The electronic gaming system may include one or more depth image sensing devices. The electronic gaming system may include one or more processors which may be configured to receive a plurality of instructions from the one or more memory devices, which when executed by the one or more processors, cause the one or more processors to operate with the first display device, for a play of a game, to: determine a wager placed by a player of the electronic gaming system; cause the first display device to display a game play; detect a first body part of a first player; detect a second body part of a second player; identify the detected first and second body parts; detect a first 3D movement of the detected first body part; detect a second 3D movement of the detected second body part; correlate the detected first 3D movement and the identified first body part to a first one of a plurality of reference models; correlate the detected second 3D movement and the identified second body part to a different second one of the plurality of reference models; determine a first player input based on the correlated first reference model; determine a second player input based on the correlated second reference model; determine a game input based on the first player input and the second player input; determine an outcome for the game play; and/or cause the gaming system to provide any awards based at least in part on the determined outcome of the game play.

In another example, the electronic gaming system may further include one or more adjustment devices. The one or more adjustment devices may reposition one or more of the first display area, the silk-screen area, the insulation area, and/or the border area.

In another example, the one or more adjustment devices may reposition the first display area, the silk-screen area, the insulation area, and/or the border area based on at least one of a player's input and one or more characteristics from the first display area, the silk-screen area, the insulation area, and the border area.

In another example, the one or more depth image sensing devices may via the one or more processors generate one or more scenes. In another example, the one or more scenes may be utilized to modify one or more display presentations on at least one of the first display device and the second display device.

Figure 21:
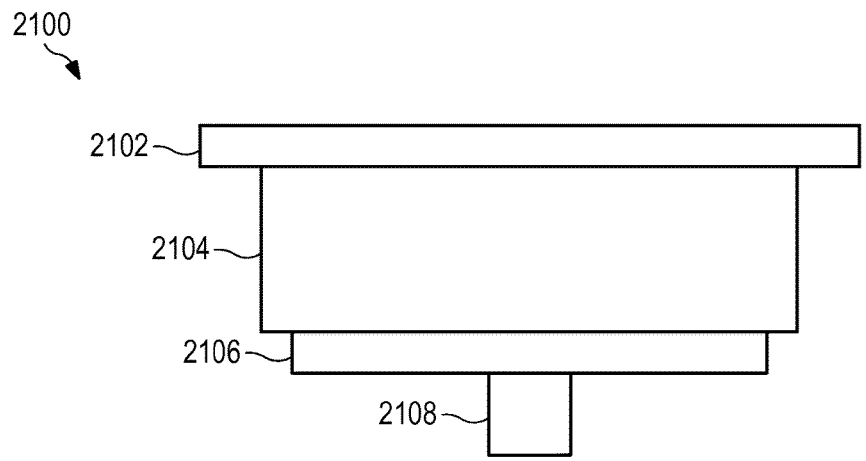
FIG. 21 is an illustration of the gaming system including an oversized display screen, according to one embodiment.

In FIG. 21, an illustration of the gaming system including an oversized display screen is shown, according to one embodiment. A first oversized display screen image 2100 may include an oversized glass area 2102 which may be any transparent material and/or semi-transparent material. Further, the image 2100 may include an LCD display 2104 which may also be any other type of display. Image 2100 may include a light pipe 2106 and a light source 2108. In various examples, one or more touchscreen functions may occur utilizing the LED, LCD, and/or any other display technology. In one example, the light source 2108 generates the light, the light pipe 2106 directs the light generated by the light source 2108, and the display generates images.

Figure 22:
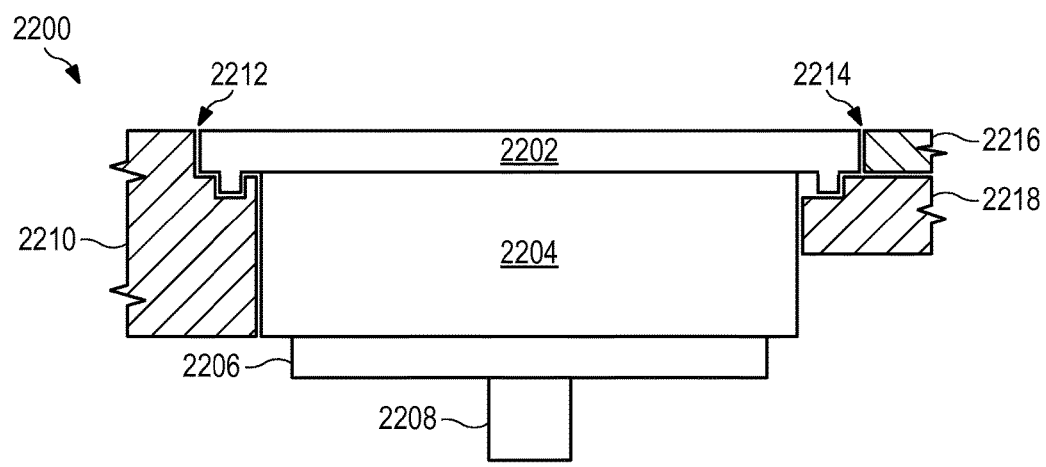
FIG. 22 is an illustration of the gaming system including an oversized display screen, according to one embodiment.

In FIG. 22, an illustration of the gaming system including an oversized display screen is shown, according to one embodiment. A second oversized display screen image 2200 may include an oversized glass area 2202 which may also be any other type of transparent material, semi-transparent material, and/or a combination of transparent material and semi-transparent material. In addition, image 2200 may show various exterior areas (e.g., reference numbers 2210 and 2216) of the cabinet. Further, image 2200 may include an internal wall of the cabinet 2218, a first gap area 2212, a second gap area 2214, an LCD 2204, a light pipe 2206, and/or a light source 2208. In one example, one or more magnets can be utilized to align one or more cabinet areas with one or more display elements. For example, a first display may be moved via magnetic elements to reduce and/or eliminate one or more gaps between the first display and a cabinet area, which can reduce entry of liquids and/or gases from entering into one or more cabinet areas.

Figure 23:
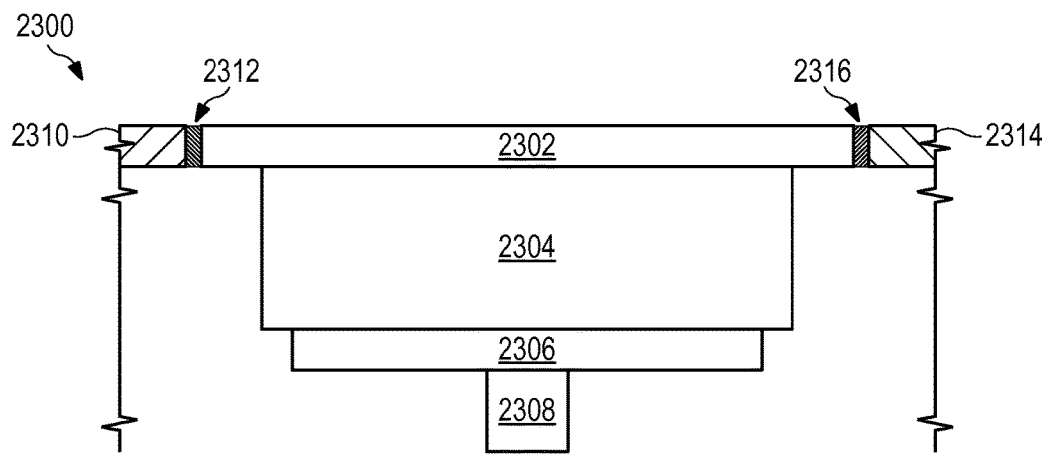
FIG. 23 is an illustration of the gaming system including an oversized display screen, according to one embodiment.

In FIG. 23, an illustration of the gaming system including an oversized display screen is shown, according to one embodiment. A third oversized display screen image 2300 may include an oversized glass area 2302 which may also be any other type of transparent material, semi-transparent material, and/or a combination of transparent material and semi-transparent material. Further, image 2300 may include exterior areas (e.g., 2310 and 2314) of cabinet. In addition, image 2300 may include a first filled gap area 2312, a second filled gap area 2314, an LCD 2304, a light pipe 2306, and/or a light source 2308. In various example, the filling material may be utilized as an electrical insulator, a shock absorber, and/or to reduce the entry of liquids and/or gases and/or particles into any cabinet area.

Figure 24:
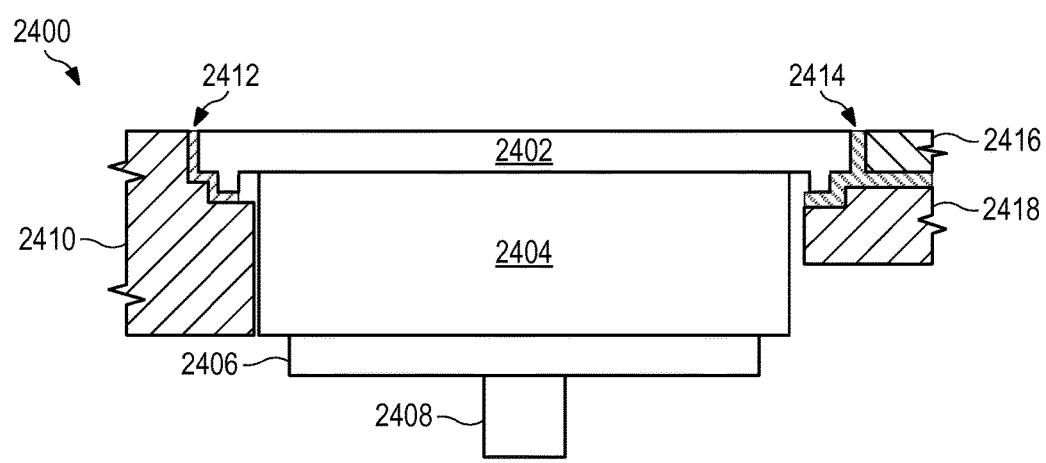
FIG. 24 is an illustration of the gaming system including an oversized display screen, according to one embodiment.

In FIG. 24, an illustration of the gaming system including an oversized display screen is shown, according to one embodiment. A fourth oversized display screen image 2400 may include an oversized glass area 2402 which may also be any other type of transparent material, semi-transparent material, and/or a combination of transparent material and semi-transparent material. Further, image 2400 may include exterior areas (e.g., 2410 and 2416) of cabinet and one or more internal walls 2418. In addition, image 2400 may include a first channel area 2412, a second channel area 2414, an LCD 2404, a light pipe 2406, and/or a light source 2408. In various examples, the channels may stop gases, liquids, and/or particles from entering the cabinet via the design of the turns, reducing the width of the channel, and/or via filing the channel with one or more materials.

Figure 25:
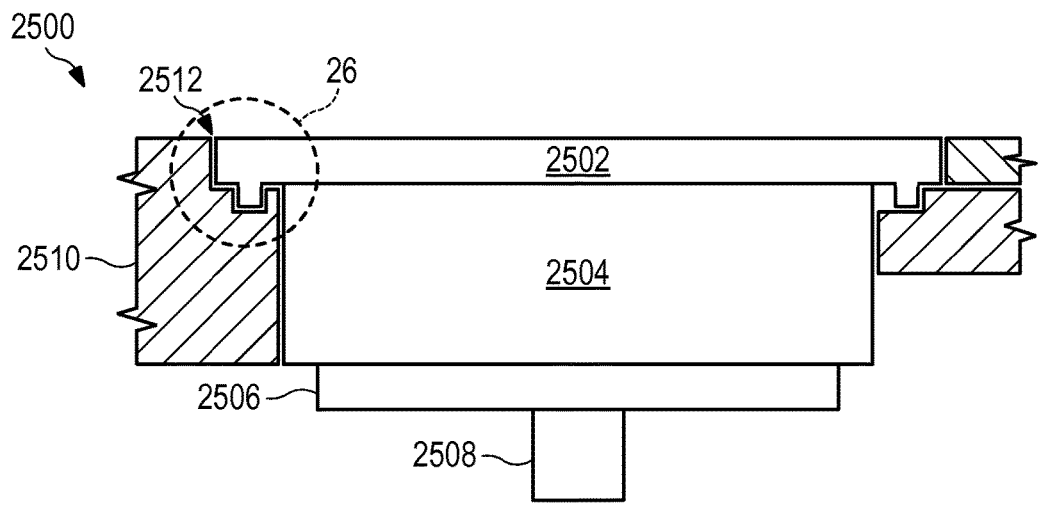
FIG. 25 is an illustration of the gaming system including an oversized display screen, according to one embodiment.

In FIG. 25, an illustration of the gaming system including an oversized display screen is shown, according to one embodiment. A fifth oversized display screen image 2500 may include an oversized glass area 2502 which may also be any other type of transparent material, semi-transparent material, and/or a combination of transparent material and semi-transparent material. Further, image 2500 may include exterior areas (e.g., 2510) of cabinet. In addition, image 2500 may include a first channel area 2512, an LCD 2504, a light pipe 2506, and/or a light source 2508. In one example, the first length of a channel may be X where a second length of a channel may be Y and an Nth length of a channel may be Z. In this example, Z<Y<X which allows for more of a barrier to gases, liquids, and/or particles in the path going from X to Y and then to Z.

Figure 26:
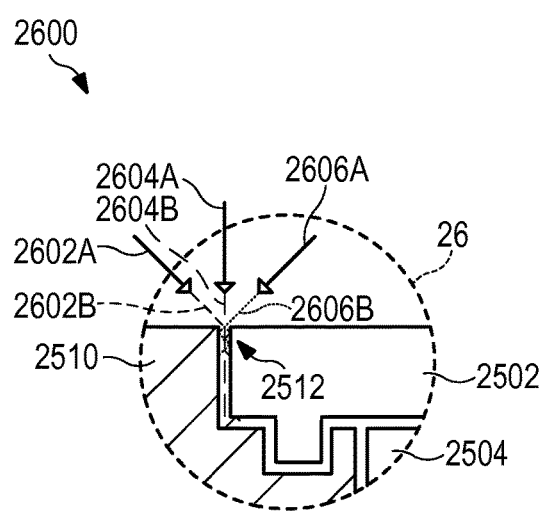
FIG. 26 is an illustration of the gaming system including an oversized display screen, according to one embodiment.

In FIG. 26, an illustration of the gaming system including an oversized display screen is shown, according to one embodiment. In this example, a detailed view 26 of the first channel area 2512 is shown. In this example, a first light beam 2602A, a second light beam 2604A, and an Nth light beam 2606A are shown. These light beams may be at any angle (e.g., 0, 10, 20, 30, ..., 90 degrees) in relations to first channel area 2512. Further, the first light beam 2602A may have a first light beam element 2602B that enters the first channel area 2512 at a first angle (e.g., 45%). In addition, the second light beam 2604A may have a second light beam element 2604B that enters the first channel area 2512 at a second angle (e.g., 90%). Further, the nth light beam 2606A may have an nth light beam element 2606B that enters the first channel area 2512 at an nth angle (e.g., 135%). In this example, the first light beam element 2602B, the second light beam element 2604B, and/or the nth light beam element 2606B may be stopped at a light cut-off area 2607 of the first channel area 2512. This light cut-off area 2607 may stop light from travelling any further through first channel area 2512 based on the channel angles, the channel depth, the channel geometry, the channel width, the channel material, and/or any combination thereof.

Figure 27:
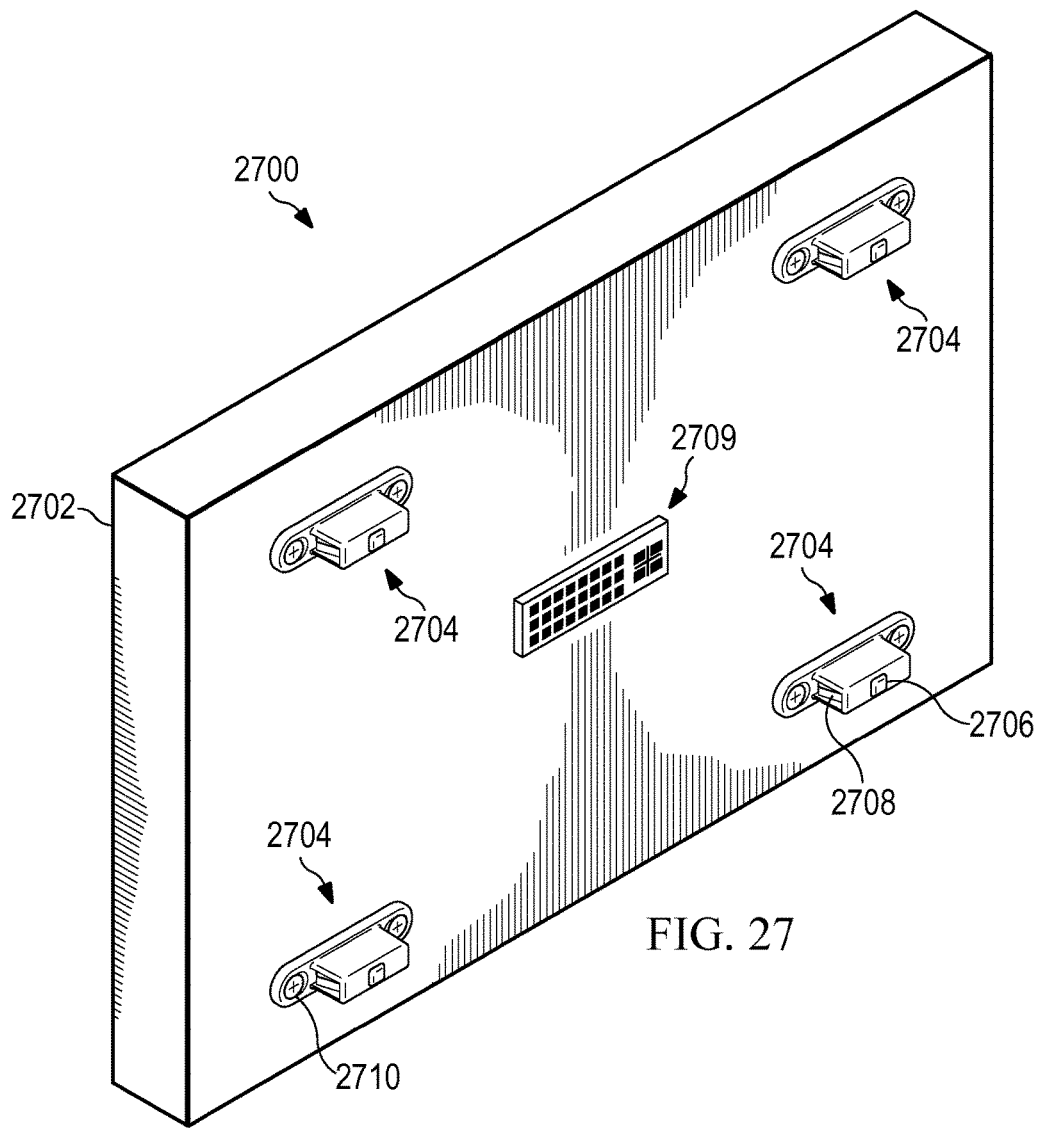
FIG. 27 is an illustration of the gaming system including a snap on display, according to one embodiment.

In FIG. 27, an illustration of the snap-and-click display 2700 is shown, according to one embodiment. A snap-and-click display 2702 may include a snap-and-click display screen 702, snap-and-click device 2704, and/or one or more electrical attachment devices 2709. Snap-and-click device 2704 may include one or more attachment areas 2710, a snap-and-click locking device 2708, and/or a snap-and-click unlocking device 2706.

One or more attachment areas 2710 may be utilized to connect snap-and-click device 2704 to snap-and-click display 2702. One or more attachment areas 2710 may be connected via screws, nuts, bolts, glue, and/or any other securing means.

Figure 28:
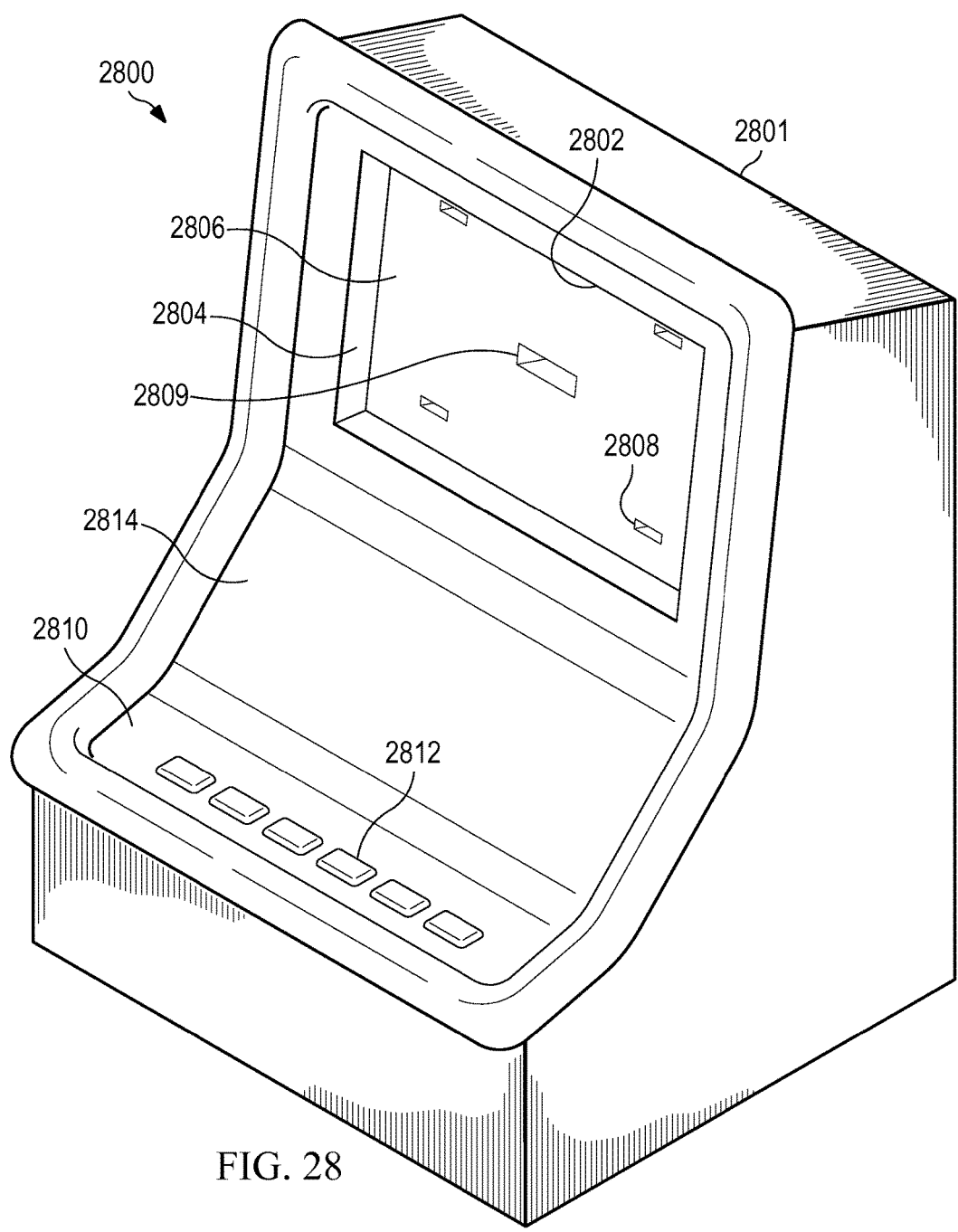
FIG. 28 is an illustration of the gaming system including a snap on display, according to one embodiment.

One or more electrical attachment devices 2709 may be utilized to electrically connect snap-and-click display 2702 to electronic gaming device 100, electronic gaming system 200, a display installation area 2802, a wall of the display installation area 2804, a back of the display installation area 2806, one or more snap-and-click display interfaces 2808, and/or one or more electrical attachment points 2809 (see FIG. 28).

Snap-and-click locking device 2708 may be connected to electronic gaming device 100 via an interface. Snap-and-click locking device 2708 may be connected to electronic gaming device 100 without an interface. Snap-and-click locking device 2708 may be connected by applying pressure to snap-and-click locking device 2708, which compresses snap-and-click locking device 2708. Snap-and-click locking device 2708 is then passed through an attachment opening. Once snap-and-click locking device 2708 has passed through the attachment opening, the pressure is released from snap-and-click locking device 2708 which then opens back up and is locked in place.

Snap-and-click unlocking device 2706 may compress snap-and-click locking device 2708, which allows snap-and-click locking device 2708 to be unlocked from one or more connected devices.

FIG. 28 is an illustration of the interface in the electronic gaming machine for the snap-and-click display, according to one embodiment. A first image 2800 may include electronic gaming device 100, display installation area 2802, wall of the display installation area 2804, back of the display installation area 2806, one or more snap-and-click display interfaces 2808, one or more electrical attachment points 2809, an input area 2810, one or more input devices 2812, and a second display 2814.

One or more electrical attachment points 2809 may be utilized to electrically connect snap-and-click display 2702 to electronic gaming device 100, electronic gaming system 200, display installation area 2802, wall of the display installation area 2804, back of the display installation area 2806, one or more snap-and-click display interfaces 2808, one or more electrical attachment devices 2709 and/or any other electrical device.

In one example, display installation area 2802 is where snap-and-click display 2702 is installed. In another example, wall of the display installation area 2804 may have the same depth as snap-and-click display 2702 to create a flush surface. Back of the display installation area 2806 may be where snap-and-click display 2702 is supported. Back of the display installation area 2806 may include one or more snap-and-click display interfaces 2808. One or more snap-and-click display interfaces 2808 may allow for snap-and-click device 2704 to be located/positioned within the snap-and-click display interface 2808 to form a connection between snap-and-click display 2702, snap-and-click device 2704, snap-and-click interface 2808, back of the display installation area 2806, one or more electrical attachment devices 2709, and/or one or more electrical attachment points 2809.

In FIG. 29, another illustration of the interface in the electronic gaming machine for the snap-and-click display is shown, according to one embodiment. A second image 2900 may include electronic gaming device 100, one or more snap-and-click display interfaces 2808, one or more electrical attachment points 2809, snap-and-click display 2702, snap-and-click display screen 2902, one or more alignment lines 2906, and a hand 2904. A person via hand 2904 may utilize one or more alignment lines 2906 (or other alignment procedures) to place snap-and-click display 2702 via snap-and-click device 2704 into one or more snap-and-click display interfaces 2808. Further, one or more alignment lines 2906 are imagery lines to demonstrate the plane for installation. In another example, a machine may utilize one or more alignment lines 2906 to place snap-and-click display 2702 via snap-and-click device 2704 into one or more snap-and-click display interfaces 2808.

A person via hand 2904 may utilize one or more alignment lines 2906 (or other alignment procedures) to connect one or more electrical attachment points 2809 on display installation area 2802 to one or more electrical attachment devices 2709 on snap-and-click display 2702. In another example, a machine may utilize one or more alignment lines 2906 to connect one or more electrical attachment points 2809 on display installation area 2802 to one or more electrical attachment devices 2709 on snap-and-click display 2702.

One or more electrical attachment points 2809 may be utilized to electrically connect snap-and-click display 2702 to electronic gaming device 100, electronic gaming system 200, display installation area 2802, wall of the display installation area 2804, back of the display installation area 28028, one or more snap-and-click display interfaces 2808, and/or one or more electrical attachment devices 2709.

Figure 30:
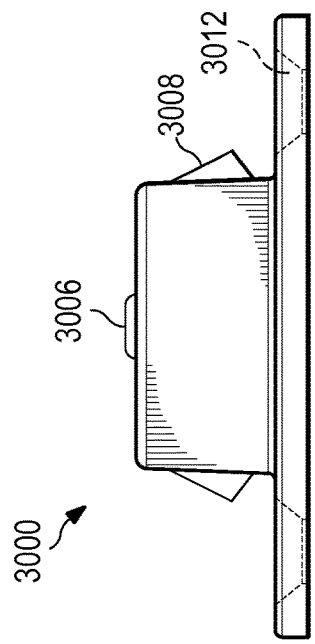
FIG. 30 is an illustration of the gaming system including a snap on display, according to one embodiment.
Figure 32:
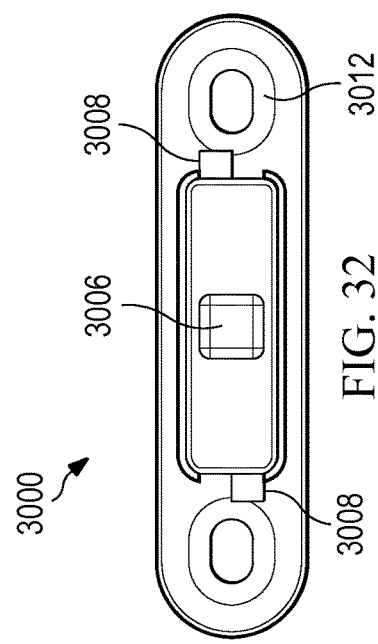
FIG. 32 is an illustration of the gaming system including a snap on display, according to one embodiment.

FIG. 30 is an illustration of the snap-and-click locking mechanism, according to one embodiment. Snap-and-click device 3000 may include one or more locking areas 3012, snap-and-click locking device 3008, and snap-and-click unlocking device 3006. One or more locking areas 3012 may allow a screw, a blot, a nut, and/or any other securing device to be inserted into one or more locking areas 3012 to secure snap-and-click device 3000 to snap-and-click display 2702.

Figure 31:
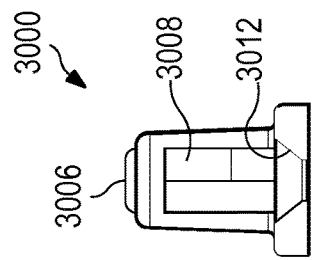
FIG. 31 is an illustration of the gaming system including a snap on display, according to one embodiment.
Figure 33:
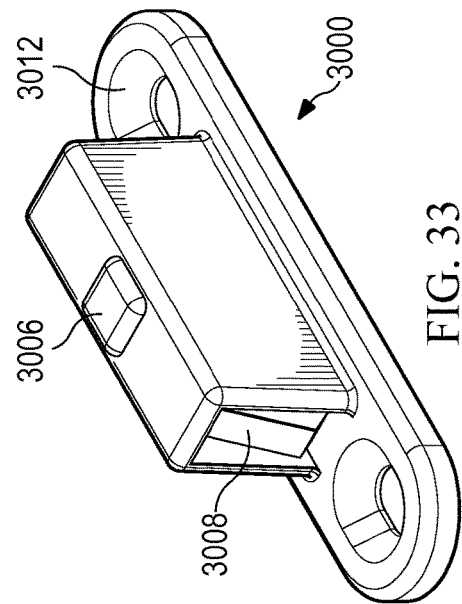
FIG. 33 is an illustration of the gaming system including a snap on display, according to one embodiment.

Snap-and-click locking device 3008 may be compressed by a material going over snap-and-click locking device 3008 (see FIG. 31), which puts snap-and-click locking device 3008 into an unlocked position. Once the material has passed over snap-and-click device 3008 (see FIGS. 30-33), snap-and-click locking device 3008 is put into a locked position.

In another example, snap-and-click unlocking device 3006 may be utilized (e.g., by touching and/or pressing down) to unlock (e.g., place in a compressed position) snap-and-click locking device 2708 (see FIGS. 30-33).

FIG. 34 is an illustration of a locking mechanism for display, display interface, an electrical connection mechanism, and the snap-and-click locking mechanism combination, according to one embodiment. A third image 3400 may include a display interface 3402, snap-and-click device 2704, snap-and-click locking device 2708, snap-and-click unlocking device 2706, a display interface locked area 3404, one or more electrical interconnection points 3406 (e.g., a combination of one or more electrical attachment points 2809 and one or more electrical attachment devices 2709), one or more electrical wires 3408, one or more springs 3410, one or more motors 3412, one or more adjustable devices 3414, and one or more sensors 3416. In one example, display interface locked area 3404 shows that snap-and-click locking device 2708 has passed over (through) display interface 3402, which compressed (e.g., puts in an open position) snap-and-click locking device 2708. Once snap-and-click locking device 2708 went through display interface 3402, then snap-and-click locking device 2708 opened up (e.g., put in a closed position) to securely attach snap-and-clicking locking device 2708 to display interface which can be seen in locking area 3404.

One or more electrical interconnection points 3406 may be a combination of one or more electrical attachment points 2809 and one or more electrical attachment devices 2709. One or more electrical wires 3408 may be any items which can carry electrical energy and/or data.

One or more springs 3410 may be utilized to manually and/or automatically (e.g., via one or more motors 3412) adjust snap-and-click display 2702 to a flush position with the outside of electronic gaming device 100, to a predetermined position, to a floating position, and/or any combination thereof. The flush position may allow snap-and-click display 2702 to appear level with the outside of electronic gaming device 100, which gives a high-tech feel to electronic gaming device 100. The predetermined position may be any position (e.g., flush, floating, within one-half of an inch from a flush position with electronic gaming device 100). The floating position may allow for reduced breakage of snap-and-click display 2702 when a force is applied to any part of electronic gaming device 100. For example, when the door of electronic gaming device 100 is being closed. The positions of snap-and-click display 2702 may be adjusted based on a mode of operation. For example, during installation and repair the floating position may be utilized to minimize breakage of snap-and-click display 2702. In another example, during a cleaning operation a first predetermined position may be utilized to have snap-and-click display 2702 be outside of electronic gaming device 100 to clean the sides of snap-and-click display 2702 and then a second predetermined position may be utilized to have snap-and-click display 2702 be inside of electronic gaming device 100 to clean the perimeter of display installation area 2806. In another example, during game play the flush position may be utilized to give electronic gaming device 100 a high-tech feel that a player may enjoy. Any of the positions may be adjusted and/or maintained via data feedback from one or more sensors 3416.

One or more adjustable devices 3414 may be utilized in conjunction with and/or replace one or more springs 3410. One or more adjustable devices 3414 and/or one or more springs 3410 may be in any position (e.g., display installation area 2802, wall of the display installation area 2804, back of the display installation area 2806, one or more snap-and-click display interfaces 2808, one or more electrical attachment points 2809, input area 2810, one or more input devices 2834, second display 2814, etc.).

One or more sensors 3416 may obtain and/or transmit one or more data points (e.g., positional data, temperature data, etc.) relating to snap-and-click display 2702, snap-and-click device 2704, snap-and-click unlocking device 2706, snap-and-click locking device 2708, one or more electrical attachment devices 2709, one or more attachment areas 2710, electronic gaming device 100, electronic gaming system 200, display installation area 2802, wall of the display installation area 2804, back of the display installation area 2806, one or more snap-and-click display interfaces 2808, one or more electrical attachment points 2809, an input area 2810, one or more input devices 2812, second display 2814, snap-and-click display screen 2902, one or more alignment lines 2906, display interface locked area 3404, one or more electrical interconnection points 3406, one or more electrical wires 3408, one or more springs 3410, one or more motors 3412, one or more adjustable devices 3414, and/or one or more sensors 3416 to one or more processors.

Figure 35:
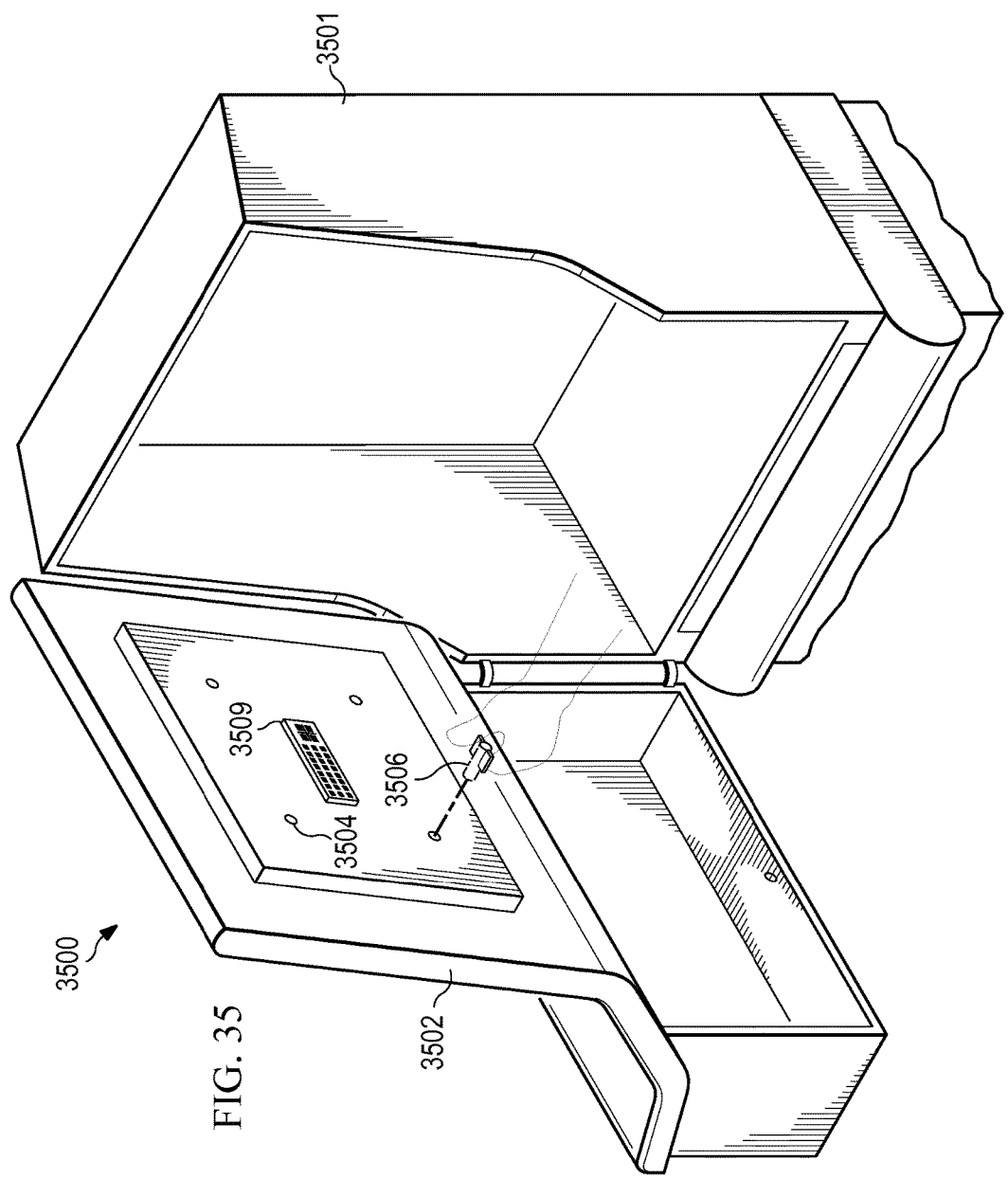
FIG. 35 is an illustration of the gaming system including a snap on display, according to one embodiment.

FIG. 35 is an illustration of an unlocking mechanism, according to one embodiment. A fourth image 3500 may include an electronic gaming device 100, an electronic gaming device door 3502, one or more snap-and-click release holes 3504, and snap-and-click release tool 3506. In one example, snap-and-click release tool 3506 may be inserted into one or more snap-and-click release holes 3504 to make contact with snap-and-click unlocking device 2706, which unlocks snap-and-clicking locking device 2708. By unlocking one or more snap-and-clicking locking devices 2708, snap-and-click display 2702 may be removed. In another example, one or more electrical interconnection points 3406, one or more electrical attachment points 2809, and/or one or more electrical attachment devices 2709 may be disconnected (e.g., physically and/or electrically).

Figure 36:
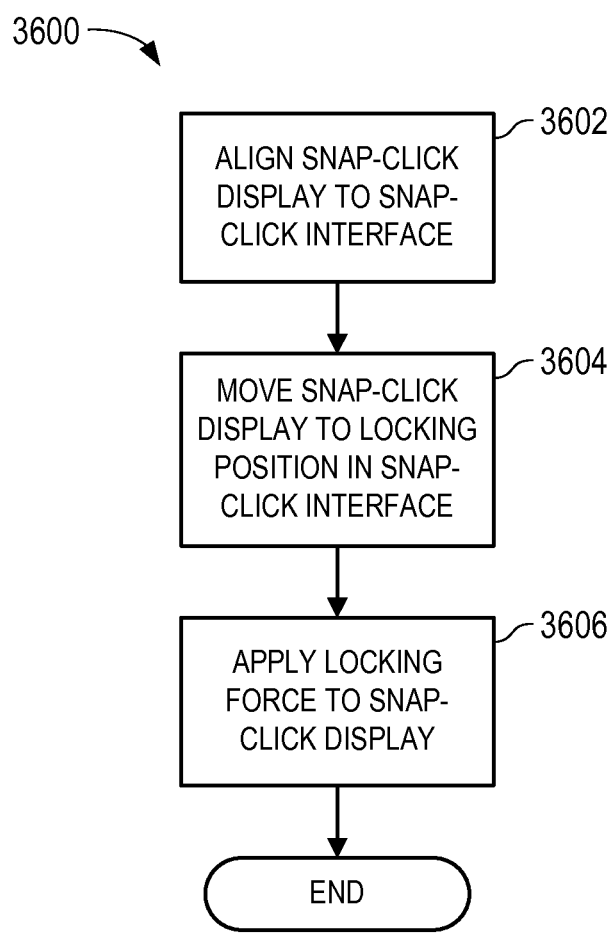
FIG. 36 is a flow diagram for game play, according to one embodiment.

FIG. 36 is a flow diagram for installation of the snap-and-click display 3600, according to one embodiment. In one example, the method may include aligning the snap-and-click display with the interface within electronic gaming device 100 (step 3602). The method may include moving the snap-and-click display to one or more locking positions in snap-and-click interface (step 3604). The method may include applying locking force to snap-and-click display (step 3606). The method may end. In another example, one or more electrical interconnection points 3406, one or more electrical attachment points 2809, and/or one or more electrical attachment devices 2709 may be connected (e.g., physically and/or electrically).

Figure 37:
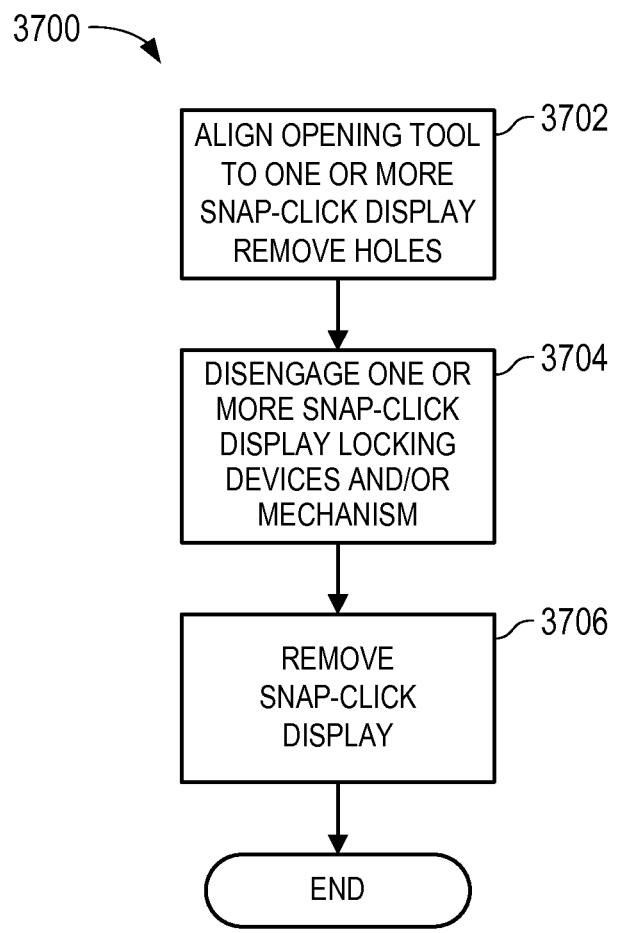
FIG. 37 is a flow diagram for game play, according to one embodiment.

FIG. 37 is a flow diagram for uninstalling the snap-and-click display 3700, according to one embodiment. The method may include aligning opening tool to one or more snap-and-click display removal holes (step 3702). The method may include disengaging one or more snap-and-click display locking devices and/or mechanism (step 3704). The method may include removing the snap-and-click display (step 3706). The method may end.

Figure 38:
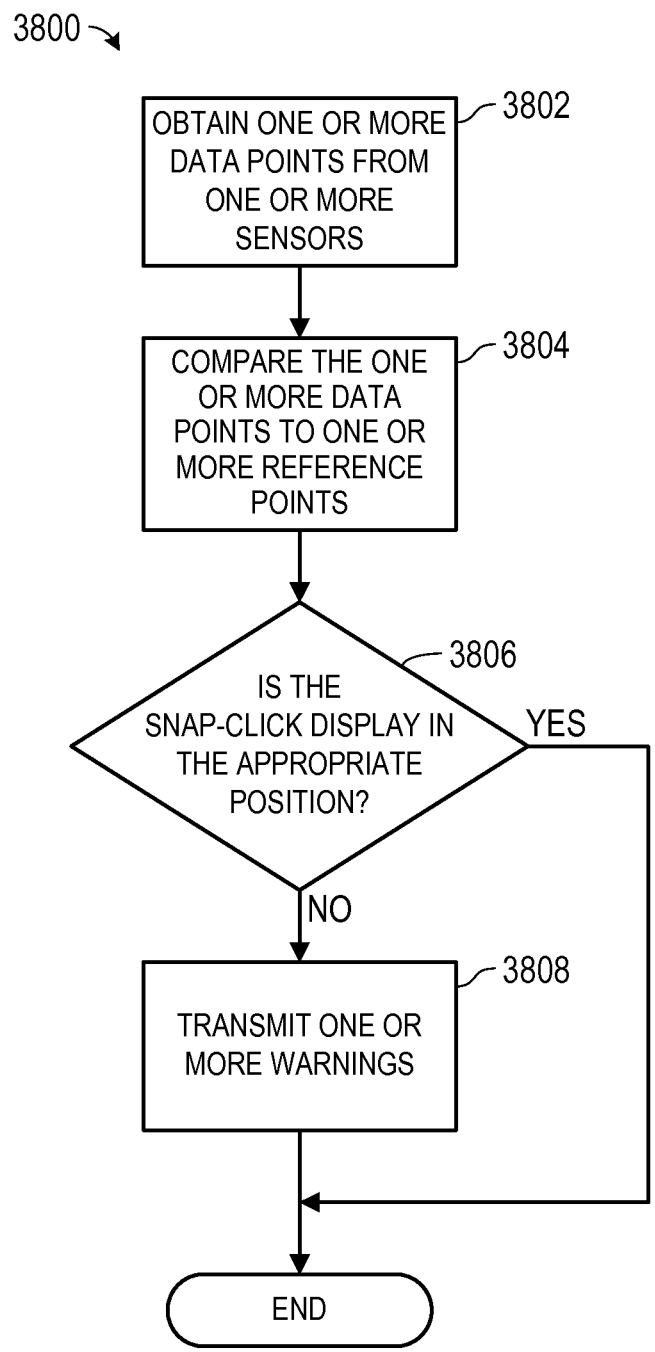
FIG. 38 is a flow diagram for game play, according to one embodiment.

FIG. 38 is a flow diagram for verifying the installation of the snap-and-click display 3800, according to one embodiment. In one example, the method may include obtaining one or more data points from one or more sensors relating to one or more of electronic gaming device 100, the snap-and-click interface, and/or the snap-and-click display (step 3802). The method may include comparing the one or more data points to one or more reference points (step 3804). The method may include determining whether the snap-and-click interface and/or the snap-and-click display are in the appropriate positions and/or within a range of interrelationship positions with each other (step 3806). If the snap-and-click interface and/or the snap-and-click display are not in the appropriate positions and/or within a range of interrelationship positions with each other, then the method may transmit one or more warnings to an external device, to a server, to a mobile device and/or a warning device on electronic gaming device 100 (step 3808) and the method may end. If the snap-and-click interface and/or the snap-and-click display are in the appropriate positions and/or within a range of interrelationship positions with each other, then the method may end.

Any one or more of snap-and-click display 2702, snap-and-click device 2704, snap-and-click unlocking device 2706, snap-and-click locking device 2708, one or more electrical attachment devices 2709, one or more attachment areas 2710, electronic gaming device 100, electronic gaming system 200, display installation area 2802, wall of the display installation area 2804, back of the display installation area 2806, one or more snap-and-click display interfaces 2808, one or more electrical attachment points 2809, an input area 2810, one or more input devices 2812, second display 2814, snap-and-click display screen 2902, one or more alignment lines 2906, display interface locked area 2904, one or more electrical interconnection points 2906, one or more electrical wires 2908, one or more springs 3410, one or more motors 3412, one or more adjustable devices 3414, and/or one or more sensors 3416 may be substituted in any of the process flow charts.

In one example, snap-and-click display may be aligned (e.g., in the correction position and/or within a tolerance range) with interface but not engaged with interface. One or more sensors may transmit this data to one or more processors, which may transmit one or more warnings.

In another example, snap-and-click may be aligned (e.g., in the correction position and/or within a tolerance range) with interface and engaged with interface. However, interface 2704 may not be secured to electronic gaming device 100. One or more sensors may transmit this data to one or more processors, which may transmit one or more warnings.

Figure 39:
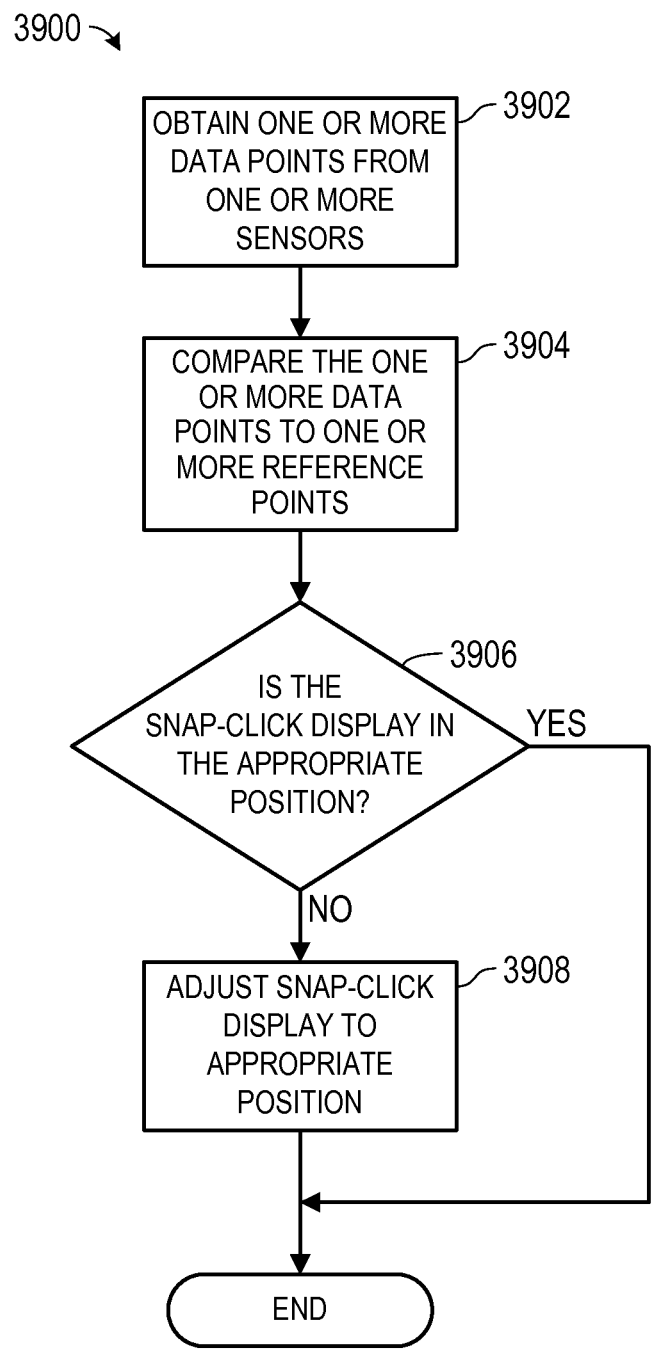
FIG. 39 is a flow diagram for game play, according to one embodiment.

FIG. 39 is a flow diagram for adjusting the installation of the snap-and-click display 3900, according to one embodiment. In one example, the method may include obtaining one or more data points from one or more sensors relating to one or more of electronic gaming device 100, the snap-and-click interface, and/or the snap-and-click display (step 3902). The method may include comparing the one or more data points to one or more reference points (step 3904). The method may include determining whether the snap-and-click interface and/or the snap-and-click display are in the appropriate positions and/or within a range of interrelationship positions with each other (step 3906). If the snap-and-click interface and/or the snap-and-click display are not in the appropriate positions and/or within a range of interrelationship positions with each other, then the method may adjust one or more adjustment devices to one or more appropriate positions (step 3908) and the method may end. If the snap-and-click interface and/or the snap-and-click display are in the appropriate positions and/or within a range of interrelationship positions with each other, then the method may end.

Any one or more of snap-and-click display 2702, snap-and-click device 2704, snap-and-click unlocking device 2706, snap-and-click locking device 2708, one or more electrical attachment devices 2709, one or more attachment areas 2710, electronic gaming device 100, electronic gaming system 200, display installation area 2802, wall of the display installation area 2804, back of the display installation area 2806, one or more snap-and-click display interfaces 2808, one or more electrical attachment points 2809, an input area 2810, one or more input devices 2812, second display 2814, snap-and-click display screen 2902, one or more alignment lines 2906, display interface locked area 2904, one or more electrical interconnection points 3406, one or more electrical wires 3408, one or more springs 3410, one or more motors 3412, one or more adjustable devices 3414, and/or one or more sensors 3416 may be substituted in any of the process flow charts.

In one example, snap-and-click display 2702 may not be within a predetermined range of electronic gaming device 100. Based on snap-and-click display 2702 not being within a predetermined range of electronic gaming device 100, one or more adjustable devices 3414 (and/or one or more springs 3410) may move snap-and-click display 2702, any element of snap-and-click display 2702 (e.g., snap-and-click device 2704, etc.), display installation area 2806, any element of display installation area 2806 (e.g., one or more snap-and-click display interfaces 2808, etc.), any element of electronic gaming device 100, and/or any element of electronic gaming system 200 to one or more correcting points.

In another example, snap-and-click device 2704 may not be within a predetermined range of one or more snap-and-click display interfaces 2808. Based on snap-and-click device 2704 not being within a predetermined range of one or more snap-and-click display interfaces 2808, one or more adjustable devices 3414 (and/or one or more springs 3410) may move snap-and-click display 2702, any element of snap-and-click display 2702 (e.g., snap-and-click device 2704, etc.), display installation area 2806, any element of display installation area 2806 (e.g., one or more snap-and-click display interfaces 2808, etc.), any element of electronic gaming device 100, and/or any element of electronic gaming system 200 to one or more correcting points.

In one example, one or more electrical attachment points 2809 on display installation area 2806 may not be connect to one or more electrical attachment devices 2709 on snap-and-click display 2702. Based on one or more electrical attachment points 2809 on display installation area 2806 not being connected to one or more electrical attachment devices 2709 on snap-and-click display 2702, one or more adjustable devices 3414 (and/or one or more springs 3410) may move snap-and-click display 2702, any element of snap-and-click display 2702 (e.g., snap-and-click device 2704, etc.), display installation area 2806, any element of display installation area 2806 (e.g., one or more snap-and-click display interfaces 2808, etc.), any element of electronic gaming device 100, and/or any element of electronic gaming system 200 to one or more correcting points.

Figure 40:
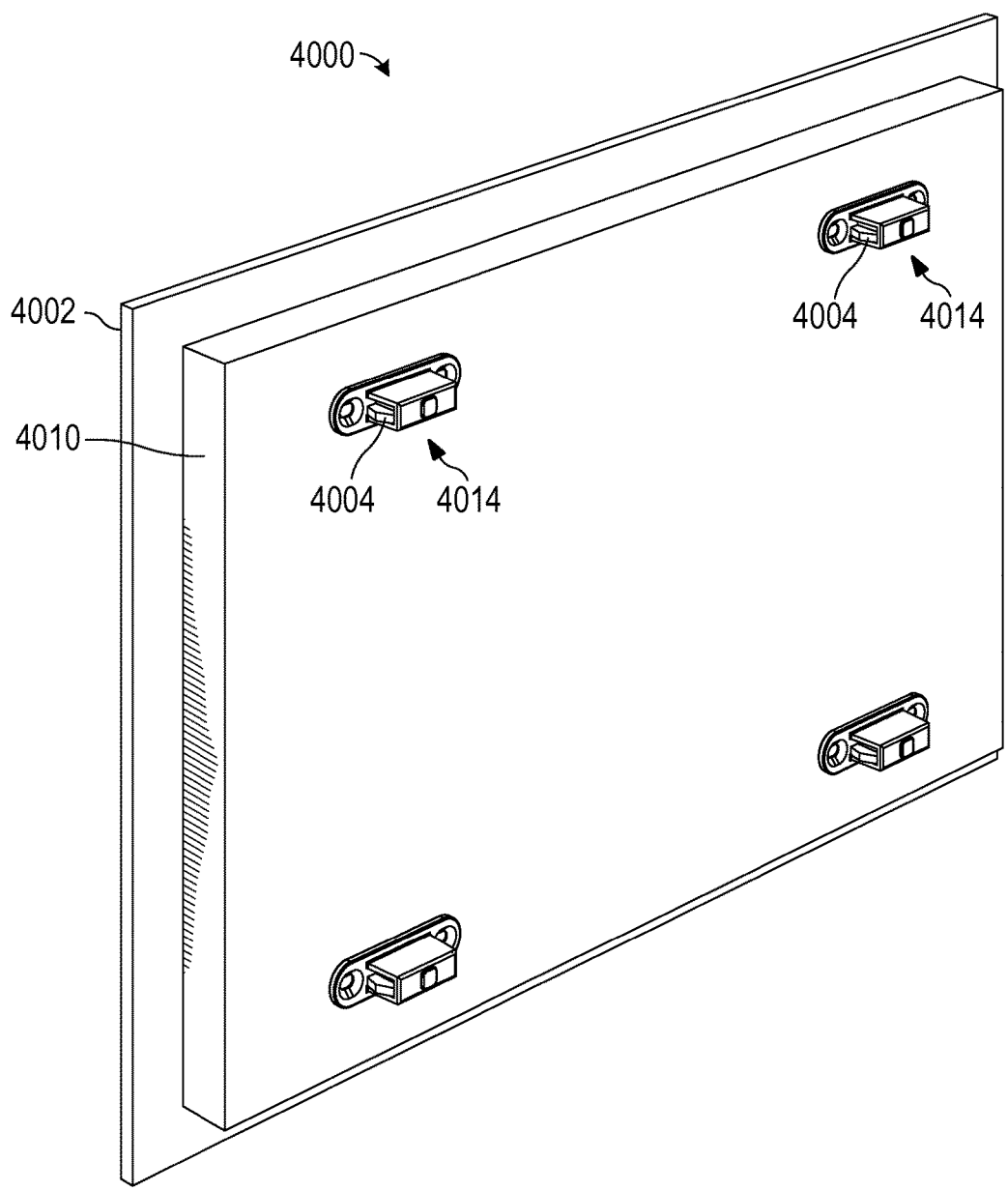
FIG. 40 is an illustration of the gaming system including a snap on display, according to one embodiment.
Figure 41:
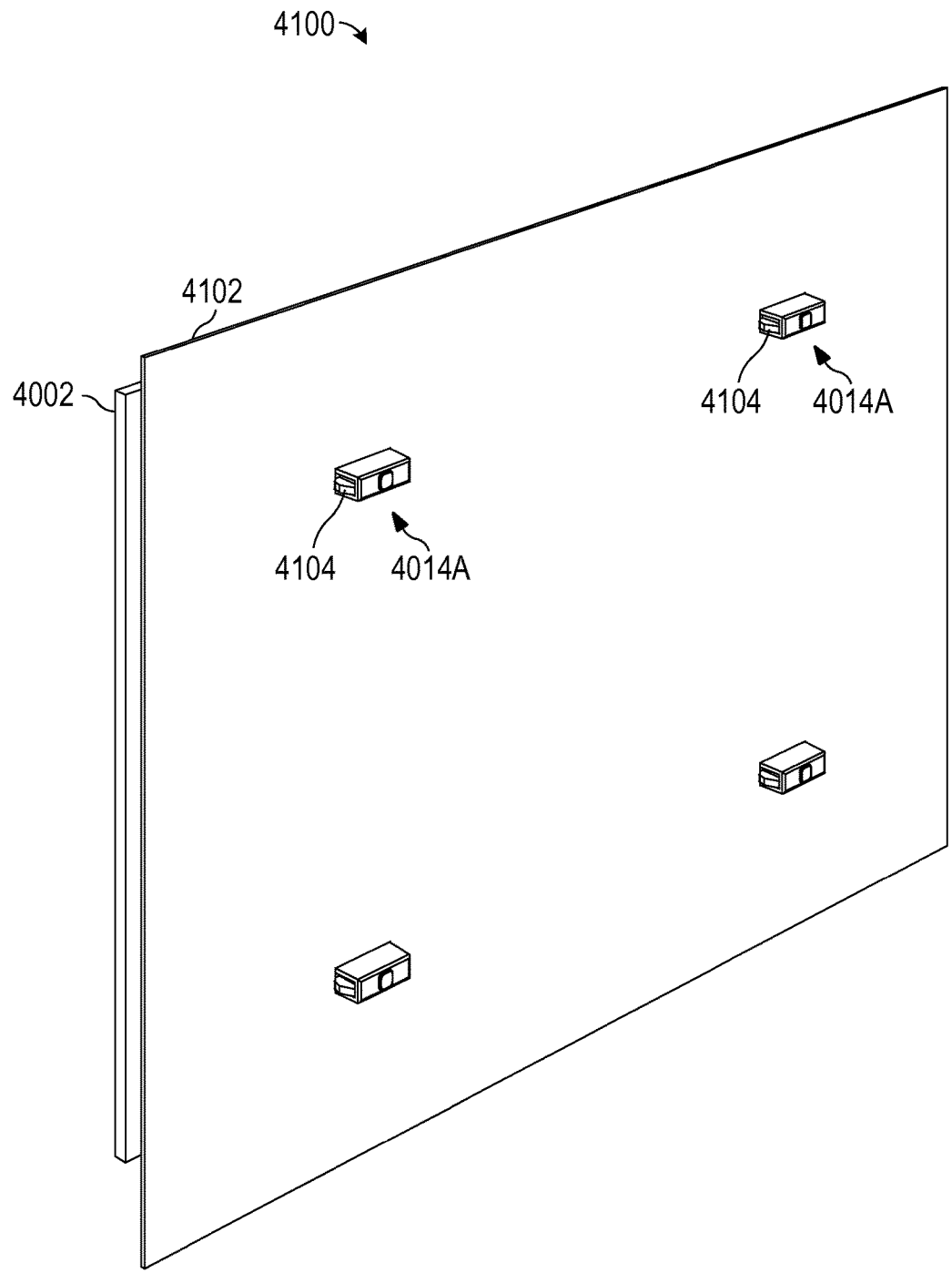
FIG. 41 is an illustration of the gaming system including a snap on display, according to one embodiment.

In FIG. 40, a first back image of snap-and-click display 4000 may include a slot machine area 4002, snap-and-click display 2702, snap-and-click device 2704, and a snap-and-click device tab in a locking position 4004. In one example, when snap-and-click device tab is in a locking position 4004, snap-and-click device 2704 (and/or snap-and-click display 2702) may be locked into one or more positions. In another example, a second back image of snap-and-click display 4100 (see FIG. 41) may include a display area 4102 and a snap-and-click device in an unlocked position 4014A. In this example, snap-and-click device 4104 is in unlocked position 4014A because one or more snap-and-click device tabs are in an unlocked position 4104.

Figure 42:
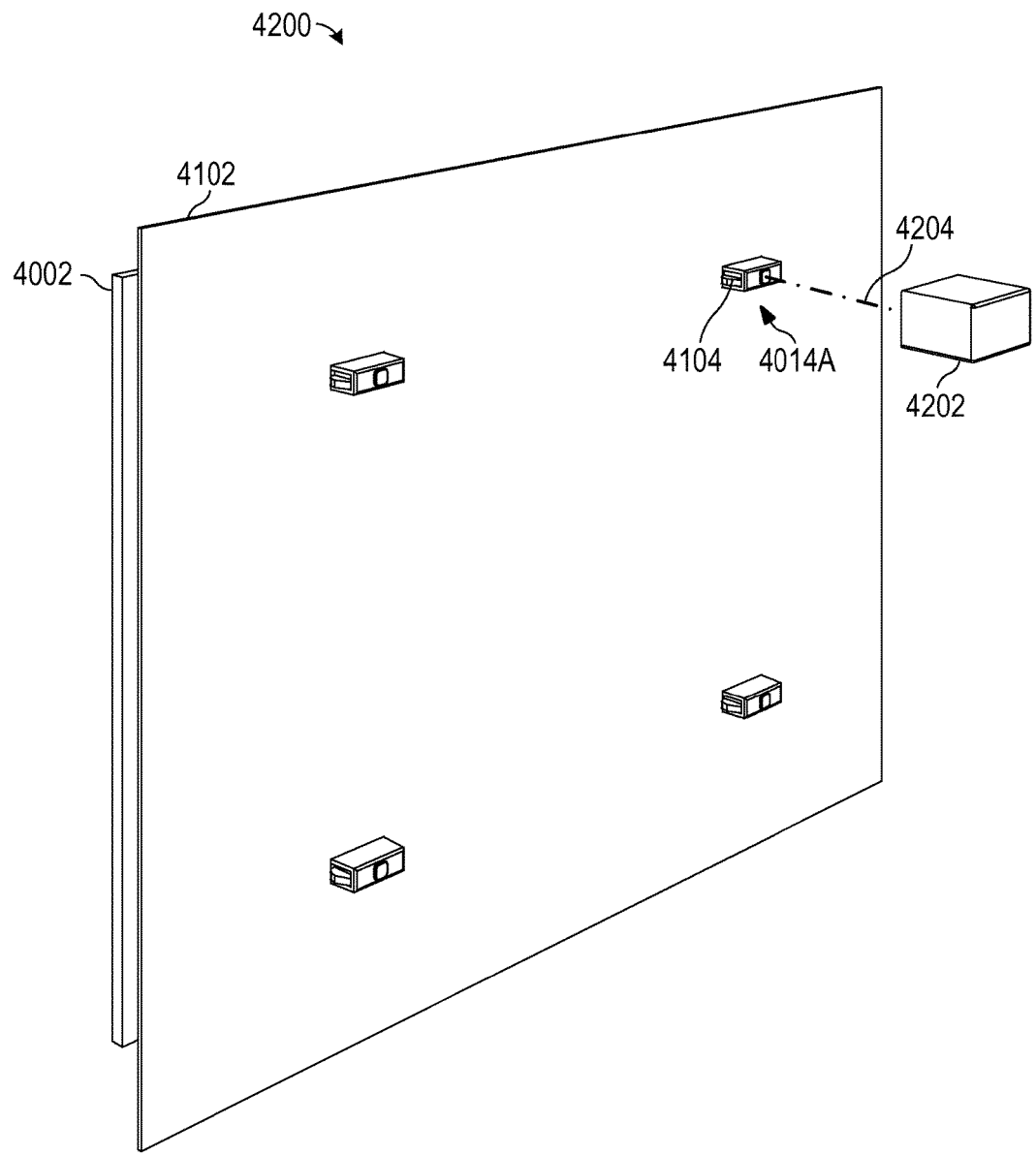
FIG. 42 is an illustration of the gaming system including a snap on display, according to one embodiment.
Figure 43:
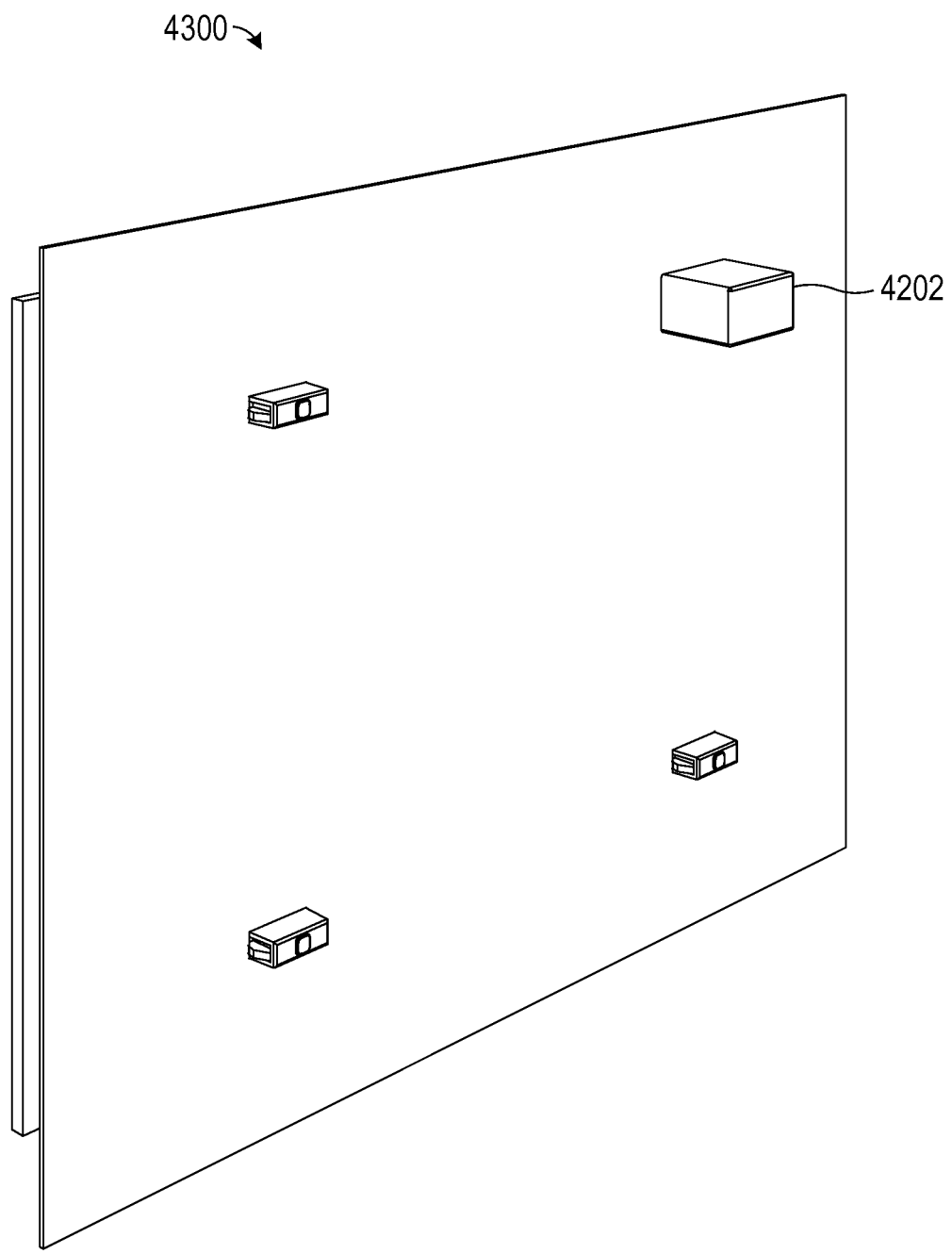
FIG. 43 is an illustration of the gaming system including a snap on display, according to one embodiment.
Figure 44:
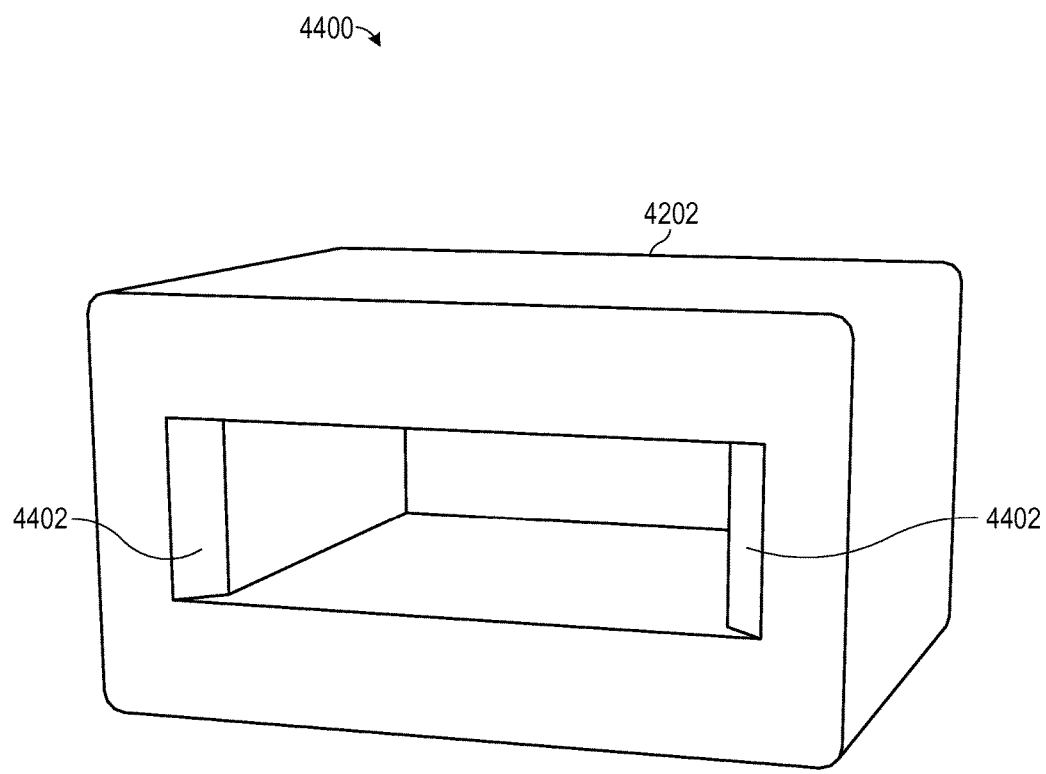
FIG. 44 is an illustration of the gaming system including a snap on display, according to one embodiment.

In FIG. 42, a third back image of snap-and-click display 4200 may include an unlocking device 4202 moving towards snap-and-click device 4104 via a first path 4204. Once unlocking device 4202 is placed over snap-and-click device 4104, snap-and-click device 4104 is in unlocked position 4014A because snap-and-click device tap(s) are in unlocked position 4202 (see FIG. 43). In one example, unlocking device 4202 may include an outer surface with one or more hollow areas 4402 which may be placed over one or more snap-and-click devices 4104 to place one or more tabs in one or more unlocked positions 4014A (see FIG. 44). In another example, snap-and-click display 2702 and/or snap-and-click device 4104 may be removed/unlocked/moved by applying one or more of a removing, unlocking, and/or moving force.

In one embodiment, the electronic gaming device may include a plurality of reels. The one or more paylines may be formed on at least a portion of the plurality of reels. The electronic gaming device may include a memory.

In one embodiment, the electronic gaming device may include a display interconnection area. The display interconnection area may include an interface. The interface may include one or more connection areas. The one or more connection areas may connect with a snap-and-click display.

In another example, the display interconnection area may include one or more electrical connection areas. The snap-and-click display may include one or more electrical connection devices. The one or more electrical connection areas and the one or more electrical connection devices may be connected to each other. In another example, the one or more electrical connection areas and the one or more electrical connection devices may be electrically coupled to each other. In another example, the one or more processors may monitor a status of an electrical connection between the one or more electrical connection areas and the one or more electrical connection devices. In another example, the snap-and-click display may include one or more snap-and-click locking devices.

In another example, the one or more snap-and-click locking devices may be released by contact with one or more unlocking points. In another example, the one or more snap-and-click locking devices may detach an electrical connection between the one or more electrical connection areas and the one or more electrical connection devices based on contact with the one or more unlocking points.

In one embodiment, a method may include aligning a snap-and-click display with one or more interconnection areas on a display interconnection area. The method may include placing the snap-and-click display into one or more interconnection points. The method may include placing the snap-and-click display into one or more lock positions with one or more interconnection points. The method may include locking one or more snap-and-click locking devices.

In another example, the method may include connecting one or more electrical connection areas on the display interconnection area and one or more electrical connection devices on the snap-and-click display.

In one example, the method may include electrically connecting one or more electrical connection areas on the display interconnection area and one or more electrical connection devices on the snap-and-click display. The method may include measuring at least one of positional data and electrical data relating to one or more of the snap-and-click display and the one or more interconnection areas on the display interconnection area. The method may include transmitting at least one of one or more positional data and one or more electrical data relating to the one or more of the snap-and-click display and the one or more interconnection areas on the display interconnection area. The method may include comparing at least one of the one or more positional data and the one or more electrical data to one or more references. The method may include transmitting one or more warning based on a comparison of at least one of the one or more positional data and one or more electrical data to one or more references. The method may include transmitting one or more statuses based on a comparison of at least one of the one or more positional data and the one or more electrical data to one or more references.

In another embodiment, the interface for an electronic gaming device may include a surface including one or more attachment areas. The one or more attachment areas may attach to a snap-and-click display via one or more snap-and-click securing devices. The surface may include one or more electrical interconnection areas. The one or more electrical interconnections areas may be electrically coupled to the snap-and-click display.

In another example, the one or more snap-and-click locking devices may be released by contact with one or more unlocking points. The one or more snap-and-click locking devices may detach an electrical connection between the one or more electrical interconnection areas and the snap-and-click display based on contact with the one or more unlocking points.

Figure 45:
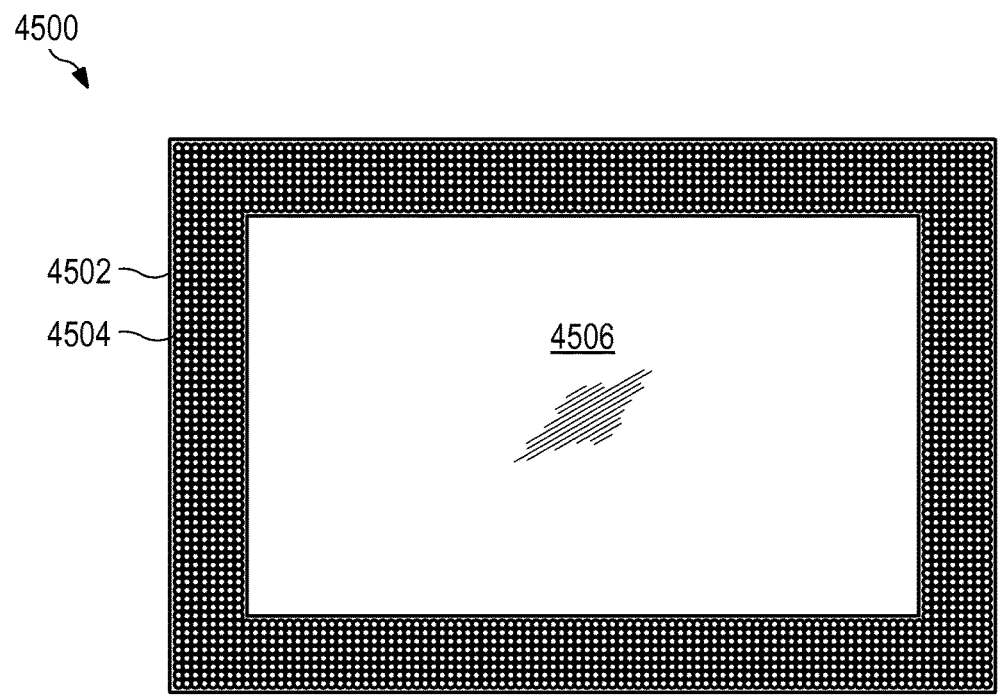
FIG. 45 is an illustration of the gaming system including an oversized display, according to one embodiment.

In FIG. 45, an illustration of the gaming system including oversized display is shown, according to one embodiment. In one example, a display screen 4500 may include an oversized touch screen area 4502, a plurality of light sources 4504, and a display area 4506.

Figure 46:
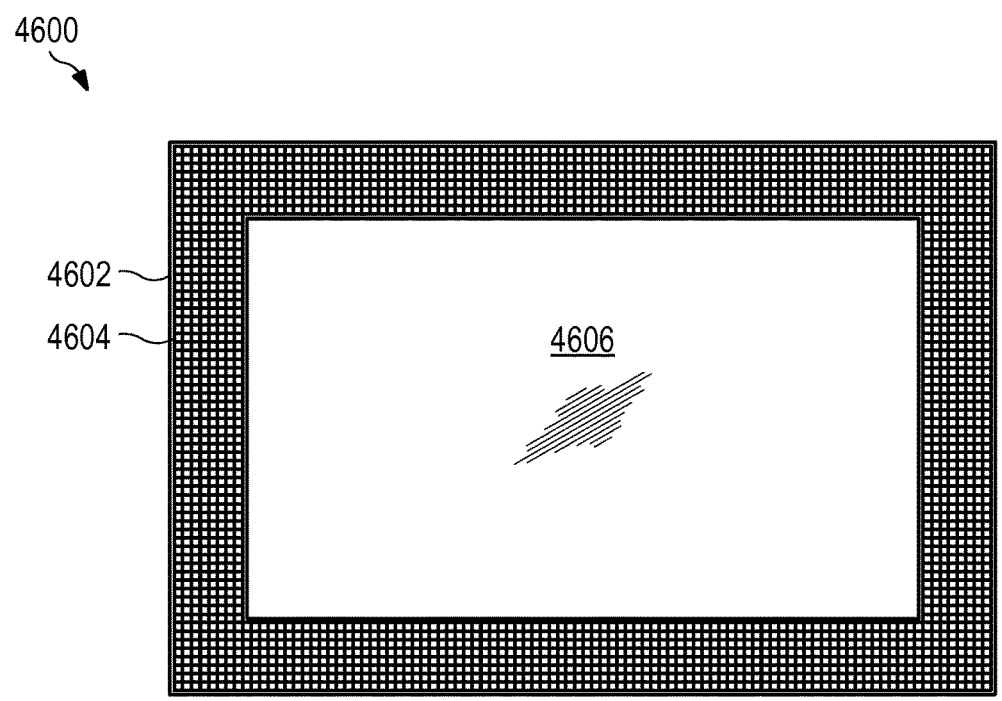
FIG. 46 is an illustration of the gaming system including an oversized display, according to one embodiment.

FIG. 46 is an illustration of the gaming system including oversized display, according to one embodiment. In one example, a display screen 4600 may include an oversized touch screen area 4602, a plurality of sensors 4604, and a display area 4606. In one example, an artwork message (and/or a 3D image) may be shown.

Figure 47:
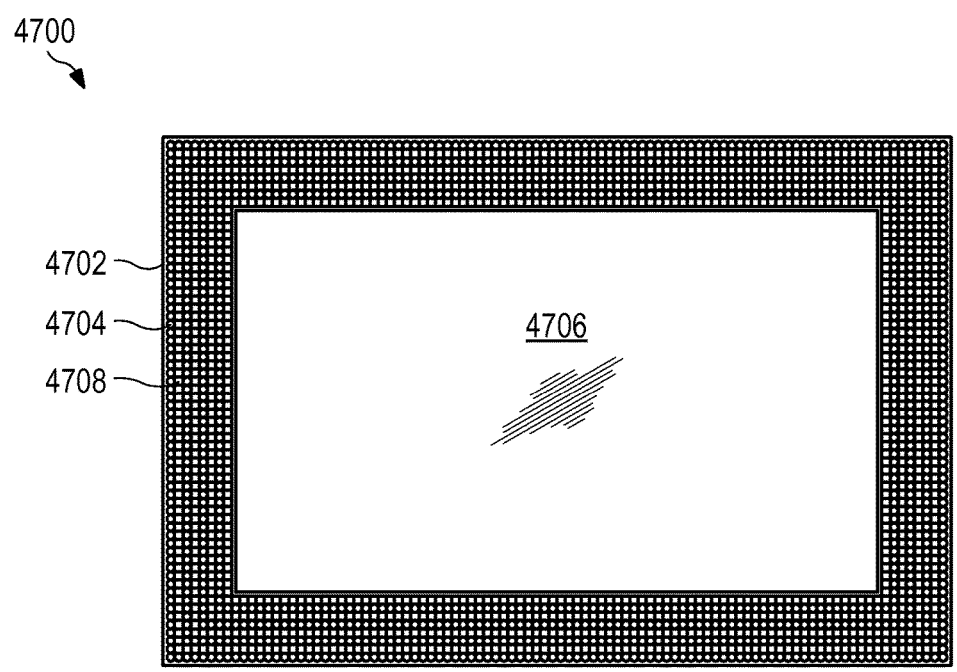
FIG. 47 is an illustration of the gaming system including an oversized display, according to one embodiment.

FIG. 47 is an illustration of the gaming system including oversized display, according to one embodiment. In one example, a display screen 4700 may include an oversized touch screen area 4702, a plurality of light sources 4704, a plurality of sensors 4708, and a display area 4506.

Figure 48:
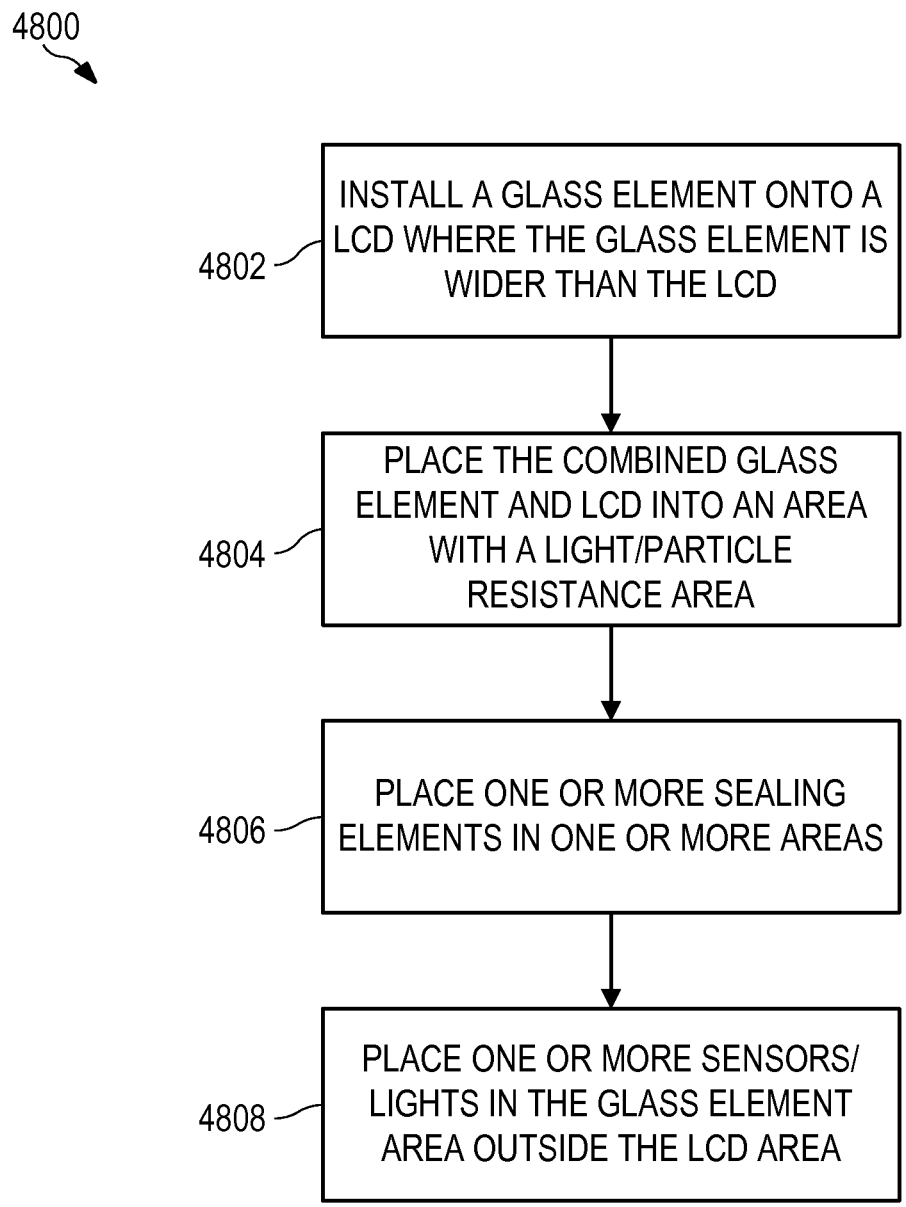
FIG. 48 is a flow diagram for game play, according to one embodiment.

In FIG. 48, a flow diagram for game play is shown, according to one embodiment. The method may include installing a glass element (and/or any other transparent material) onto a LCD (and/or any other display type) where the glass element (and/or any other transparent material) is wider (and/or longer and/or thinner and/or thicker) than the LCD (and/or any other display type) (step 4802). The method may include placing the combined glass element (and/or any other transparent material) and LCD (and/or any other display type) into an area with a light and/or particle resistance area (step 4804). The method may include placing one or more sealing elements in one or more areas (step 4806). The method may include placing one or more sensors and/or lights in the glass element (and/or any other transparent material) area outside the LCD area (and/or any other display type) (step 4808).

Figure 49:
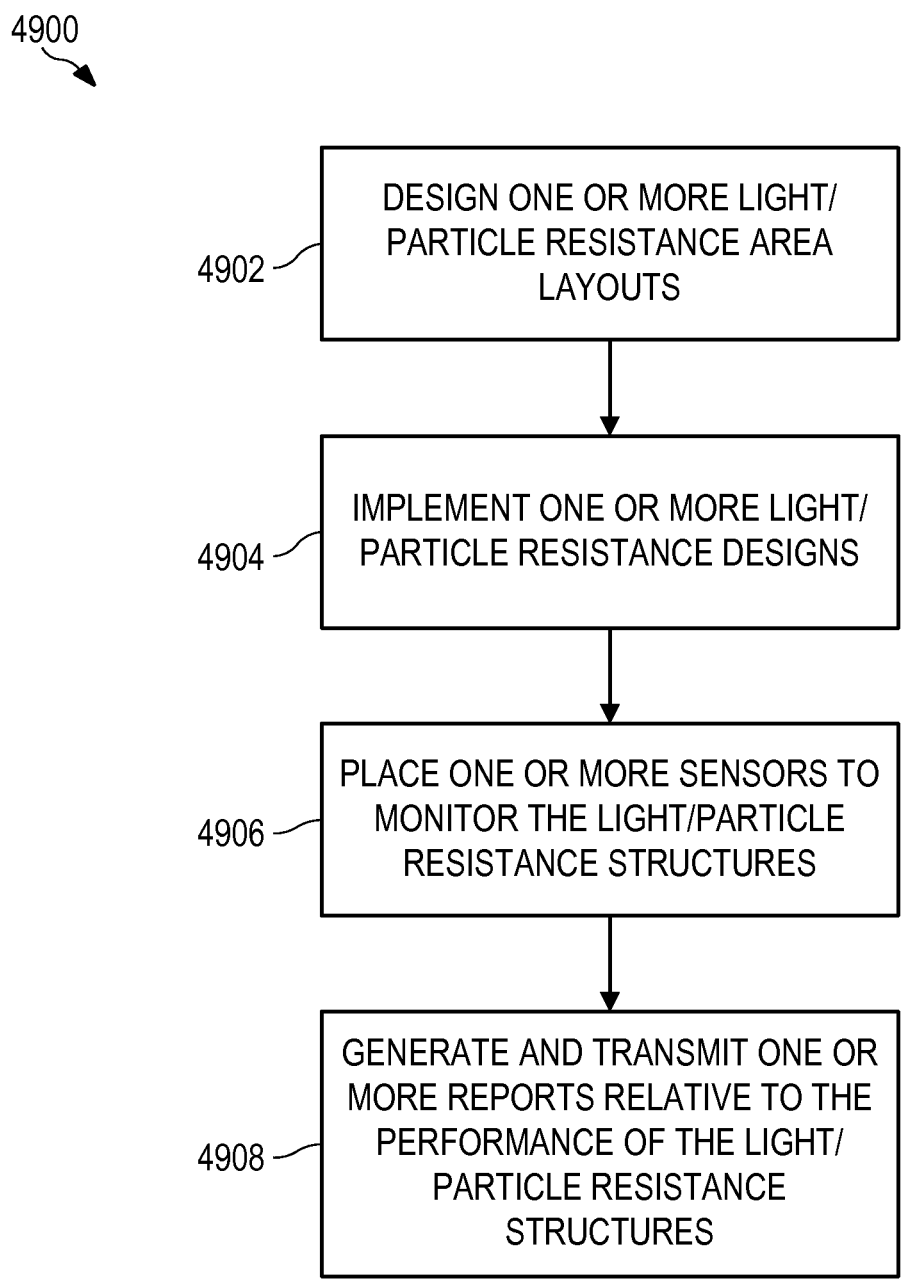
FIG. 49 is a flow diagram for game play, according to one embodiment.

In FIG. 49, a flow diagram for game play is shown, according to one embodiment. A method 4900 may include designing one or more light and/or particle resistance area layouts (step 4902). The method may include implementing one or more light and/or particle resistance designs (step 4904). The method may include placing one or more sensors to monitor the light and/or particle resistance structures (step 4906). The method may include generating and/or transmitting one or more reports relative to the performance of the light and/or particle resistance structures (step 4908).

In one example, a lip feature may be integrated into a mechanical part in which the monitor is mounted which creates a pocket which may act to block any internal light within the cabinet from escaping. This may be a valuable feature because unwanted internal light within the cabinet may be seen externally which is an undesirable aesthetic condition. Additionally, the bezel that is mounted to and surrounds the monitor can also act as the light block feature if the geometry of the bezel has a similar lip feature around the entire perimeter of the monitor. The lip feature on the bezel may be designed in such a way to also block other elements of the environment from entering the cabinet through one or more gaps around the monitors such as cigarette smoke and liquids which could cause damage to the internal components. In addition, the bezels mounted to the monitors can also be used to mount the monitor to the door in such a way as to make the monitor flush-mounted to the door. The bezels may have geometric features that would align with and fasten to the mounting features and/or devices that are inside of the main door parts. The monitor may have an electrical connection such that when mounted to the front door the electrical connection directly engages an electrical connection mounted to the inside of the main door. Further, this arrangement may be utilized as a docketing station. The monitor can also be loaded from the front in a manner such that after the monitor is inserted into the door it slides up or down into a final position for game play. In another example, a bezel may be placed above or below the monitors to act as a retainer and lock the monitors into final position. In another example, a variation of this assembly would be to insert and slide the first monitor into place and then directly insert the $2^{nd}$ monitor without any sliding motion.

Gaming system may be a "state-based" system. A state-based system stores and maintains the system's current state in a non-volatile memory. Therefore, if a power failure or other malfunction occurs, the gaming system will return to the gaming system's state before the power failure or other malfunction occurred when the gaming system may be powered up.

State-based gaming systems may have various functions (e.g., wagering, payline selections, reel selections, game play, bonus game play, evaluation of game play, game play result, steps of graphical representations, etc.) of the game. Each function may define a state. Further, the gaming system may store game histories, which may be utilized to reconstruct previous game plays.

A state-based system may be different than a Personal Computer ("PC") because a PC is not a state-based machine. A state-based system has different software and hardware design requirements as compared to a PC system.

The gaming system may include random number generators, authentication procedures, authentication keys, and operating system kernels. These devices, modules, software, and/or procedures may allow a gaming authority to track, verify, supervise, and manage the gaming system's codes and data.

A gaming system may include state-based software architecture, state-based supporting hardware, watchdog timers, voltage monitoring systems, trust memory, gaming system designed communication interfaces, and security monitoring.

For regulatory purposes, the gaming system may be designed to prevent the gaming system's owner from misusing (e.g., cheating) via the gaming system. The gaming system may be designed to be static and monolithic.

In one example, the instructions coded in the gaming system are non-changeable (e.g., static) and are approved by a gaming authority and installation of the codes are supervised by the gaming authority. Any change in the system may require approval from the gaming authority. Further, a gaming system may have a procedure/device to validate the code and prevent the code from being utilized if the code is invalid. The hardware and software configurations are designed to comply with the gaming authorities' requirements.

As used herein, the term "mobile device" refers to a device that may from time to time have a position that changes. Such changes in position may comprise of changes to direction, distance, and/or orientation. In particular examples, a mobile device may comprise of a cellular telephone, wireless communication device, user equipment, laptop computer, other personal communication system ("PCS") device, personal digital assistant ("PDA"), personal audio device ("PAD"), portable navigational device, or other portable communication device. A mobile device may also comprise of a processor or computing platform adapted to perform functions controlled by machine-readable instructions.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or a special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the arts to convey the substance of their work to others skilled in the art. An algorithm is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference throughout this specification to "one example," "an example," "embodiment," and/or "another example" should be considered to mean that the particular features, structures, or characteristics may be combined in one or more examples.

While there has been illustrated and described what are presently considered to be example features, it will be understood by those skilled in the art that various other modifications may be made, and equivalents may be substituted, without departing from the disclosed subject matter. Additionally, many modifications may be made to adapt a particular situation to the teachings of the disclosed subject matter without departing from the central concept described herein. Therefore, it is intended that the disclosed subject matter not be limited to the particular examples disclosed.

The invention claimed is:

1. An electronic gaming machine configured to include at least one electronic display having an oversized glass extending thereover, comprising:
   a cabinet, said cabinet defining an electronic display mounting area, said electronic display mounting area having a first height and a first width, said cabinet defining an oversized glass mounting area, said oversized glass mounting area located forwardly of said electronic display mounting area and being at least partially contiguous with said electronic display mounting area, said oversized glass mounting area having sides and a second height and a second width, said second width exceeding said first width, said cabinet defining a rearwardly extending first channel wall comprising said sides of said oversized glass area and a second channel wall extending inwardly from said first channel walls towards said electronic display mounting area.

2. The electronic gaming machine in accordance with claim 1 wherein said second channel wall extends generally perpendicular to said first channel wall.

3. The electronic gaming machine in accordance with claim 2 further comprising a third channel wall extending rearwardly from and generally perpendicular to said second channel wall.

4. The electronic gaming machine in accordance with claim 1 wherein said electronic display mounting area and said oversized glass mounting area are both rectangular in shape.

5. The electronic gaming machine in accordance with claim 4 wherein said oversized glass mounting area has four sides and said first channel wall comprises at least a portion of each of said four sides.

6. An electronic gaming machine comprising:
   a cabinet, said cabinet defining an electronic display mounting area, said mounting area having a first height and a first width, said cabinet defining an oversized glass mounting area, said oversized glass mounting area located forwardly of said electronic display mounting area, said oversized glass mounting area having first and second side walls, a second height, and a second width between said side walls, said second width exceeding said first width;
   an electronic video display, at least a portion of said electronic video display located in said electronic display mounting area;
   an oversized glass having a front, a rear and first and second sides, said oversized glass located in said oversized glass mounting area over a front of said electronic video display;
   said oversized glass cooperating with said cabinet to define a first channel between said first side of said oversized glass and said first side wall of said oversized glass mounting area and a second channel between said second side of said oversized glass and said second side wall of said oversized glass mounting area, a third channel extending from said first channel, said third channel located between said cabinet and at least a portion of said rear of said oversized glass, and a fourth channel extending from said second channel, said fourth channel located between said cabinet and at least a portion of said rear of said oversized glass.

7. The electronic gaming machine in accordance with claim 6 further comprising a filler located in at least one of said first channel, said second channel, said third channel and said fourth channel.

8. The electronic gaming machine in accordance with claim 6 wherein said first and second channels extend generally perpendicular to one another and said third and fourth channels extend generally perpendicular to one another.

9. The electronic gaming machine in accordance with claim 6 wherein said first and second channels each extend rearwardly from a front of said gaming machine towards an interior thereof.

10. The electronic gaming machine in accordance with claim 9 wherein said third and fourth channels each extend inwardly towards said electronic video display.

11. An electronic gaming machine comprising:
a cabinet, said cabinet defining an electronic display mounting area, said mounting area having a first height and a first width, said cabinet defining an oversized glass mounting area, said oversized glass mounting area located forwardly of said electronic display mounting area, said oversized glass mounting area having first and second side walls, a second height, and a second width between said side walls, said second width exceeding said first width;
an electronic video display, at least a portion of said electronic video display located in said electronic display mounting area;
an oversized glass having a peripheral edge, said oversized glass located in said oversized glass mounting area over a front of said electronic video display; and
a channel extending inwardly from between said cabinet and at least one portion of said peripheral edge of said oversized glass, under at least a portion of a rear of said oversized glass to said electronic display mounting area, said channel having at least two turns there along.

12. The electronic gaming machine in accordance with claim 11 wherein said at least two turns are generally perpendicular turns.

13. The electronic gaming machine in accordance with claim 11 wherein said channel is at least partially filled with a filler.

14. The electronic gaming machine in accordance with claim 11 wherein said channel extends inwardly around said entire peripheral edge of said oversized glass.

15. The electronic gaming machine in accordance with claim 11 wherein said channel has at least three turns there along, at least two of said turns being perpendicular to one another.

* * * * *